(12) United States Patent
Liaw

(10) Patent No.: US 12,532,445 B2
(45) Date of Patent: Jan. 20, 2026

(54) MANUFACTURING METHOD OF SEMICONDUCTOR STRUCTURE INCLUDING STATIC RANDOM ACCESS MEMORY CELL

(71) Applicant: TAIWAN SEMICONDUCTOR MANUFACTURING COMPANY, LTD., Hsinchu (TW)

(72) Inventor: Jhon Jhy Liaw, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 677 days.

(21) Appl. No.: 17/876,044

(22) Filed: Jul. 28, 2022

(65) Prior Publication Data

US 2024/0040762 A1 Feb. 1, 2024

(51) Int. Cl.
*H10B 10/00* (2023.01)
*G11C 11/412* (2006.01)
*G11C 11/419* (2006.01)
*H10B 99/00* (2023.01)

(52) U.S. Cl.
CPC .......... *H10B 10/12* (2023.02); *G11C 11/412* (2013.01); *G11C 11/419* (2013.01); *H10B 10/18* (2023.02); *H10B 99/00* (2023.02)

(58) Field of Classification Search
CPC ........ H10B 10/12; H10B 10/18; H10B 99/00; H10B 10/125; G11C 11/412; G11C 11/419; H10D 89/10
See application file for complete search history.

(56) References Cited

U.S. PATENT DOCUMENTS

| | | | |
|---|---|---|---|
| 7,233,032 B2 | 6/2007 | Liaw | |
| 8,144,540 B2 | 3/2012 | Liaw | |
| 8,411,499 B2 * | 4/2013 | Ohmori | ............... G11C 11/1697 365/158 |
| 9,024,392 B2 | 5/2015 | Liaw | |
| 9,209,247 B2 | 12/2015 | Colinge et al. | |
| 9,236,267 B2 | 1/2016 | De et al. | |
| 9,412,817 B2 | 8/2016 | Yang et al. | |
| 9,412,828 B2 | 8/2016 | Ching et al. | |
| 9,472,618 B2 | 10/2016 | Oxland | |
| 9,502,265 B1 | 11/2016 | Jiang et al. | |
| 9,520,482 B1 | 12/2016 | Chang et al. | |
| 9,536,738 B2 | 1/2017 | Huang et al. | |
| 9,576,814 B2 | 2/2017 | Wu et al. | |

(Continued)

*Primary Examiner* — Tan N Tran
(74) *Attorney, Agent, or Firm* — Cooper Legal Group, LLC

(57) ABSTRACT

A method includes forming a first channel pattern on a substrate from a top view; forming first and second gate patterns extending across the first channel pattern; forming first, second, and third source/drain patterns on the first channel pattern, the first and second source/drain patterns on opposite sides of the first gate pattern and the second and third source/drain patterns on opposite sides of the second gate pattern, wherein a first channel region of the first channel pattern, the first gate pattern, and the first and second source/drain patterns form a first read pull-down transistor of a first static random access memory (SRAM) cell, and a second channel region of the first channel pattern, the second gate pattern, and the second and third source/drain patterns form a second read pull-down transistor of a second SRAM cell.

20 Claims, 53 Drawing Sheets

(56) References Cited

U.S. PATENT DOCUMENTS

| | | |
|---|---|---|
| 9,608,116 B2 | 3/2017 | Ching et al. |
| 9,640,540 B1 | 5/2017 | Liaw |
| 9,672,903 B2 | 6/2017 | Liaw |
| 9,892,781 B2 | 2/2018 | Liaw |
| 10,128,253 B2 | 11/2018 | Liaw |
| 10,163,495 B2 * | 12/2018 | Liaw ..................... H10B 10/12 |

* cited by examiner

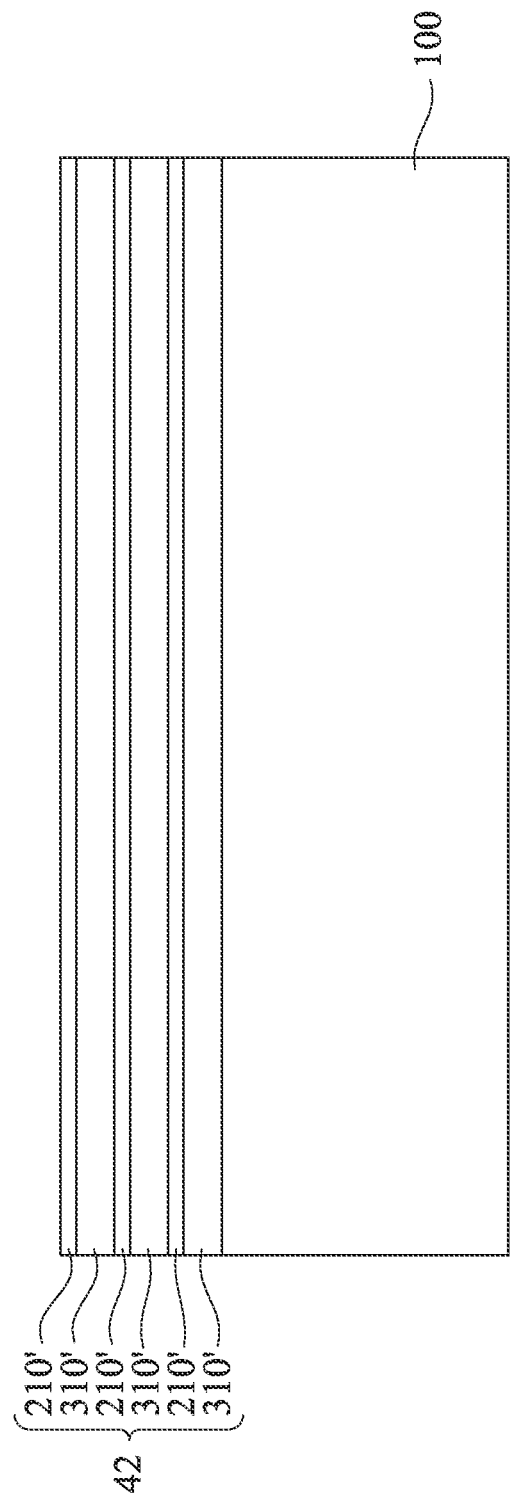

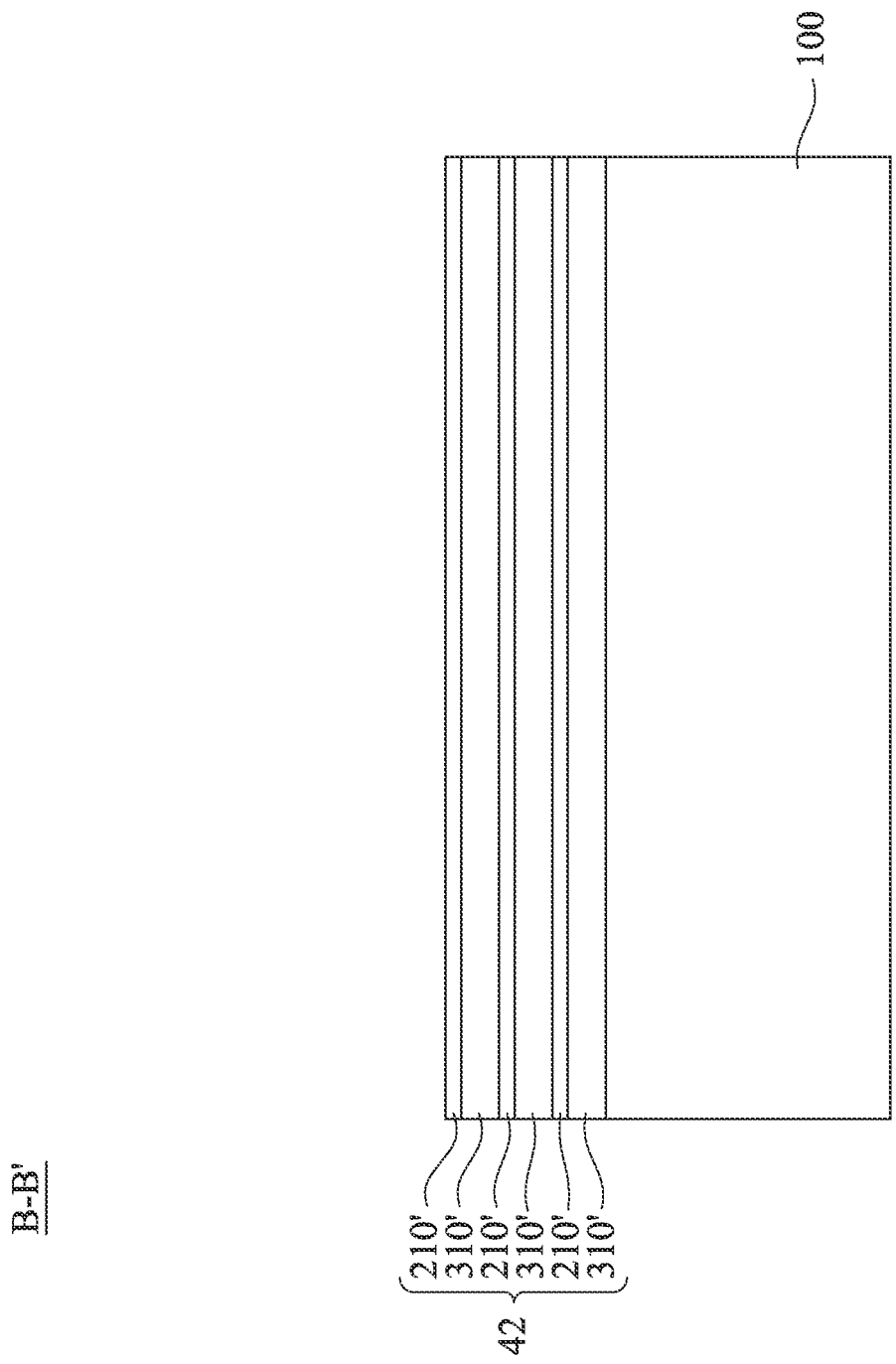

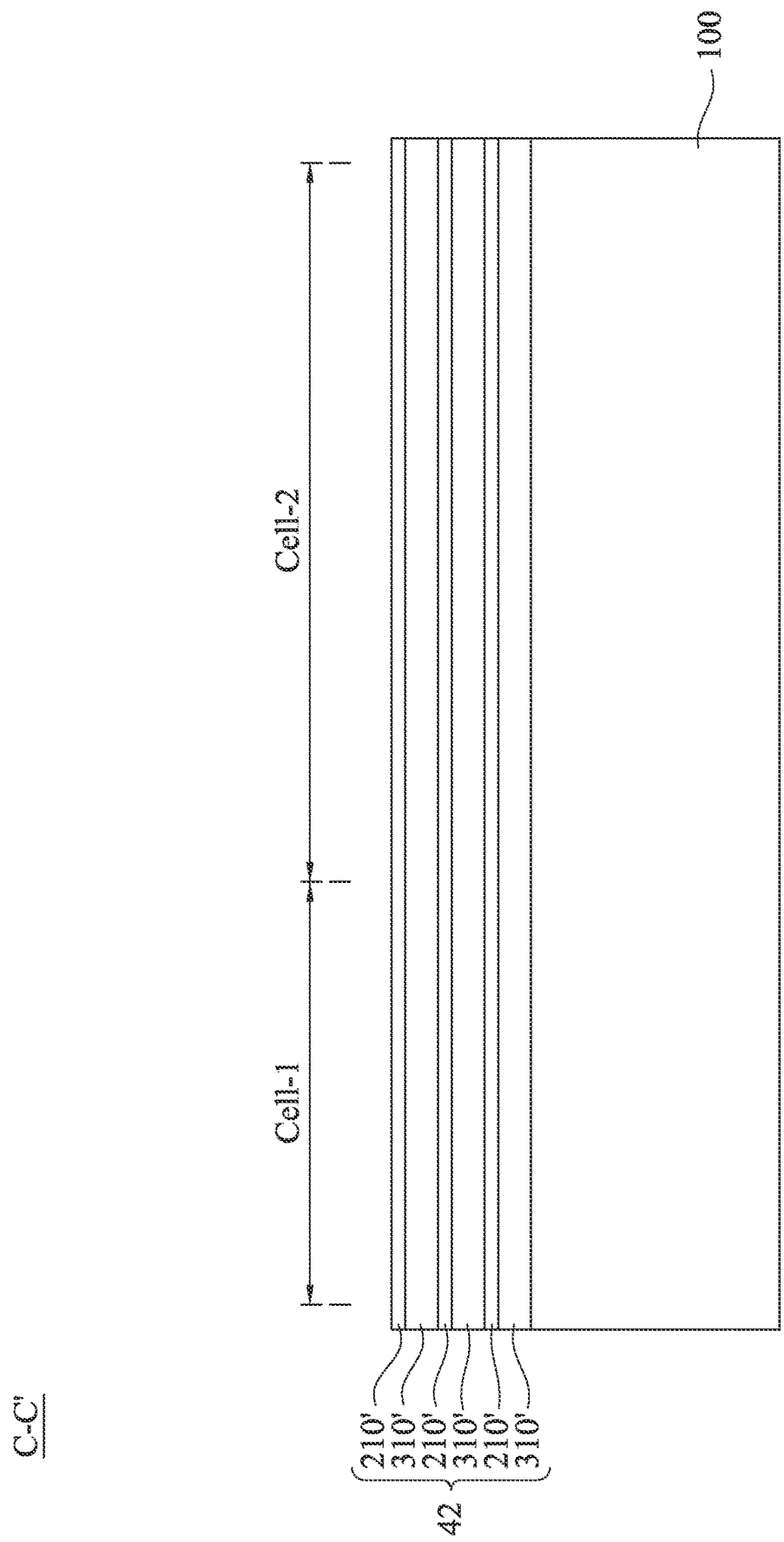

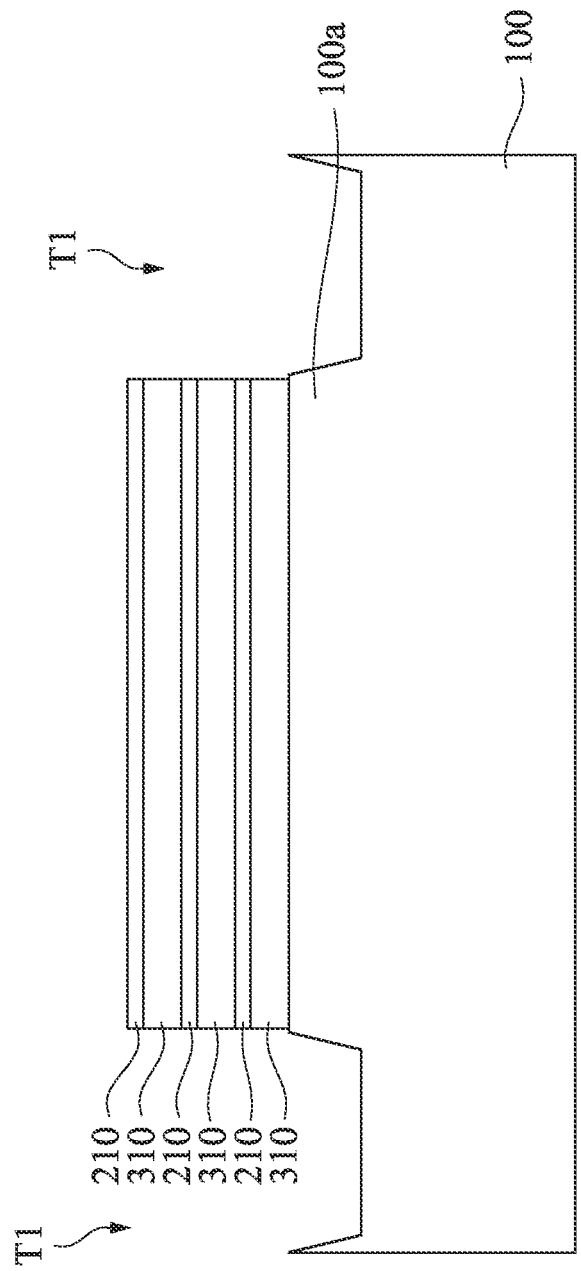

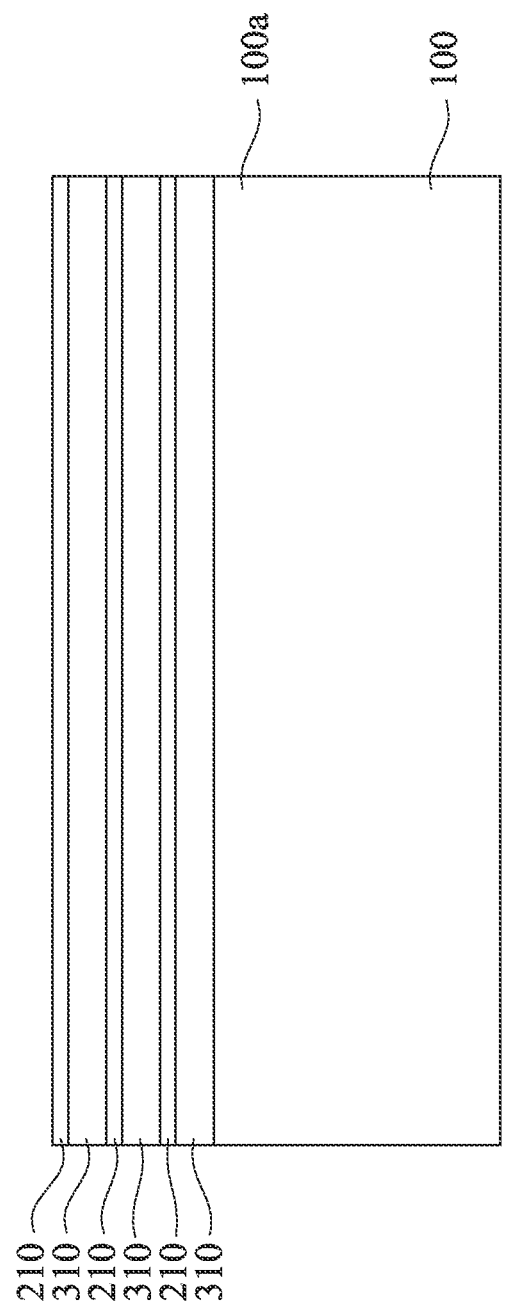

MANUFACTURING METHOD OF SEMICONDUCTOR STRUCTURE INCLUDING STATIC RANDOM ACCESS MEMORY CELL

BACKGROUND

Semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed.

In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling-down also produces a relatively high power dissipation value, which may be addressed by using low power dissipation devices such as complementary metal-oxide-semiconductor (CMOS) devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 7A to 19C illustrate cross-sectional views of intermediate stages in the formation of a semiconductor structure in accordance with some embodiments.

DETAILED DESCRIPTION

Figure 1:
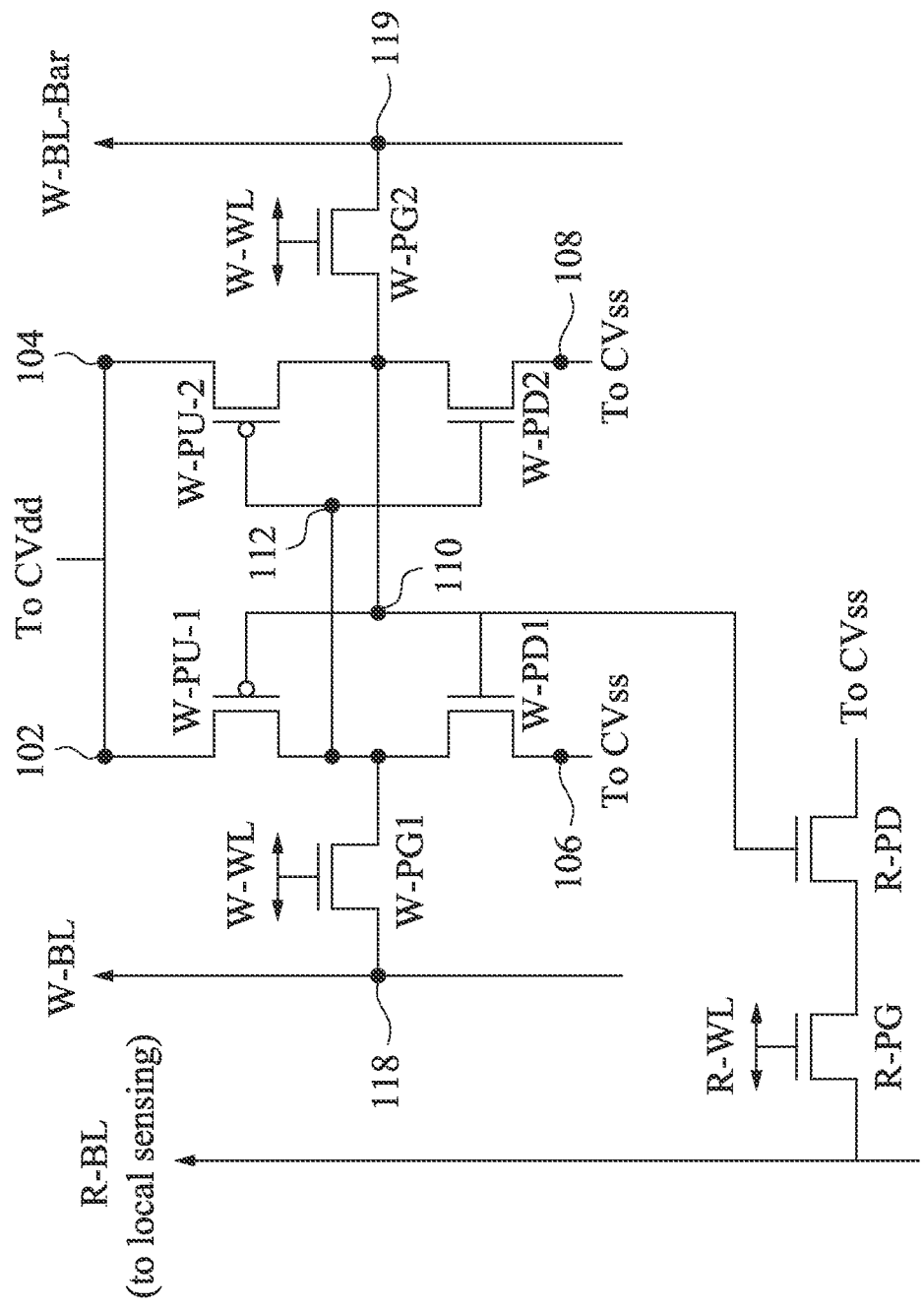
FIG. 1 illustrates a circuit diagram in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, "around," "about," "approximately," or "substantially" may mean within 20 percent, or within 10 percent, or within 5 percent of a given value or range. One skilled in the art will realize, however, that the value or range recited throughout the description are merely examples, and may be reduced with the down-scaling of the integrated circuits. Numerical quantities given herein are approximate, meaning that the term "around," "about," "approximately," or "substantially" can be inferred if not expressly stated.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The gate all around (GAA) transistor structures may be patterned by any suitable method. For example, the structures may be patterned using one or more photolithography processes, including double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers may then be used to pattern the GAA structure.

The present disclosure is related to integrated circuit (IC) structures and methods of forming the same. More particularly, some embodiments of the present disclosure are related to gate-all-around (GAA) devices including improved isolation structures to reduce current leakage from channels to the substrate. A GAA device includes a device that has its gate structure, or portions thereof, formed on four-sides of a channel region (e.g., surrounding a portion of a channel region). The channel region of a GAA device may include nanosheet channels, bar-shaped channels, and/or other suitable channel configurations. In some embodiments, the channel region of a GAA device may have multiple horizontal nanosheets or horizontal bars vertically spaced, making the GAA device a stacked horizontal GAA (S-HGAA) device. The GAA devices presented herein include a p-type metal-oxide-semiconductor GAA device and an n-type metal-oxide-semiconductor GAA device stack together. Further, the GAA devices may have one or more channel regions (e.g., nanosheets) associated with a single, contiguous gate structure, or multiple gate structures. One of ordinary skill may recognize other examples of semiconductor devices that may benefit from aspects of the present disclosure. In some embodiments, the nanosheets can be interchangeably referred to as nanowires, nanoslabs, nanorings, or nanostructures having nano-scale size (e.g., a few nanometers), depending on their geometry. In addition, the embodiments of the disclosure may also be applied, however, to a variety of metal oxide semiconductor transistors (e.g., complementary-field effect transistor (CFET) and fin field effect transistor (FinFET)).

Some embodiments discussed herein are discussed in the context of nano-FETs formed using a gate-last process. In other embodiments, a gate-first process may be used. Also, some embodiments contemplate aspects used in planar devices, such as planar FETs, or in fin field-effect transistors (FinFETs). For example, FinFETs may include fins on a substrate, with the fins acting as channel regions for the FinFETs. Similarly, planar FETs may include a substrate, with portions of the substrate acting as channel regions for the planar FETs.

In the course of IC evolution, functional density (i.e., the number of interconnected devices per chip area) has generally increased while geometry size (i.e., the smallest component (or line) that can be created using a fabrication process) has decreased. However, the smaller and more dense the metal lines in the IC structure will result in worse resistant thereof, thereby wasting processing power and processing speed during the operation of the IC structure. For example, static random access memory (SRAM) bit-lines may dispose in lowest level metallization layer (M1) for bit-line capacitance reduction. However, when metal thickness and line width are continuous shrunk, the lowest level metal may push the metal pitch to limitation for logic circuit routing density improvement, which in turn induces high resistance issue in both SRAM bit-line and Vss conductors (IR drop concern), and therefore impact the cell speed and V_min performance. Therefore, the present disclosure in various embodiments a metal line routing method to improve the functional density and operation performance on the IC structure. Specifically, the SRAM cells on the IC structure can have non-rectangular shapes, such as L-shaped profile, such that the adjacent two SRAM cells can abut together and form a rectangular cell shape, which result in read-port transistors of the adjacent two SRAM cells sharing a same channel layer and in turn improves the functional density of the IC structure. In addition, the write bit-lines can be disposed in a higher metal layer to lower the resistance of the SRAM cell, and the read bit-line can be disposed in a lower metal layer to lower the capacitance of the SRAM cell, such that the speed of SRAM cell can be improved. By way of example but not limiting the present disclosure, the read bit-line can be located on the metallization layer M1 and the write bit-lines can be located on a higher level metal layer (e.g., the metallization layer M3) than the metallization layer M1.

Reference is made to FIG. 1. FIG. 1 illustrates a circuit diagram in accordance with some embodiments of the present disclosure. FIG. 1 illustrates a circuit diagram of a two-port eight-transistor (8T) static random access memory (SRAM) cell Cell-1 in accordance with some embodiments. The SRAM cell Cell-1 includes a write port and a read port. The write port includes pull-up transistors W-PU-1 and W-PU-2, which may be P-type Metal-Oxide-Semiconductor (PMOS) transistors, and pull-down transistors W-PD-1 and W-PD-2 and pass-gate transistors W-PG-1 and W-PG-2, which may be N-type Metal-Oxide-Semiconductor (NMOS) transistors. In some embodiments, the pull-up transistor W-PU-1 and W-PU-2 may be NMOS transistors, and the pull-down transistors W-PD-1 and W-PD-2 and pass-gate transistors W-PG-1 and W-PG-2 may be PMOS transistors.

The gates of pass-gate transistors W-PG-1 and W-PG-2 are controlled by write word-line W-WL that determines whether SRAM cell Cell-1 is selected for writing into or not. A latch formed of pull-up transistors W-PU-1 and W-PU-2 and pull-down transistors W-PD-1 and W-PD-2 stores a bit, wherein the complementary values of the bit are stored in Storage Data (SD) node 110 and SD node 112. The stored bit can be written into SRAM cell Cell-1 through complementary bit-lines including write bit-line W-BL and write bit-line-bar W-BL-Bar. SRAM cell Cell-1 is powered through a positive power supply node CVdd that has a positive power supply voltage (also denoted as VDD). The SRAM cell Cell-1 is also connected to power supply voltage CVss (also denoted as VSS), which may be an electrical ground. The transistors W-PU-1 and W-PD-1 form a first inverter. The transistors W-PU-2 and W-PD-2 form a second inverter. The input of the first inverter is connected to transistor W-PG-1 and the output of the second inverter. The output of the first inverter is connected to transistor W-PG-2 and the input of the second inverter.

The sources of pull-up transistors W-PU-1 and W-PU-2 are connected to the power supply nodes 102 and 104, respectively, which are further connected to power supply voltage (and line) CVdd. The sources of pull-down transistors W-PD-1 and W-PD-2 are connected to power supply voltage nodes 106 and 108, respectively, which are further connected to power supply voltage/line CVss. The gates of transistors W-PU-1 and W-PD-1 are connected to the drains of transistors W-PU-2 and W-PD-2, which form a connection node that is referred to as a date node 110. The gates of transistors W-PU-2 and W-PD-2 are connected to the drains of transistors W-PU-1 and W-PD-1, which connection node is referred to as a data node 112. A source/drain region of pass-gate transistor W-PG-1 is connected to write bit-line W-BL at a write bit-line node 118. A source/drain region of pass-gate transistor W-PG-2 is connected to a write bit-line-bar W-BL-Bar at a write bit-line-bar node 119.

The SRAM cell Cell-1 further includes a read port, which includes read pull-down transistor R-PD and read pass-gate transistor R-PG connected in series. The gate of transistor R-PD is connected to the data node 112. The gate of transistor R-PG is connected to a read word-line R-WL. A source/drain region of transistor R-PG is connected to a read bit-line R-BL, which is connected to a local sensing circuit. A source/drain region of the transistor R-PD is connected to the power supply voltage/line.

Figure 2A:
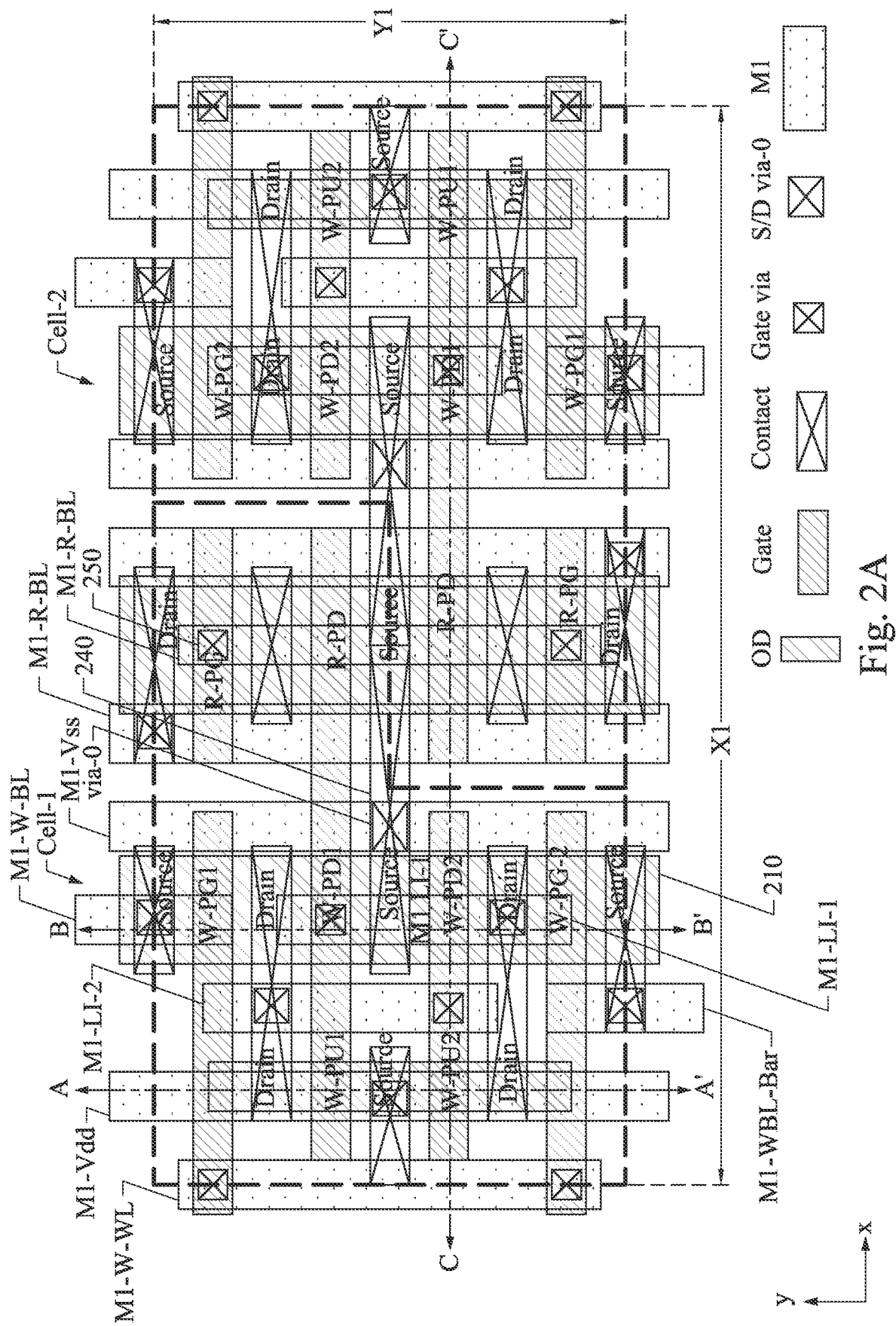
FIGS. 2A, 2B, and 2C illustrate cell array layout diagrams of a circuit according to some embodiments of the present disclosure.
Figure 2B:
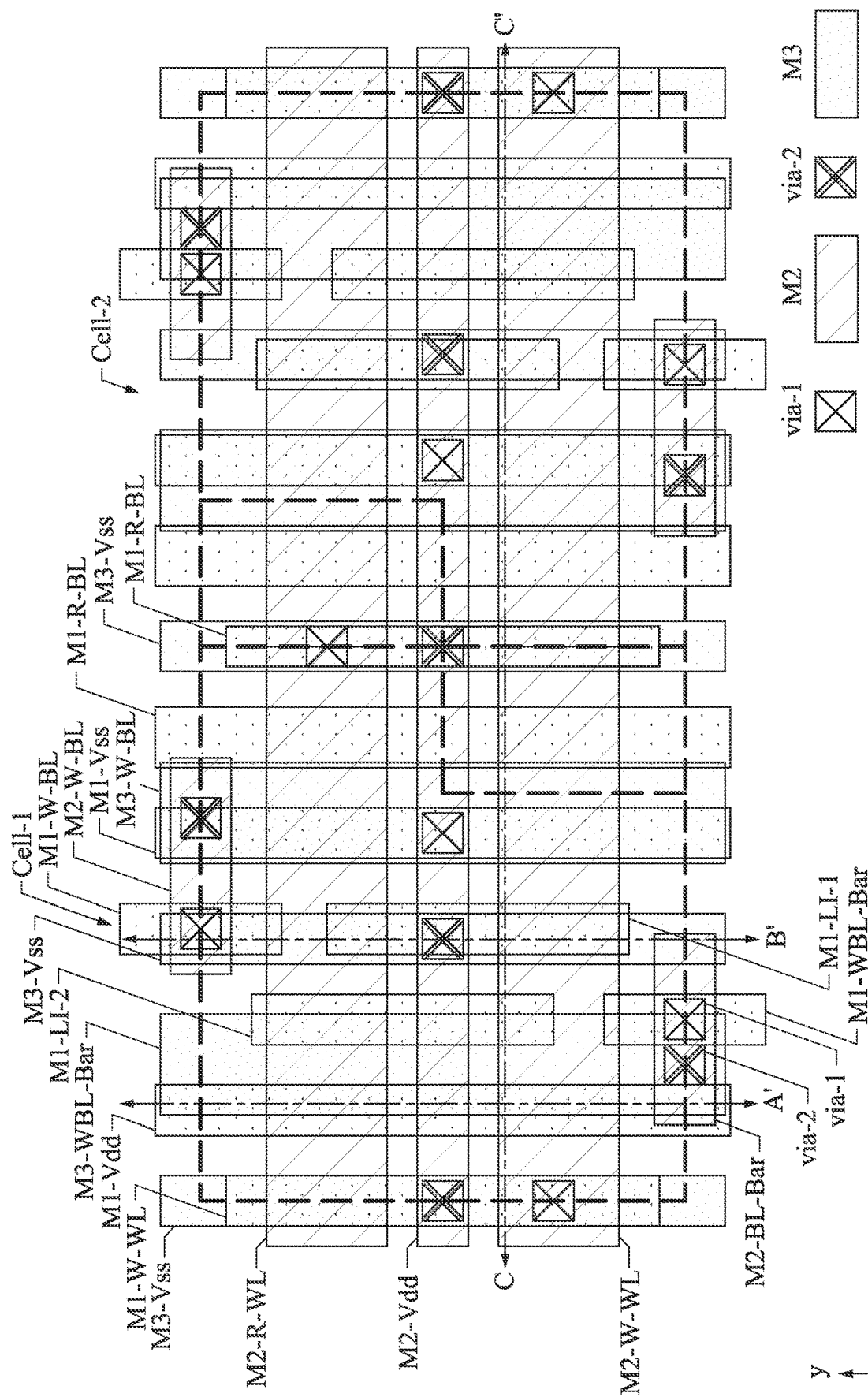
Figure 2C:
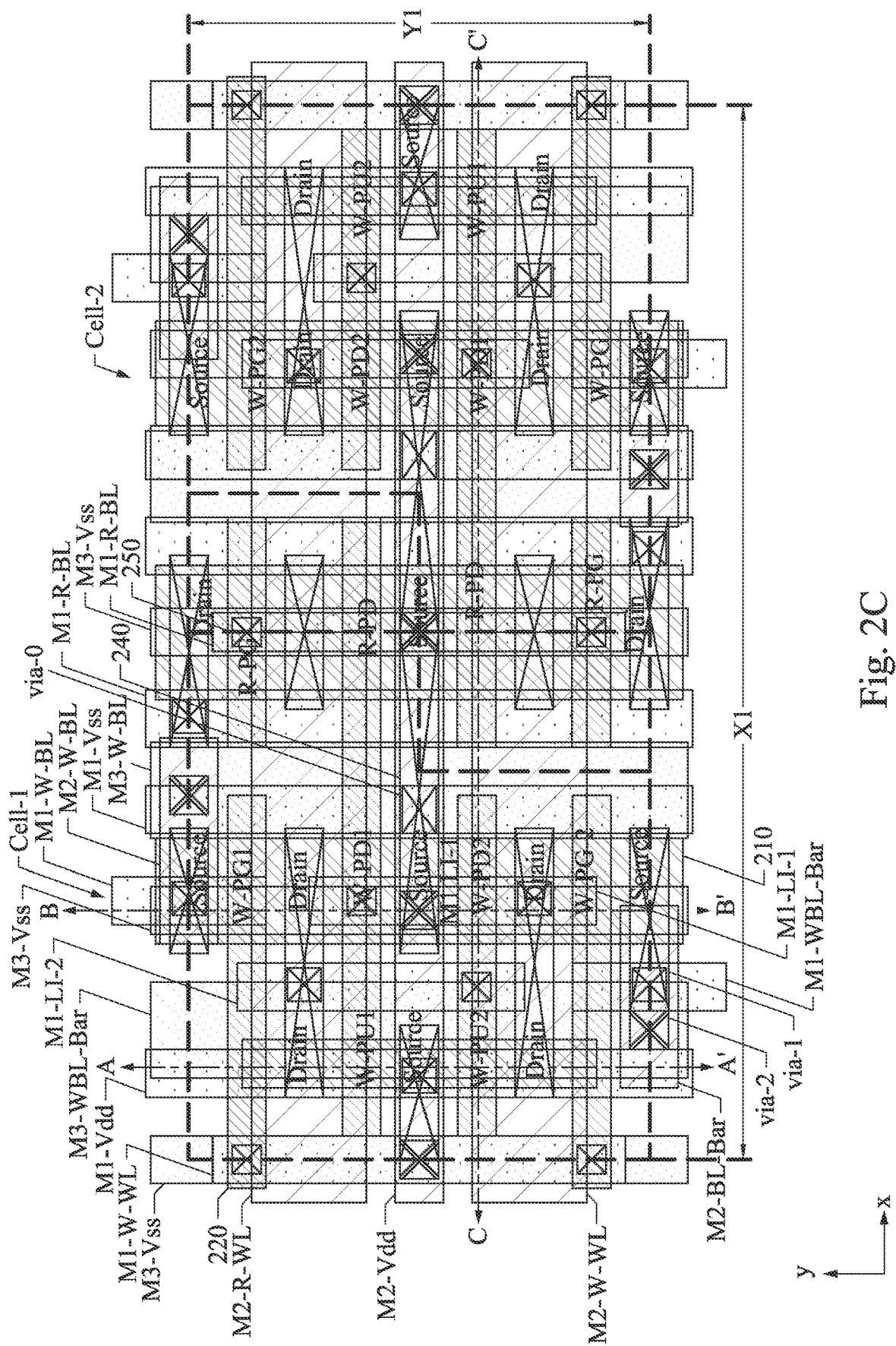

Reference is made to FIGS. 2A, 2B, and 2C. FIGS. 2A, 2B, and 2C illustrate cell array layout diagrams of SRAM cells Cell-1 and Cell-2 of a circuit according to some embodiments of the present disclosure. FIG. 2A illustrates a cell array layout diagram of SRAM cells Cell-1 and Cell-2 below a second interconnection layer of the semiconductor structure, such as a second metal layer of the semiconductor structure. FIG. 2B illustrates a cell array layout diagram of SRAM cells Cell-1 and Cell-2 from a first interconnection layer, such as a first metal layer M1, to a third interconnection layer of the semiconductor structure, such as a third metal layer M3. FIG. 2C illustrates a combination of the cell array layout diagrams in FIGS. 2A and 2B.

The outer boundary of each of the SRAM cells Cell-1 and Cell-2 is illustrated using dashed lines. Each of the SRAM cells Cell-1 and Cell-2 has a non-rectangular shape or a non-square shape. The SRAM cell Cell-2 has substantially the same configuration as the SRAM cells Cell-1. Specifically, the SRAM cell Cell-1 or Cell-2 may have an L-shaped profile defined by the dashed lines. In some embodiments, the SRAM cells Cell-1 and Cell-2 may have the same cell height H1. In some embodiments, the first cell 10A and the third cell 10C may have the same cell width W 1. Therefore, the SRAM cell Cell-2 may repeat reference numerals and/or letters as the SRAM cells Cell-1. The difference between the SRAM cells Cell-1 and Cell-2 is that the SRAM cell Cell-2 has a different orientation than the SRAM cell Cell-1. Specifically, the layout diagram of the SRAM cell Cell-2 is the layout diagram of the SRAM cells Cell-1 rotated 180 degrees.

In FIG. 2A, the adjacent two SRAM cells Cell-1 and Cell-2 are abutted together and form a rectangular cell shape (see FIG. 3A) to have an X-pitch X1 and a Y-pitch Y1. The Y-pitch extends in a bit-line routing direction and a dimension thereof is 4 times gate pitch (i.e., contacted poly pitch, CPP). Therefore, the SRAM cell Cell-1 or Cell-2 may have an area equal to (X1*Y1)/2. In a cell X-pitch direction, the SRAM cell Cell-1 or Cell-2 may have to 2.5 channel layers extending in the bit-line routing direction to have highly capability for cell scaling. On the hand hand, the two abutted SRAM cells Cell-1 and Cell-2 may have five channel layers. In some embodiments, the channel layers can be interchangeably referred to channel patterns, OD lines, or active regions. In some embodiments, each of the two abutted SRAM cells Cell-1 and Cell-2 can be a two-port eight-transistor (8T) SRAM cell to have sixteen transistors formed upon (i.e., two transistors W-PU1, two transistors W-PU2, two transistors W-PD1, two transistors W-PD2, two transistors W-PG1, two transistors W-PG2, two transistors R-PD, and two transistors R-PG). The same layout (e.g. The same OD/PO/Contact/Metal) for each of the SRAM cell to form a symmetry devices layout can improve the cell stability. A cell structure with the two abutted SRAM cells Cell-1 and Cell-2 can achieve both high density (e.g., less channel layers and metal lines in each layer) and high speed (e.g., lower RC delay for both bit-line and word-line).

Figure 3C:
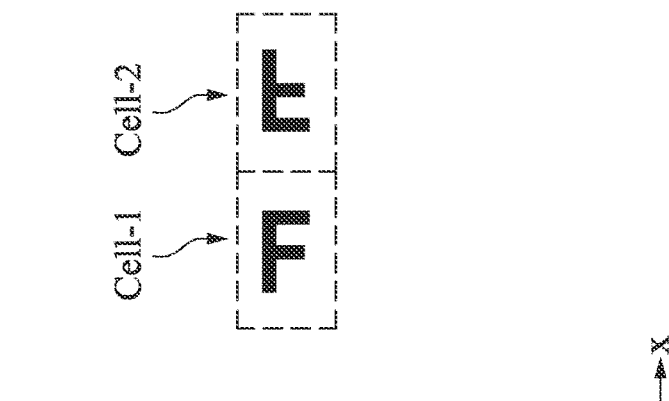
FIGS. 3A, 3B, 3C, 3D, and 3E illustrate schematic cell array layout diagrams according to some embodiments of the present disclosure.
Figure 3B:
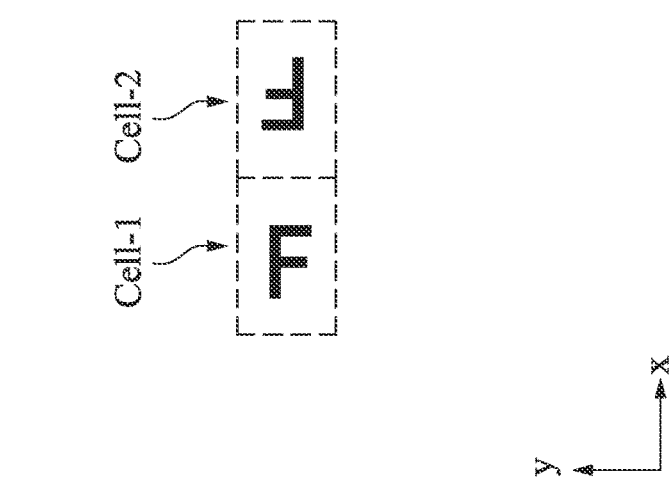
Figure 3A:
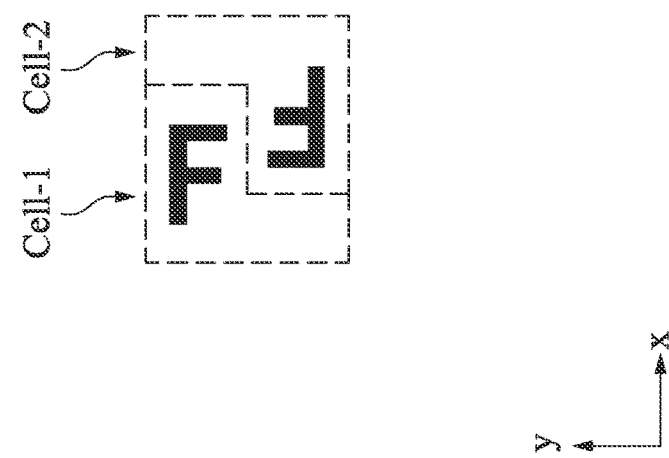
Figure 3E:
Figure 3D:

Reference is made to FIGS. 3D and 3E. FIGS. 3D and 3E illustrate a schematic cell array layout diagram of the SRAM cells. A plurality of the SRAM cells are arranged by eight columns and eight rows. Each row is arranged along the word-line routing direction and has two adjacent two-port SRAM cells Cell-1 and Cell-2 abutted together to form a cell group 101 having a rectangular cell shape. As shown in FIG. 3D, any adjacent two of the cell groups 101 arranged in X-direction are directly abut, and any adjacent two of the cell groups 101 arranged in Y-direction are mirror abut. As shown in FIG. 3E, any adjacent two of the cell groups 101 are mirror abut in X-direction or in Y-direction.

Referring back to FIG. 2A, each of the SRAM cells Cell-1 and Cell-2 has at least two ports (i.e., write-port and read-port) and includes at least three pass-gate devices (e.g., transistors W-PG1, W-PG2, and R-PG), at least three pull-down devices (e.g. transistors W-PD1, W-PD2, and R-PD), and at least two pull-up devices (e.g., transistors W-PU1 and W-PU2). The write-port includes two cross coupled inverters including four transistors W-PD1, W-PU1, W-PD2, W-PU2 and further includes two transistors W-PG1 and W-PG2. The read-port includes cascaded transistors R-PG and R-PD. The transistors W-PG1, W-PG2, R-PG, W-PD1, W-PD2, R-PD, W-PU1, and W-PU2 are all formed by either FinFET transistor or vertically stacked gate-all-around (VS-GAA) horizontal nanosheets transistors. Said FinFET transistor can be single-fin, or multiple fin, or combination. Said VS-GAA can be single channel, or multiple vertically stacked nano-sheet (or nano-wire), or combination. In some embodiments, the transistors W-PG1, W-PG2, R-PG, W-PD1, W-PD2, R-PD, W-PU1, and W-PU2 may be MOS transistors with silicon channel layers. In some embodiments, the transistors W-PG1, W-PG2, R-PG, W-PD1, W-PD2, R-PD, W-PU1, and W-PU2 may be GAA FETs. The silicon channel layers of the transistors W-PG1, W-PG2, R-PG, W-PD1, W-PD2, R-PD, W-PU1, and W-PU2 may be formed by channel layers 210. The channel layers 210 each can be semiconductor sheets stacked along the Z-direction (not shown) and wrapped by the gate electrode layer 220, and the Z-direction is perpendicular to the plane formed by the X-direction and Y-direction. Each of the SRAM cells Cell-1 and Cell-2 further includes gate electrode layers 220 extending in the Y-direction. The gate electrode layer 220 is connected to an overlying level (e.g., the read word-line M1-R-WL) through a gate via 250. The gate spacers 233 (see FIGS. 4A and 4B) are formed on sidewalls of the gate electrode layers 220. In some embodiments, the gate electrode layers 220 can be interchangeably referred to gate patterns, gate strips, or gate layers.

As shown in FIG. 2A, the transistors W-PU1, W-PD1, and R-PD may share one of the gate electrode layers 220, and the transistors W-PU2 and W_PD2 may share another one of the gate electrode layers 220. In the SRAM cell Cell-1, the write-port transistors W-PU1 and W-PU2 may be formed on a first one of the channel layers 210, the write-port transistors W-PG1, W-PG2, W-PD1, and W-PD2 may be formed on a second one of the channel layers 210. The read-port transistors R-PD and R-PG may be formed on a third one of the channel layer 210. In the SRAM cell Cell-2, the write-port transistors W-PG1, W-PG2, W-PD1, and W-PD2 may be formed on a fourth one of the channel layers 210, and the write-port transistor W-PU1 and W-PU2 may be formed on a fifth one of the channel layers 210. The read-port transistors R-PD and R-PG of the SRAM cell Cell-2 may also be formed on the third one of the channel layers 210 as the read-port transistors R-PD and R-PG of the SRAM cell Cell-1. R-PD devices and R-PG of the abutted two-port SRAM cells Cell-2 and Cell-2 are forming upon the same channel layer (e.g., a third one of the channel layers 210). The source node of two transistors W-PD1, two transistors W-PD2, and two R-PD of the SRAM cells Cell-1 and Cell-2 share one longer source/drain contact 240 and electrically connected to the power supply voltage line M1-Vss through the source/drain via via-0. The semiconductor structure further includes source/drain regions 218 (see FIGS. 4A and 4B) between the gate electrode layers 220 coupled to an overlying level (e.g., the power supply voltage line M1-Vss).

FIGS. 2A-2C illustrate the layout of metal lines in accordance with some embodiments. An interconnect structure is formed over the device region formation. The interconnect structure may include, for example, three metallization layers, labeled as M1, M2, M3, with two layers of metallization or interconnect via-0, via-1, via-2. Other embodiments may contain more or fewer metallization layers and corresponding more or fewer number of vias. The metal line illustrated here just for an example, and the metal line may be otherwise oriented (rotated 90 degrees or at other orientations). The interconnect structure includes a full metallization stack, including the metallization layers M1 and M2 connected by the interconnect via via-1 (see FIG. 2B), the metallization layers M2 and M3 connected by the interconnect via via-2 (see FIG. 2B), the source/drain via via-0 (see FIG. 2A) connects the full metallization stack to the source/drain region in the device region. In some embodiments, the metallization layers M1, M2, M3 can be interchangeably referred to first, second, third metal line levels of the semiconductor structure over the device region formation. Also included in the interconnect structure is an inter-metal dielectric (IMD) layer. The IMD layer may provide electrical insulation as well as structural support for the various features of the interconnect structure.

Each of the SRAM cells Cell-1 and Cell-2 may have at least two ports (i.e., write-port and read-port). The write-port may include a write word-line W-WL and two write bit-lines W-BL and W-BL-Bar to serve read or write functionality. The read-port may include a read word-line R-WL and a read bit-line R-BL. In some embodiments, the word-lines W-WL and R-WL are more care about metal resistance than bit-lines, such that the SRAM cell can have a shorter X-pitch and longer Y-pitch (e.g., 4CPP in FIG. 2A), which in turn allows for having a wider metal width and a larger metal to metal space of the word-lines to improve RC delay. In some embodiments, the two-port SRAM cell Cell-1 or Cell-2 may include at least three bit-lines, such as the bit-line W-BL, the bit-line-bar conductor W-BL-Bar, and the read bit-line R-BL. In some embodiments, the cell write margin (i.e., write Vcc_min) can be dominated by the resistance of the write bit-lines W-BL and W-BL-bar. Therefore, disposing the write bit-lines W-BL and W-BL-bar in a higher metal layer can lower the resistance of the SRAM cell. In some embodiments, the read port speed can be dominated by the transistor Ion and the bit-line capacitance. Therefore, disposing the read bit-line R-BL in a lower metal layer can lower the capacitance of the SRAM cell, which in turn improves the speed of SRAM cell since read operations are performed more than write operations. By way of example but not limiting the present disclosure, the read bit-line R-BL can be located on the metallization layer M1 and the write bit-lines W-BL and W-BL-Bar can be located on a higher level metal layer (e.g., the metallization layer M3) than the metallization layer M1.

Throughout the description, the notations of metal lines may be followed by the metal line levels they are in, wherein the respective metal line level is placed in parenthesis. As shown in FIG. 2A, metal lines disposed at the M1 level may include power supply voltage lines M1-Vdd, M1-Vss, a write word-line M1-W-WL, a write bit-line-bar M1-W-BL-Bar, a write bit-line M1-W-BL, a read bit-line M1-R-BL, a read word-line M1-R-WL, and local connection lines M1-LI-1, M1-LI-2. The metal lines disposed at the M1 level may have lengthwise directions parallel to the Y-direction (e.g., column direction). Accordingly, each of these metal lines disposed at the M1 level may extend into, and may be connected to, a plurality of SRAM cells in the same column. The local connection lines M1-LI-1, M1-LI-2 can be used for connecting a write port data node contact to another CMOS gate connection. The local connection line M1-LI-1 can form an electrically connection between the gate electrode layer 220 of the transistor W-PD1 and the drain node of the transistor W-PG2. The local connection line M1-LI-2 can form an electrically connection between the gate electrode layer 220 of the transistor W-PD2 and the drain node of the transistor W-PD1.

The outer boundary of the metal lines disposed at the M1 level over the SRAM cell Cell-1 or Cell-2 is illustrated using dashed lines. The metal lines disposed at the M1 level over the SRAM cell Cell-1 or Cell-2 has a rectangular shape defined by the dashed lines. The metal lines disposed at the M1 level over the SRAM cell Cell-1 have substantially the same configuration as the metal lines disposed at the M1 level over the SRAM cell Cell-2. The difference between the metal lines disposed at the M1 level over the SRAM cell Cell-1 and the metal lines disposed at the M1 level over the SRAM cell Cell-2 is that the metal lines disposed at the M1 level over the SRAM cell Cell-1 has a different orientation than the metal lines disposed at the M1 level over the SRAM cell Cell-2. Specifically, the layout diagram of the metal lines disposed at the M1 level over the SRAM cell Cell-1 is the layout diagram of the metal lines disposed at the M1 level over the SRAM cell Cell-1 rotated 180 degrees (see FIG. 3B). In some embodiments, the write bit-line M1-W-BL and the write bit-line-bar M1-W-BL-Bar disposed at the M1 level can be interchangeably referred to a write bit-line landing pad and a write bit-line-bar landing pad, respectively. In some embodiments, the metal lines can be interchangeably referred to metal layers, conductive lines, conductive layers, or conductors.

As shown in FIG. 2B, metal lines disposed at the M2 level may include a read word-line M2-R-WL, a power supply voltage line M2-Vss, a write word-line M2-W-WL, a write bit-line M2-W-BL, and a write bit-line-bar M2-W-BL-Bar. The metal lines disposed at the M2 level may have lengthwise directions parallel to the X-direction (e.g., row direction). Accordingly, each of these metal lines disposed at the M2 level may extend into, and may be connected to, a plurality of SRAM cells in the same row. Each of the SRAM cells Cell-1 and Cell-2 may include the power supply voltage line M2-Vss located between the read word-line M2-R-WL and W_WL and the write word-line M2-W-WL and electrically connected to the power supply voltage line M1-Vss. The outer boundary of the metal lines disposed at the M2 level over the SRAM cell Cell-1 or Cell-2 is illustrated using dashed lines. The metal lines disposed at the M2 level over the SRAM cell Cell-1 or Cell-2 has a rectangular shape defined by the dashed lines. The metal lines disposed at the M2 level over the SRAM cell Cell-1 have substantially the same configuration as the metal lines disposed at the M2 level over the SRAM cell Cell-2. The difference between the metal lines disposed at the M2 level over the SRAM cell Cell-1 and the metal lines disposed at the M2 level over the SRAM cell Cell-2 is that the metal lines disposed at the M2 level over the SRAM cell Cell-1 has a different orientation than the metal lines disposed at the M2 level over the SRAM cell Cell-2. Specifically, the layout diagram of the metal lines disposed at the M2 level over the SRAM cell Cell-1 is the layout diagram of the metal lines disposed at the M2 level over the SRAM cell Cell-1 rotated 180 degrees (see FIG. 3B). In some embodiments, the write bit-line M2-W-BL and the write bit-line-bar M2-W-BL-Bar disposed at the M2 level can be interchangeably referred to a write bit-line landing pad and a write bit-line-bar landing pad, respectively.

As shown in FIG. 2B, metal lines disposed at the M3 level may include a power supply voltage line M3-Vss, a write bit-line-bar M3-W-BL-Bar, and a write bit-line M3-W-BL. The metal lines disposed at the M3 level may have lengthwise directions parallel to the Y-direction (e.g., column direction) as the metal lines disposed at the M1 level. Accordingly, each of these metal lines disposed at the M3 level may extend into, and may be connected to, a plurality of SRAM cells in the same column. In some embodiments, the power supply voltage line M3-Vss can be located between the write hit-line M3-W-BL and the write bit-line-bar M3-W-BL-Bar and electrically connected to the power supply voltage line M2-Vss. In some embodiments, the power supply voltage lines M1-Vss, M2-Vss, M3-Vss can be electrically connected together. The outer boundary of the metal lines disposed at the M3 level over the SRAM cell Cell-1 or Cell-2 is illustrated using dashed lines. The metal lines disposed at the M3 level over the SRAM cell Cell-1 or Cell-2 has a rectangular shape defined by the dashed lines. The metal lines disposed at the M3 level over the SRAM cell Cell-1 have substantially the same configuration as the metal lines disposed at the M3 level over the SRAM cell Cell-2. The difference between the metal lines disposed at the M3 level over the SRAM cell Cell-1 and the metal lines disposed at the M3 level over the SRAM cell Cell-2 is that the metal lines disposed at the M3 level over the SRAM cell Cell-1 has a different orientation than the metal lines disposed at the M3 level over the SRAM cell Cell-2. Specifically, the layout diagram of the metal lines disposed at the M3 level over the SRAM cell Cell-1 is the layout diagram of the metal lines disposed at the M3 level over the SRAM cell Cell-1 rotated 180 degrees (see FIG. 3B).

The source/drain vias disposed at the via-0 level may be formed in order to connect to the corresponding source/drain regions to the corresponding metal lines at the M1 level. The interconnect vias disposed at the via-1 level may be formed in order to connect to the corresponding metal lines at the M1 level to the corresponding metal lines at the M2 level. The interconnect vias disposed at the via-2 level may be formed in order to connect to the corresponding metal lines at the M2 level to the corresponding metal lines at the M3 level. The outer boundary of the interconnect vias disposed at the via-1 level and the via-2 level over the SRAM cell Cell-1 or Cell-2 is illustrated using dashed lines. The interconnect vias disposed at the via-2 level over the SRAM cell Cell-1 or Cell-2 has a rectangular shape defined by the dashed lines. The interconnect vias disposed at the via-2 level over the SRAM cell Cell-1 have substantially the same configuration as the interconnect vias disposed at the via-2 level over the SRAM cell Cell-2. The difference between the interconnect vias disposed at the via-2 level over the SRAM cell Cell-1 and the interconnect vias disposed at the via-2 level over the SRAM cell Cell-2 is that the interconnect vias disposed at the via-2 level over the SRAM cell Cell-1 has a different orientation than the metal lines disposed at the via-2 level over the SRAM cell Cell-2. Specifically, the layout diagram of the interconnect vias disposed at the via-2 level over the SRAM cell Cell-1 is the layout diagram of the interconnect vias disposed at the via-2 level over the SRAM cell Cell-1 rotated 180 degrees (see FIG. 3B).

The interconnect vias disposed at the via-1 level over the SRAM cell Cell-1 have substantially the same configuration as the interconnect vias disposed at the via-1 level over the SRAM cell Cell-2. The difference between the interconnect vias disposed at the via-1 level over the SRAM cell Cell-1 and the interconnect vias disposed at the via-1 level over the SRAM cell Cell-2 is that the interconnect vias disposed at the via-1 level over the SRAM cell Cell-1 has a different orientation than the metal lines disposed at the via-1 level over the SRAM cell Cell-2. Specifically, the layout diagram of the interconnect vias disposed at the via-1 level over the SRAM cell Cell-1 is a mirror of the layout diagram of the interconnect vias disposed at the via-1 level over the SRAM cell Cell-1 (see FIG. 3C).

In some embodiments, the layouts as shown in FIGS. 2A, 2B, and 2C are represented by a plurality of masks generated by one or more processors and/or stored in one or more non-transitory computer-readable media. Other formats for representing the layout are within the scope of various embodiments. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 4A:
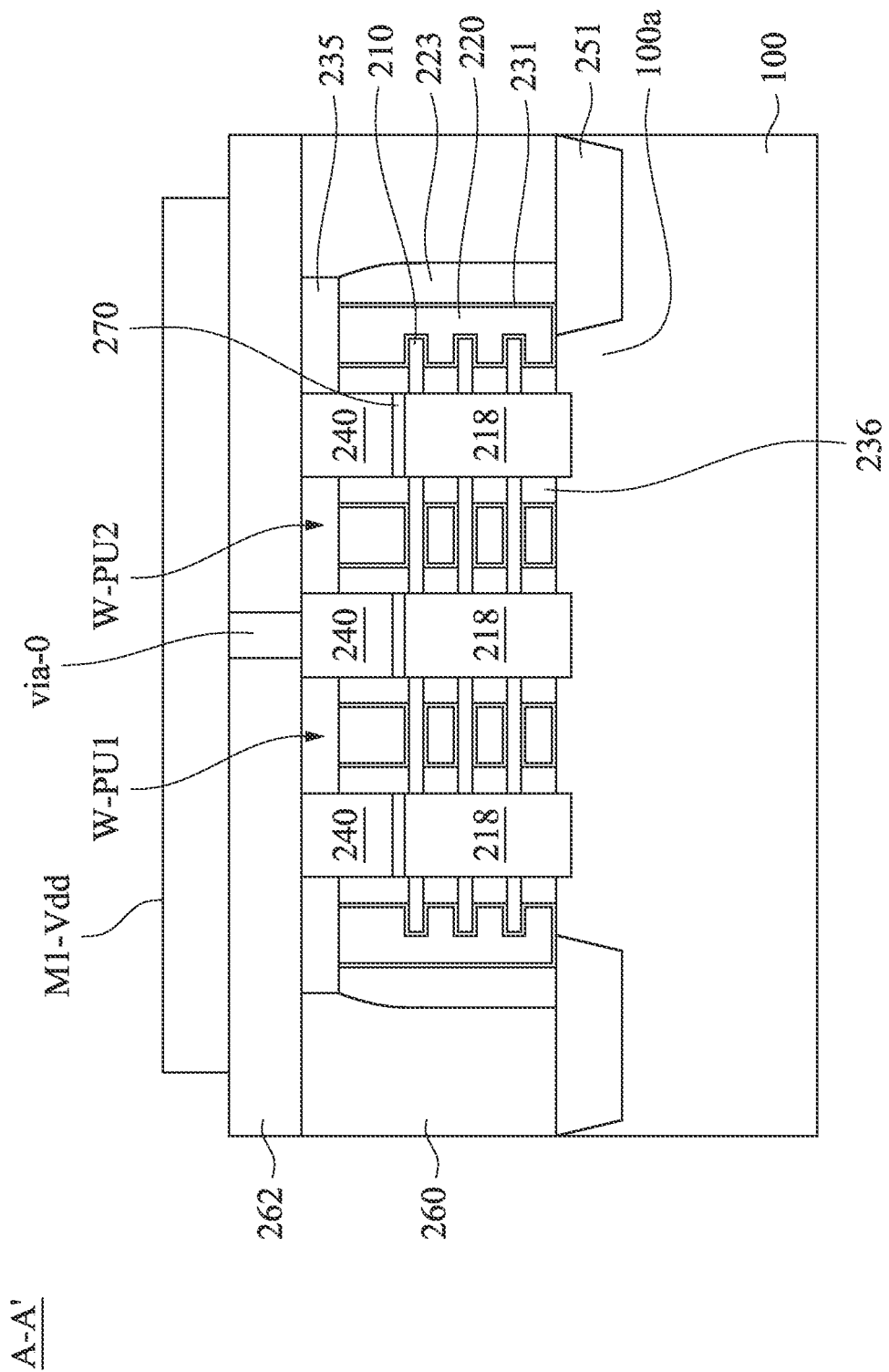
FIGS. 4A, 4B, and 4C illustrate cross-sectional views obtained from reference cross-section A-A', B-B', and C-C' in FIGS. 2A, 2B, and 2C, respectively.
Figure 4B:
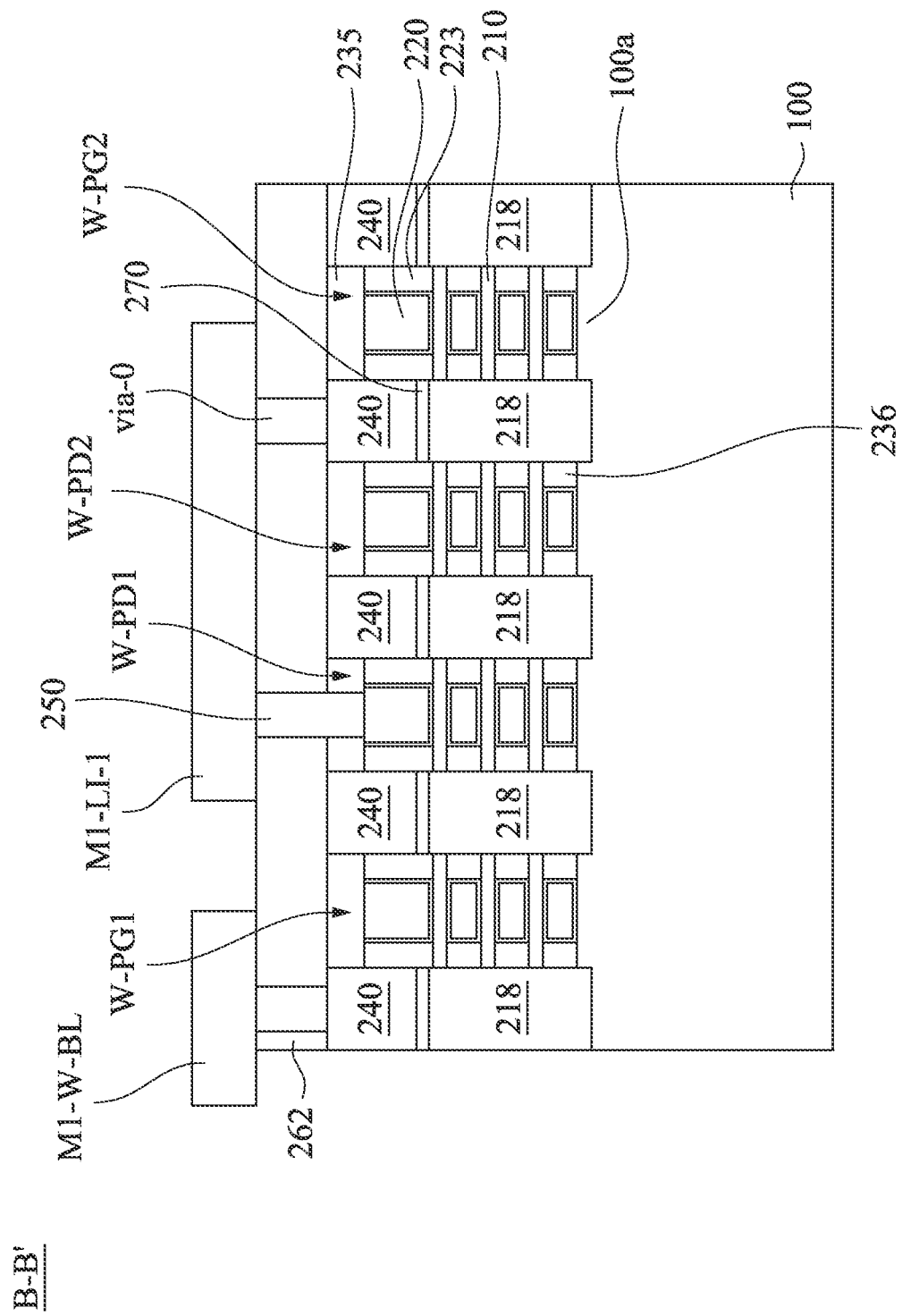
Figure 4C:
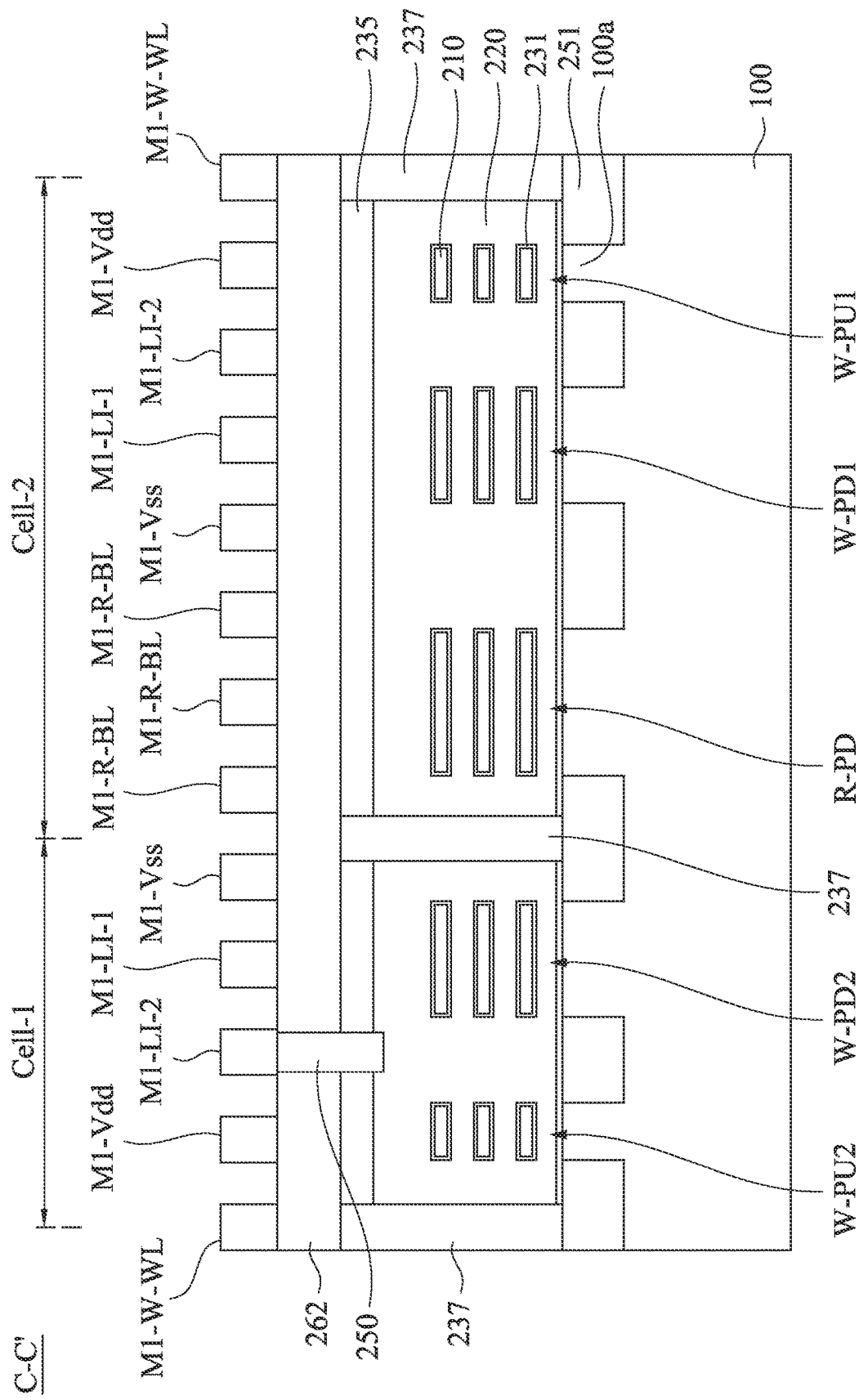

Reference is made to FIGS. 4A, 4B, and 4C. FIGS. 4A, 4B, and 4C illustrate cross-sectional views obtained from reference cross-section A-A', B-B', and C-C' in FIGS. 2A, 2B, and 2C, respectively. A substrate 100 is provided for forming nano-FETs. The substrate 100 may be a semiconductor substrate, such as a bulk semiconductor, a semiconductor-on-insulator (SOI) substrate, or the like, which may be doped (e.g., with a p-type or an n-type impurity) or undoped. The substrate 100 may be a wafer, such as a silicon wafer. Generally, a SOI substrate is a layer of a semiconductor material formed on an insulator layer. The insulator layer may be, for example, a buried oxide (BOX) layer, a silicon oxide layer, or the like. The insulator layer is provided on a substrate, a silicon or glass substrate. Other substrates, such as a multi-layered or gradient substrate may also be used. In some embodiments, the substrate 100 may be a material, such as a III-V compound semiconductor, a II-VI compound semiconductor, or the like. In some embodiments, the semiconductor material of the substrate 100 may include silicon; germanium; a compound semiconductor including silicon carbide, gallium arsenide, gallium stannum, gallium phosphide, indium phosphide, indium arsenide, and/or indium antimonide; an alloy semiconductor including silicon germanium, gallium arsenide phosphide, aluminum indium arsenide, aluminum gallium arsenide, gallium indium arsenide, gallium indium phosphide, and/or gallium indium arsenide phosphide; combinations thereof; or the like.

The substrate 100 has an n-type region and a p-type region. The n-type region can be for forming n-type devices, such as NMOS transistors, e.g., n-type nano-FETs, and the p-type region can be for forming p-type devices, such as PMOS transistors, e.g., p-type nano-FETs. The n-type region may be physically separated from the p-type region (not separately illustrated), and any number of device features (e.g., other active devices, doped regions, isolation structures, etc.) may be disposed between the n-type region and the p-type region.

The substrate 100 may be lightly doped with a p-type or an n-type impurity. An anti-punch-through (APT) implantation may be performed on an upper portion of the substrate 100 to form an APT region. During the APT implantation, impurities may be implanted in the substrate 100. The impurities may have a conductivity type opposite from a conductivity type of source/drain regions that will be subsequently formed in each of the n-type region and the p-type region. The APT region may extend under the source/drain regions in the nano-FETs. The APT region may be used to reduce the leakage from the source/drain regions to the substrate 100. In some embodiments, the doping concentration in the APT region may be in the range of about $10^{18}$ $cm^{-3}$ to about $10^{19}$ $cm^{-3}$.

Trenches T1 formed in the substrate 100 defining a fin strip 100a. In the other words, the fin strip 100a is semiconductor strip patterned in the substrate 100. A shallow trench isolation (STI) structure 251 is formed over the substrate 100 and laterally surrounds the fin strip 100a. In some embodiments, the top surface of the STI structure 251 is coplanar (within process variations) with a top surface of the fin strip 100a. In some embodiments, the top surface of the STI structure 251 is above or below the top surface of the fin strip 100a. In some embodiments, the STI structure 251 may separate the features of adjacent devices.

The channel layers 210 are stacked along the Z-direction over the back-side dielectric 331, and each channel layer 210 is a Si sheet that forms a Si channel layer for the corresponding transistor. Each channel layer 210 between the source/drain regions 218 forms a Si channel layer of the transistor PG1 or PD1 (see FIGS. 3A and 3B), and the Si channel layers of the transistors PG1 and PD1 are surrounded by the gate dielectric layer 231 and the gate electrode layer 220. A gate dielectric layer 231 is formed between the channel layers 210 and the gate electrode layer 220. In some embodiments, the channel layer 210 can be interchangeably referred to as a nanostructure, a semiconductor sheet, or a channel pattern. In some embodiments, channel layer 210 may have a width in a range from about 4 nm to about 7 nm when viewed in X-direction. In some embodiments, the number of stacked channel layers 210 may be between about 2 to about 10. In some embodiments, the thickness of the channel layers 210 may be within a range about 3 nm to about 10 nm. In some embodiments, the channel layers 210 may be Si-base nanowire.

In some embodiments, the gate electrode layer 220 may be made of conductive material, such as aluminum (Al), copper (Cu), tungsten (W), titanium (Ti), tantalum (Ta), or other applicable materials. In some embodiments, the gate structure of the gate electrode layer 220 may include multiple material structure selected from a group consisting of poly gate/SiON structure, metals/high-K dielectric structure, Al/refractory metals/high-K dielectric structure, silicide/high-K dielectric structure, or combination. In some embodiments, the gate electrode layer 220 is formed by a deposition process, such as chemical vapor deposition (CVD), physical vapor deposition (PVD), atomic layer deposition (ALD), high density plasma CVD (HDPCVD), metal organic CVD (MOCVD), or plasma enhanced CVD (PECVD). In some embodiments, the gate dielectric layer 231 is made of silicon oxide ($SiO_x$), silicon nitride ($Si_xN_y$), silicon oxynitride (SiON), dielectric material(s) with high dielectric constant (high-k), or a combination thereof. In some embodiments, the gate dielectric layer 231 is deposited by a plasma enhanced chemical vapor deposition (PECVD) process or by a spin coating process. The high dielectric constant (high-k) material may be hafnium oxide ($HfO_2$), zirconium oxide ($ZrO_2$), lanthanum oxide ($La_2O_3$), yttrium oxide ($Y_2O_3$), aluminum oxide ($Al_2O_3$), titanium oxide ($TiO_2$) or another applicable material. In some embodiments, the gate dielectric layer 231 includes Lanthanum (La) dopant.

One or more work-function layers (not shown) are formed between the gate dielectric layer 231 and the gate electrode layer 220. In some embodiments, the work function layer is made of metal material, and the metal material may include N-work-function metal or P-work-function metal. The N-work-function metal includes tungsten (W), copper (Cu), titanium (Ti), silver (Ag), aluminum (Al), titanium aluminum alloy (TiAl), titanium aluminum nitride (TiAlN), tantalum carbide (TaC), tantalum carbon nitride (TaCN), tantalum silicon nitride (TaSiN), manganese (Mn), zirconium (Zr) or a combination thereof. The P-work-function metal includes titanium nitride (TiN), tungsten nitride (WN), tantalum nitride (TaN), ruthenium (Ru) or a combination thereof.

Source/drain regions 218 may include Si with Boron (e.g., B 11) content. In some embodiments, the source/drain regions 218 are formed by epitaxially growing Boron in Si material. In some embodiments, the source/drain regions 218 may include materials and/or dopants that achieve desired tensile stress and/or compressive stress in the channel layer. In some embodiments, the source/drain regions 218 can be interchangeably referred to epitaxial structures, source/drain structures, or source/drain patterns. Source/drain silicide regions 270 (see FIGS. 4A and 4B) are formed on the source/drain regions 218. The source/drain contacts 240 (see FIGS. 4A and 4B) are formed on the source/drain silicide regions 270.

Gate spacers 233 (see FIGS. 4A and 4B) are formed on the sidewalls of the gate electrode layers 220. In some embodiments, the gate spacer 233 may be made of silicon nitride or silicon oxynitride, although any suitable material, such as low-dielectric constant (low-k) materials having a k-value less than about 3.5, may be utilized. In some embodiments, the inner spacer 236 may have a higher K (dielectric constant) value than the gate spacer 233. In some embodiments, the material of inner spacer is selected from a group including $SiO_2$, $Si_3N_4$, SiON, SiOC, SiOCN base dielectric material, air gap, or combinations thereof. Inner spacers 236 (see FIGS. 4A and 4B) act as isolation features and may be formed between the source/drain regions 218 and the gate electrode layers 220. In some embodiments, the inner spacers 236 can be interchangeably referred to lower gate spacers. In some embodiments, the inner spacers 236 may have a lateral dimension in a range from about 4 nm to about 12 nm. In some embodiments, the inner spacers 236 may be made of silicon nitride or silicon oxynitride, although any suitable material, such as low-dielectric constant (low-k) materials having a k-value less than about 3.5, may be utilized. In some embodiments, the inner spacer 236 may have a higher K (dielectric constant) value than the gate spacer 233. In some embodiments, the material of inner spacer is selected from a group including $SiO_2$, $Si_3N_4$, SiON, SiOC, SiOCN base dielectric material, air gap, or combinations thereof.

Hard mask layer 235 is formed over the gate electrode layers 220 and the gate spacers 233. In some embodiments, the hard mask layer 235 can be interchangeably referred to a gate top dielectric. In some embodiments, the hard mask layer 235 may be made of dielectric material. In some embodiments, the top surface of the hard mask layer 235 may be aligned with the top surfaces of the source/drain contacts 240 (see FIGS. 4A and 4B). In some embodiments, the top surface of the hard mask layer 235 may be lower than the top surfaces of the source/drain contacts 240. In some embodiments, the hard mask layer 235 may be made of a nitride-based material, such as $Si_3N_4$, SiON, or a carbon-based material, such as SiC, SiOC, SiOCN, or combinations thereof. In some embodiments, the hard mask layer 235 may include $SiO_x$, SiBN, SiCBN, other suitable dielectric materials, or combinations thereof. In some embodiments, the hard mask layer 235 may include a metal oxide, such as be hafnium oxide ($HfO_2$), zirconium oxide ($ZrO_2$), lanthanum oxide ($La_2O_3$), yttrium oxide ($Y_2O_3$), aluminum oxide ($Al_2O_3$), tantalum oxide ($Ta_2O_5$), titanium oxide ($TiO_2$), another applicable material, or combinations thereof. The hard mask layer 235 has different etch selectivity than the spacers 90 and/or the ILD layer 262, so as to selective etch back the hard mask layer 235.

Isolation structures 237 (see FIG. 4C) can act as gate-cut structures for the gate structures corresponding to the gate electrode layers 220, and the gate-cut structure is formed by a cut metal gate (CMG) process. In some embodiments, the isolation structure 237 can be interchangeably referred to dielectric line, gate end dielectrics, isolation structure or isolation strip, dielectric strip, or dielectric regions in the semiconductor structure. In some embodiments, the isolation structure 237 may be formed of or comprise $SiO_2$, SiOC, SiOCN, or the like, or combinations thereof. In some embodiments, the isolation lines 237 may be made of a nitride-based material, such as $Si_3N_4$, or a carbon-based material, such as SiOCN, or combinations thereof. In some embodiments, the isolation lines 237 may be made of a metal oxide material. In some embodiments, the isolation lines 237 may be made of a material having a dielectric constant greater than about 9 (e.g., high dielectric constant (high-k) material). For example, the isolation lines 237 may be made of a high dielectric constant (high-k) material, such as be hafnium oxide ($HfO_2$), zirconium oxide ($ZrO_2$), lanthanum oxide ($La_2O_3$), yttrium oxide ($Y_2O_3$), aluminum oxide ($Al_2O_3$), tantalum oxide ($Ta_2O_5$), titanium oxide ($TiO_2$), another applicable material, or combinations thereof. The isolation lines 237 may be formed of a homogenous material, or may have a composite structure including more than one layer. The isolation lines 237 may include dielectric liners, which may be formed of, for example, silicon oxide. In some embodiments, the dielectric material of the isolation lines 237 comprises SiN, and the deposition is performed using process gases including dichlorosilane and ammonia.

Inter-layer dielectric (ILD) layers 260 (see FIG. 4A) are formed between the gate electrode layers 220 and over the source/drain regions 218. The ILD layer 262 is formed over the hard mask layer 235 and the ILD layers 260. In some embodiments, the ILD layers 260 and 262 may be formed of an oxide such as Phospho-Silicate Glass (PSG), Boro-Silicate Glass (BSG), Boron-Doped Phospho-Silicate Glass (BPSG), Tetra Ethyl Ortho Silicate (TEOS) oxide, or the like. In some embodiments, the source/drain contacts 240 are formed in the ILD layer 260 to land on the source/drain regions 218. In some embodiments, the source/drain vias via-0 (see FIGS. 4A and 4B) are formed in the ILD layer 262 to land on the source/drain contacts 240. In some embodiments, the gate vias 250 (see FIGS. 4B and 4C) are formed to pass through the ILD layer 262 and the hard mask layers 235 and lands on the corresponding gate electrode layers 220. In some embodiments, the source/drain contacts 240, the source/drain via via-0, and/or the gate via 250 may include a metal-containing material such as titanium nitride, titanium oxide, tungsten, cobalt, ruthenium, aluminum, copper, combinations thereof, multi-layers thereof, or the like. The metal lines including power supply voltage lines M1-Vdd, M1-Vss, a write word-line M1-W-WL, a write bit-line-bar M1-W-BL-Bar, a write bit-line M1-W-BL, a read bit-line M1-R-BL, a read word-line M1-R-WL, and local connection lines M1-LI-1, M1-LI-2 may be formed over the ILD layer 262 to electrically connect to the corresponding gate vias 250 or the corresponding source/drain vias via-0. In some embodiments, materials of the metal lines may be made of a conductive material, such as Cu, Co, Ru, Pt, Al, W, Ti, TaN, TiN, or any combinations thereof. In some embodiments, the power supply voltage lines M1-Vdd, M1-Vss, the write word-line M1-W-WL, the write bit-line-bar M1-W-BL-Bar, the write bit-line M1-W-BL, the read bit-line M1-R-BL, the read word-line M1-R-WL, and the local connection lines M1-LI-1, M1-LI-2 can be interchangeably referred to conductive lines, metal lines, or line patterns.

Figure 5A:
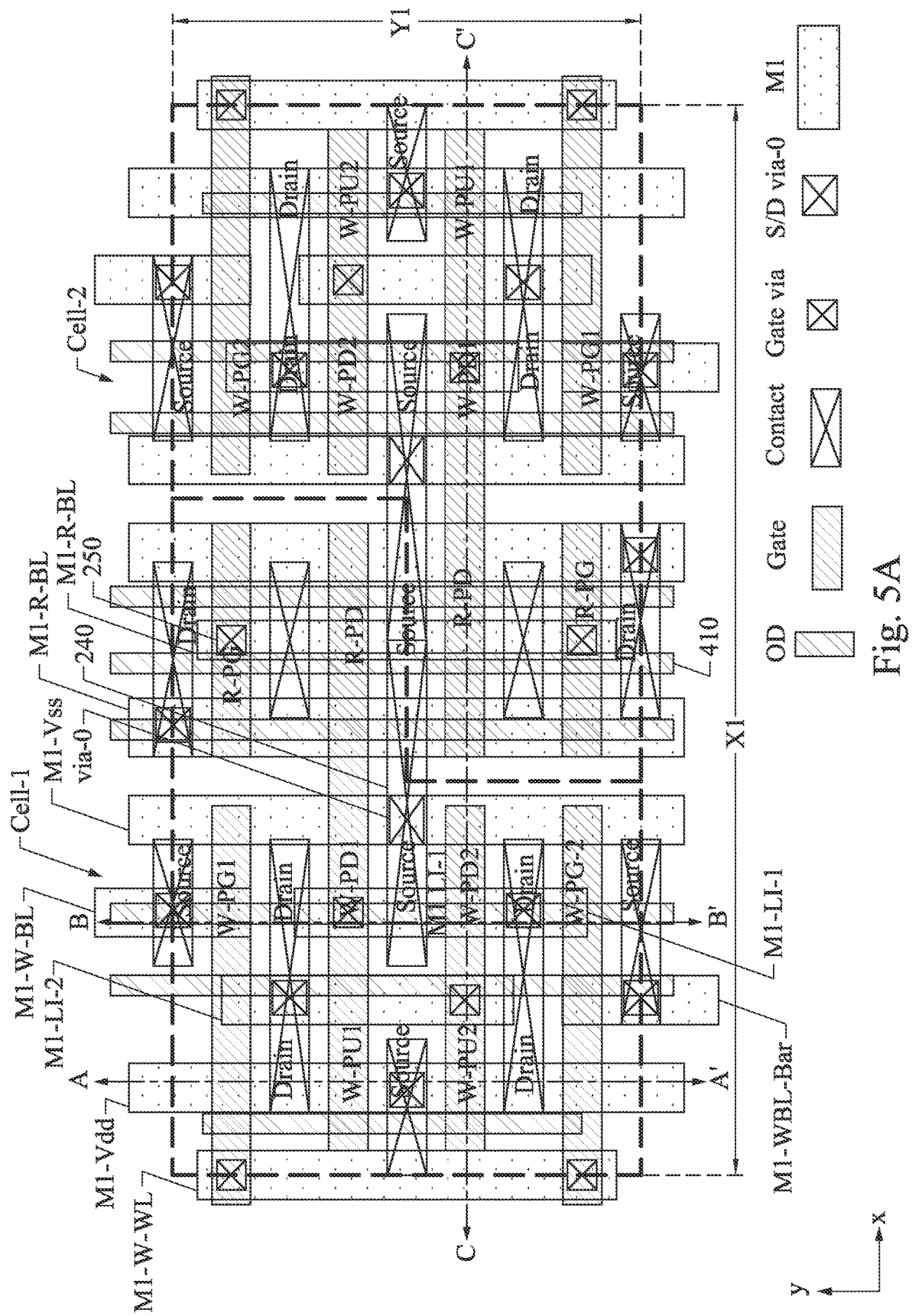
FIG. 5A illustrates a cell array layout diagram of a circuit according to some embodiments of the present disclosure.
Figure 5B:
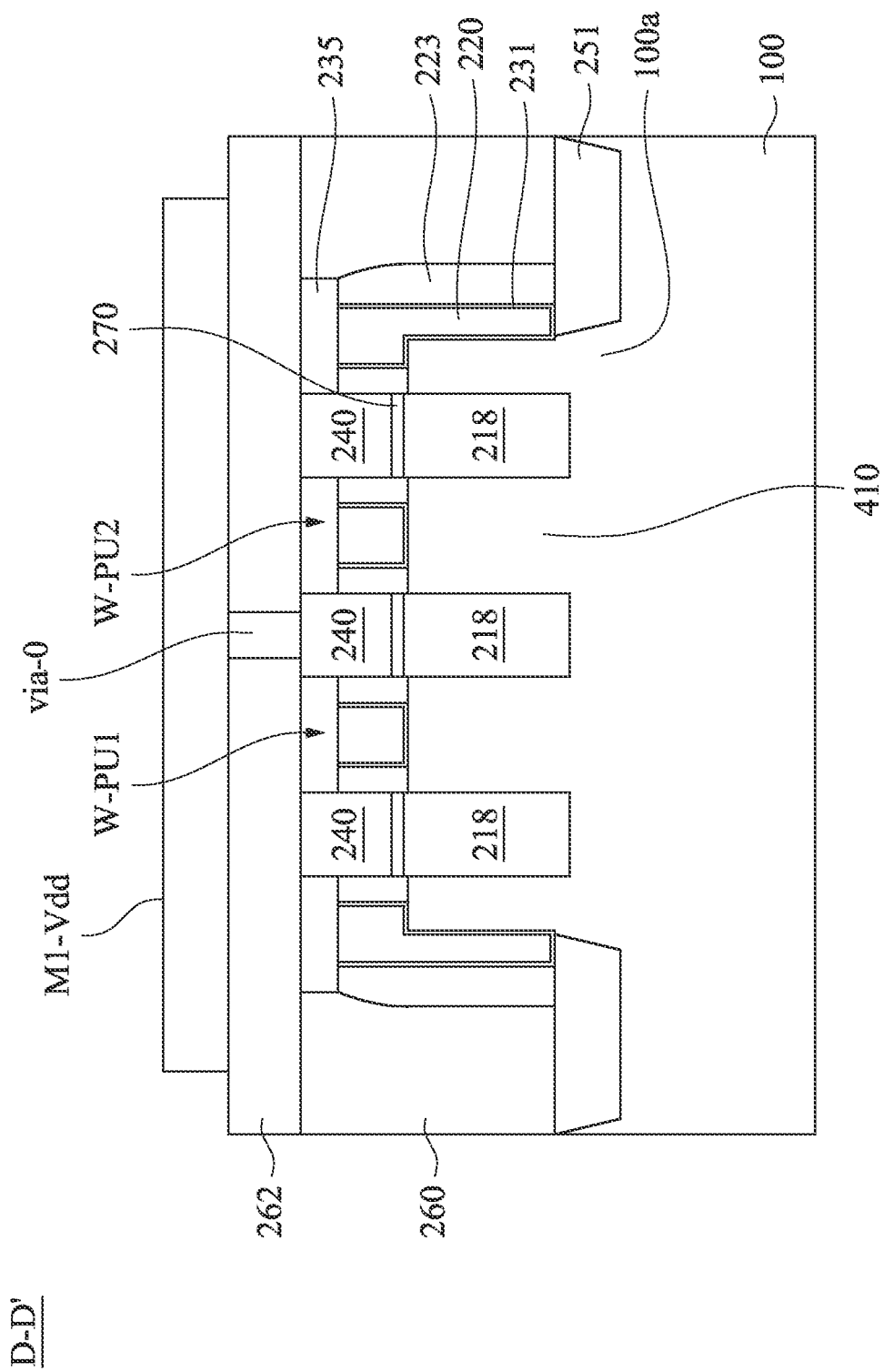
FIGS. 5B, 5C, and 5D illustrate cross-sectional views obtained from reference cross-section D-D', E-E', and F-F' in FIG. 5A, respectively.
Figure 5C:
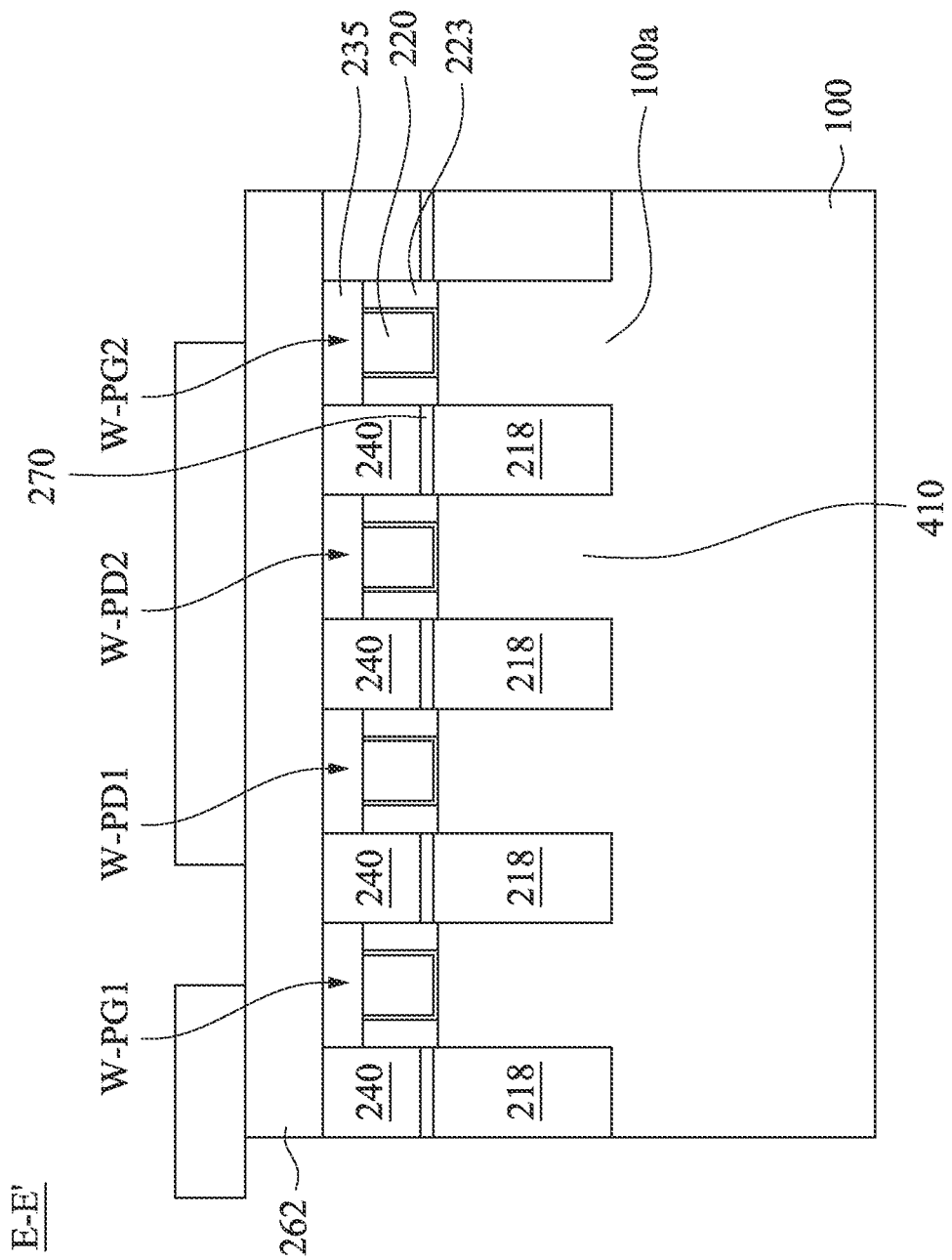
Figure 5D:
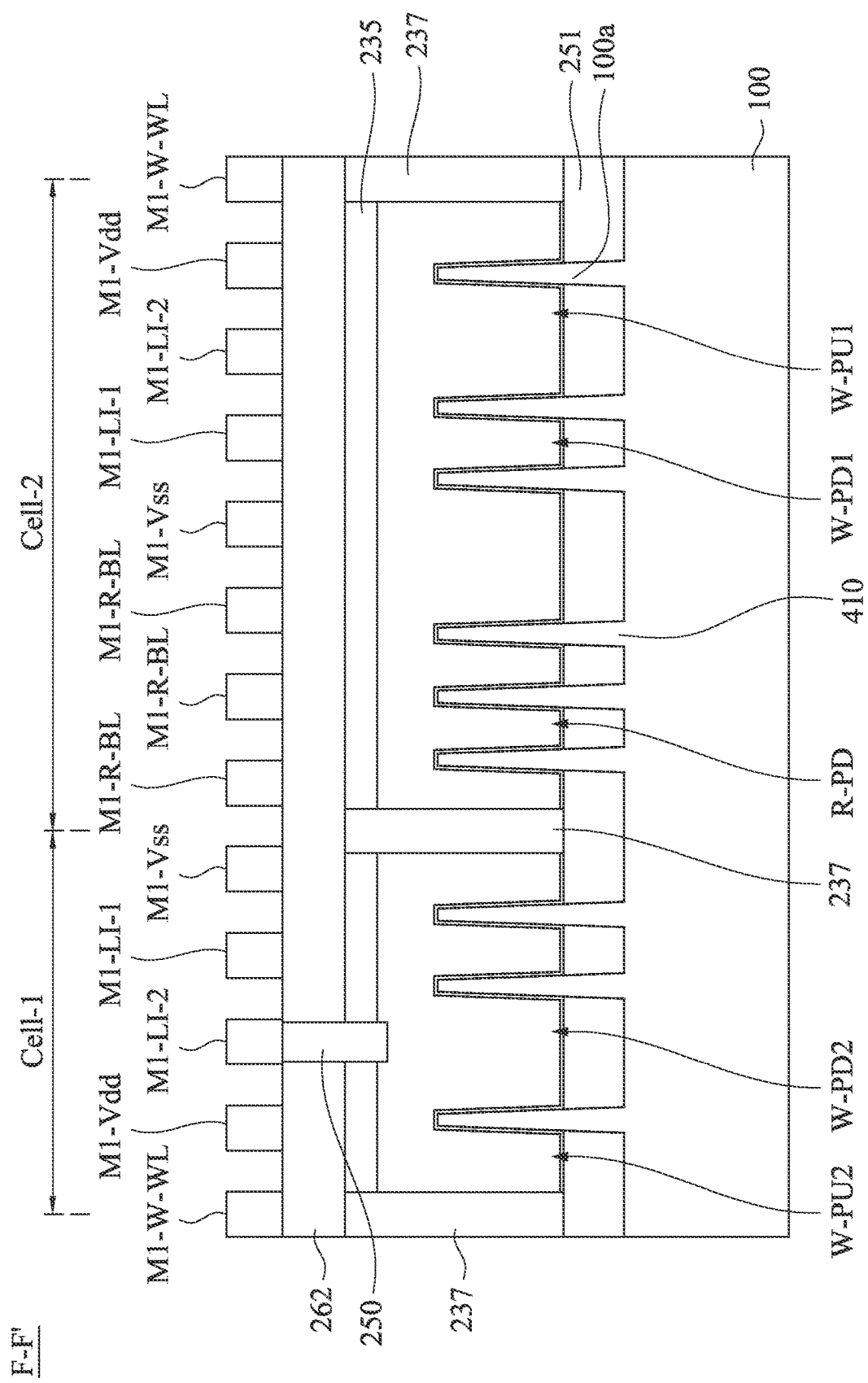

Reference is made to FIGS. 5A to 5D. FIG. 5A illustrates a cell array layout diagram of a circuit according to some embodiments of the present disclosure. FIGS. 5B, and 5D illustrate cross-sectional views obtained from reference cross-section D-D', E-E', and F-F' in FIG. 5A, respectively. While FIGS. 5A to 5D show an embodiment of the semiconductor structure with channel layers 410 having different profiles than the channel layers 210 in FIGS. 2A-2C and 4A-4C. In addition, the present disclosure may repeat reference numerals and/or letters in the various examples. This repetition is for the purpose of simplicity and clarity and does not in itself dictate a relationship between the various embodiments and/or configurations discussed. As shown in FIG. 5A to 5D, the channel layers 410 can be fin-like structures. Therefore, the transistors as shown in FIGS. 5A to 5D can be fin-like field-effect transistor (FinFET) devices. The FinFET device, for example, may be a complementary metal-oxide-semiconductor (CMOS) device including a P-type metal-oxide-semiconductor (PMOS) FinFET device and an N-type metal-oxide-semiconductor (NMOS) FinFET device. The following disclosure will continue with one or more FinFET examples to illustrate various embodiments of the present disclosure. It is understood, however, that the application should not be limited to a particular type of device, except as specifically claimed.

The fins may be patterned by any suitable method. For example, the fins may be patterned using one or more photolithography processes, including double-patterning or multi-patterning processes. The double-patterning or the multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers may then be used to pattern the fins.

Figure 6:
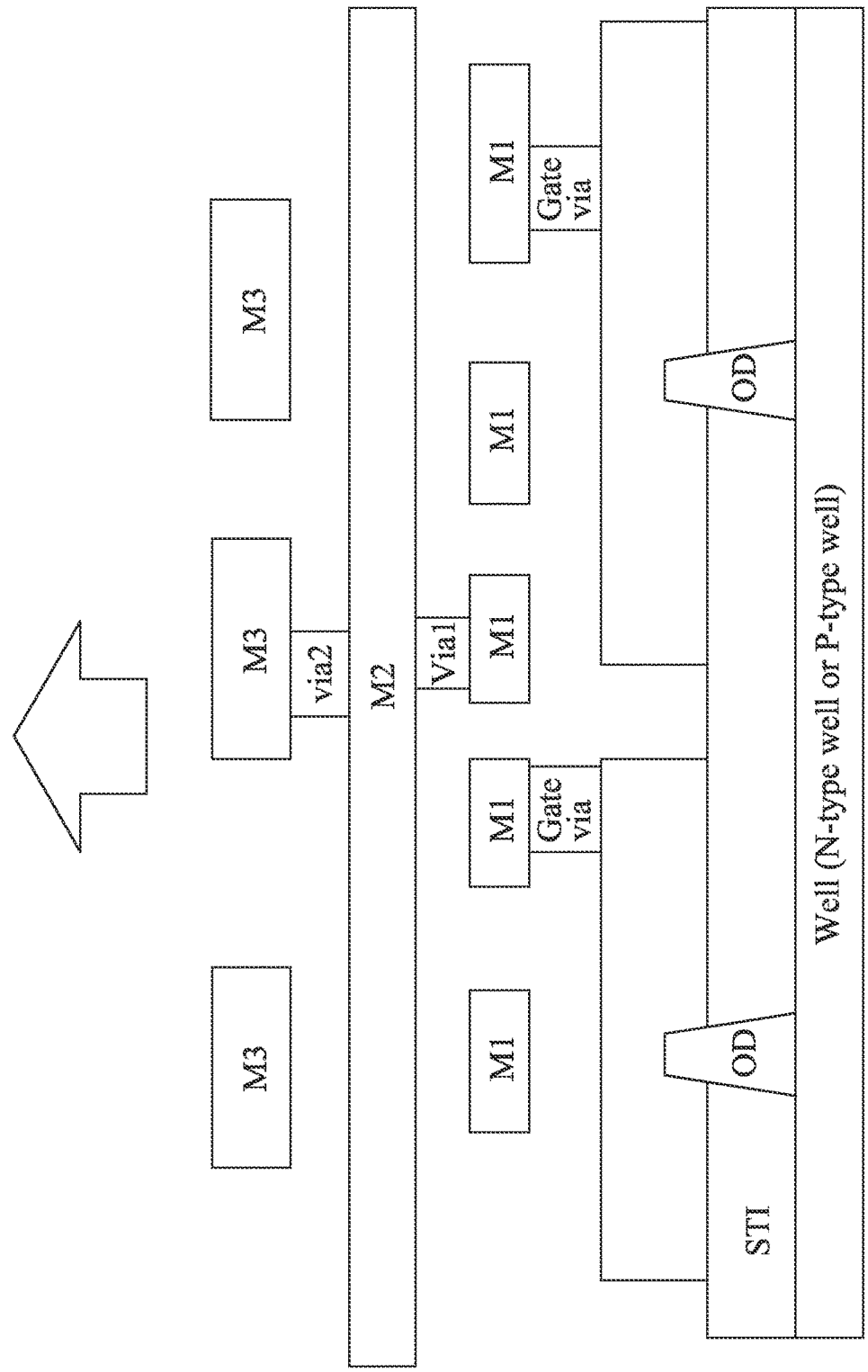
FIG. 6 illustrates a schematic view of a semiconductor structure in accordance with some embodiments of the present disclosure.

Reference is made to FIG. 6. FIG. 6 illustrates a schematic view of a semiconductor structure in accordance with some embodiments of the present disclosure. FIG. 6 illustrates a schematic cross-sectional view of a plurality of layers involved in SRAM cell, which layers are formed on a semiconductor chip or wafer. It is noted that FIG. 6 is schematically illustrated to show various levels of interconnect structure and transistors, and may not reflect the actual cross-sectional view of SRAM cell. The interconnect structure includes a contact level, an OD (wherein the term "OD" represents "active region") level, via levels, such as gate via level, vial level and Via2 level, and metal-layer levels, such as M1 level, M2 level, and M3 level. Each of the illustrated levels includes one or more dielectric layers and the conductive features formed therein. The conductive features that are at the same level may have top surfaces substantially level to each other, bottom surfaces substantially level to each other, and may be formed simultaneously. The contact level may include gate vias (also referred to as contact plugs) for connecting gate electrodes of transistors (such as the illustrated exemplary transistors) to an overlying level such as the gate via level.

Reference is made to FIGS. 7A to 19C. FIGS. 7A to 19C illustrate the cross-sectional views of intermediate stages in the formation of a semiconductor structure in accordance with some embodiments. FIGS. 7A, 8A, 9A, 10A, 11A, 12A, 13A, 14A, 15A, 16A, 17A, 18A, and 19A illustrate cross-sectional views obtained from the reference cross-section A-A' in FIGS. 2A, 2B, and 2C of intermediate stages in the formation of a semiconductor structure in accordance with some embodiments. FIGS. 7B, 8B, 9B, 10B, 11B, 12B, 13B, 14B, 15B, 16B, 17B, 18B, and 19B illustrate cross-sectional views obtained from the reference cross-section B-B' in FIGS. 2A, 2B, and 2C of intermediate stages in the formation of a semiconductor structure in accordance with some embodiments. FIGS. 7C, 8C, 9C, 10C, 11C, 12C, 13C, 14C, 15C, 16C, 17C, 18C, and 19C illustrate cross-sectional views obtained from the reference cross-section C-C' in FIGS. 2A, 2B, and 2C of intermediate stages in the formation of a semiconductor structure in accordance with some embodiments.

Reference is made to FIGS. 7A, 7B, and 7C. A substrate 100 is provided for forming nano-FETs. The substrate 100 may be a semiconductor substrate, such as a bulk semiconductor, a semiconductor-on-insulator (SOI) substrate, or the like, which may be doped (e.g., with a p-type or an n-type impurity) or undoped. The substrate 100 may be a wafer, such as a silicon wafer. Generally, a SOI substrate is a layer of a semiconductor material formed on an insulator layer. The insulator layer may be, for example, a buried oxide (BOX) layer, a silicon oxide layer, or the like. The insulator layer is provided on a substrate, typically a silicon or glass substrate. Other substrates, such as a multi-layered or gradient substrate may also be used. In some embodiments, the semiconductor material of the substrate 100 may include silicon; germanium; a compound semiconductor including silicon carbide, gallium arsenide, gallium phosphide, indium phosphide, indium arsenide, and/or indium antimonide; an alloy semiconductor including silicon germanium, gallium arsenide phosphide, aluminum indium arsenide, aluminum gallium arsenide, gallium indium arsenide, gallium indium phosphide, and/or gallium indium arsenide phosphide; combinations thereof; or the like.

Subsequently, a multi-layer stack 42 is formed over the substrate 100. The multi-layer stack 42 includes alternating first semiconductor layers 310' and second semiconductor layers 210'. The first semiconductor layers 310' formed of a first semiconductor material, and the second semiconductor layers 210' are formed of a second semiconductor material. The semiconductor materials may each be selected from the candidate semiconductor materials of the substrate 100. In some embodiments, the multi-layer stack 42 includes two layers of each of the first semiconductor layers 310 and the second semiconductor layers 210'. It should be appreciated that the multi-layer stack 42 may include any number of the first semiconductor layers 310' and the second semiconductor layers 210'.

In some embodiments, and as will be subsequently described in greater detail, the first semiconductor layers 310' will be removed and the second semiconductor layers 210' will patterned to form channel layers for the nano-FETs. The first semiconductor layers 310' are sacrificial layers (or dummy layers); which will be removed in subsequent processing to expose the top surfaces and the bottom surfaces of the second semiconductor layers 210'. The first semiconductor material of the first semiconductor layers 310' is a material that has a high etching selectivity from the etching of the second semiconductor layers 210', such as silicon germanium. The second semiconductor material of the second semiconductor layers 210' is a material suitable for both n-type and p-type devices, such as silicon.

In some embodiments, the first semiconductor material of the first semiconductor layers 310' may be made of a material, such as silicon germanium (e.g., $Si_xGe_{1-x}$, where x can be in the range of 0 to 1), pure germanium, a III-V compound semiconductor, a II-VI compound semiconductor, or the like. The second semiconductor material of the second semiconductor layers 210' may be made of a material, such as silicon, silicon carbide, a III-V compound semiconductor, a II-VI compound semiconductor, or the like. The first semiconductor material and the second semiconductor material may have a high etching selectivity from the etching of one another. Each of the layers of the multi-layer stack 42 may be grown by a process such as vapor phase epitaxy (VPE) or molecular beam epitaxy (MBE), deposited by a process such as chemical vapor deposition (CVD) or atomic layer deposition (ALD), or the like. In some embodiments, the multi-layer stack 42 may have a thickness in a range from about 70 to 120 nm, such as about 70, 80, 90, 100, 110, or 120 nm. In some embodiments, each of the layers may have a small thickness, such as a thickness in a range of about 5 nm to about 40 nm. In some embodiments, some layers (e.g., the second semiconductor layers 210') are formed to be thinner than other layers (e.g., the first semiconductor layers 310'). For example, in embodiments in which the first semiconductor layers 310' are sacrificial layers (or dummy layers) and the second semiconductor layers 210' are patterned to form channel layers for the nano-FETs as shown in FIGS. 3A and 3B.

Figure 8C:
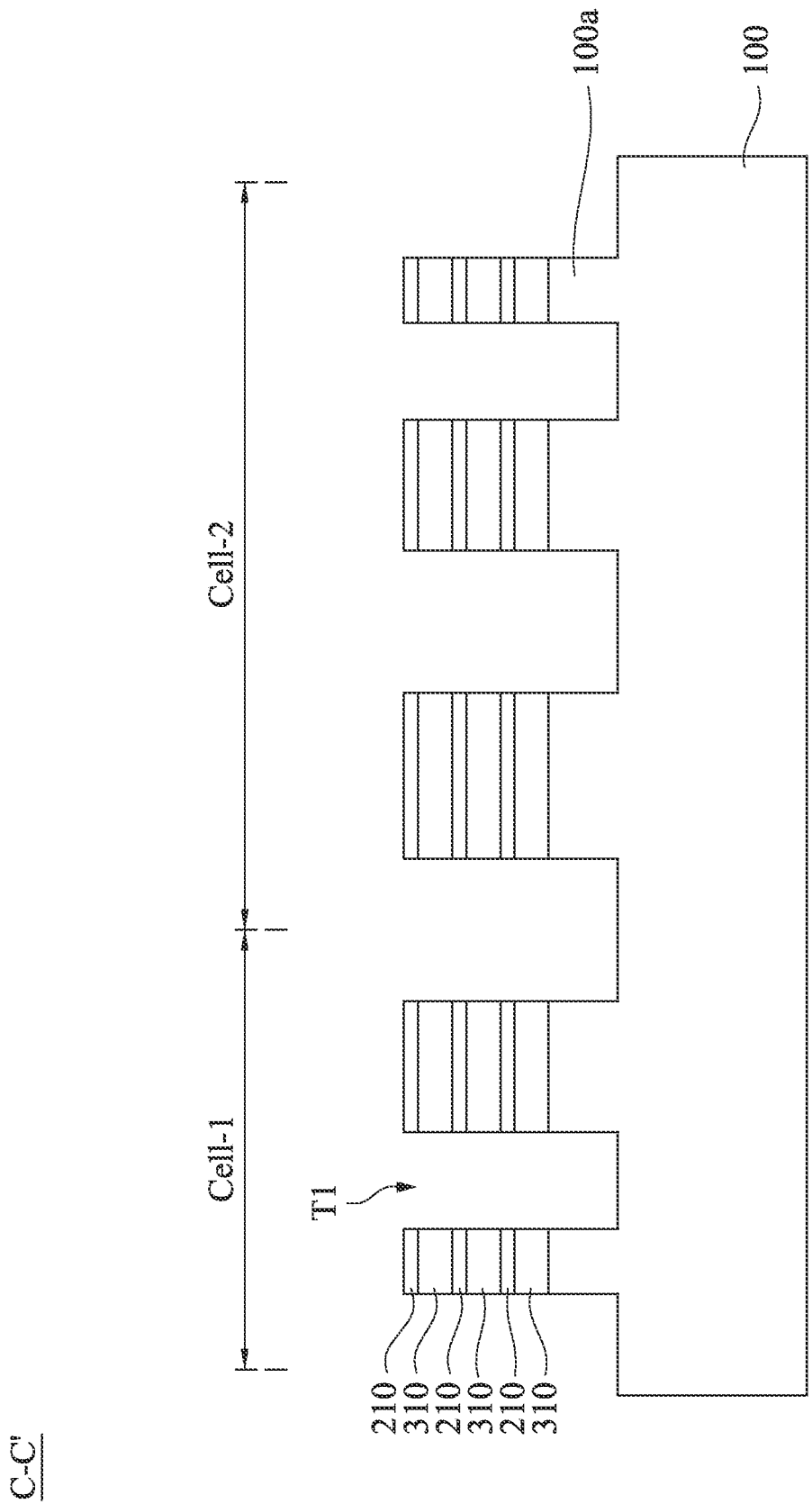

Reference is made to FIGS. 8A, 8B, and 8C. Trenches T1 are patterned in the substrate 100 and the multi-layer stack 42 to form fin strips 100a, first semiconductor sheets 310, and second channel layers 210. The fin strips 100a are semiconductor strips patterned in the substrate 100. The first semiconductor sheets 310 and the second channel layers 210 include the remaining portions of the first semiconductor layers 310' and the second semiconductor layers 210', respectively. The trenches T1 may be patterned by any acceptable etch process, such as a reactive ion etch (RIE), neutral beam etch (NBE), the like, or a combination thereof. The etching may be anisotropic.

The fin strips 100a and the first and second semiconductor sheets 310, 210 may be patterned by any suitable method. For example, the fin strips 100a and the first and second semiconductor sheets 310, 210 may be patterned using one or more photolithography processes, including double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers may then be used as masks to pattern the fin strips 100a and the first and second semiconductor sheets 310, 210. In some embodiments, the mask (or other layer) may remain on the first and second semiconductor sheets 310, 210. The fin strips 100a and the first and second semiconductor sheets 310, 210 may each have widths in a range of about 8 nm to about nm. In some embodiments, the fin strips 100a and the first and second semiconductor sheets 310, 210 have substantially equal widths.

Figure 9A:
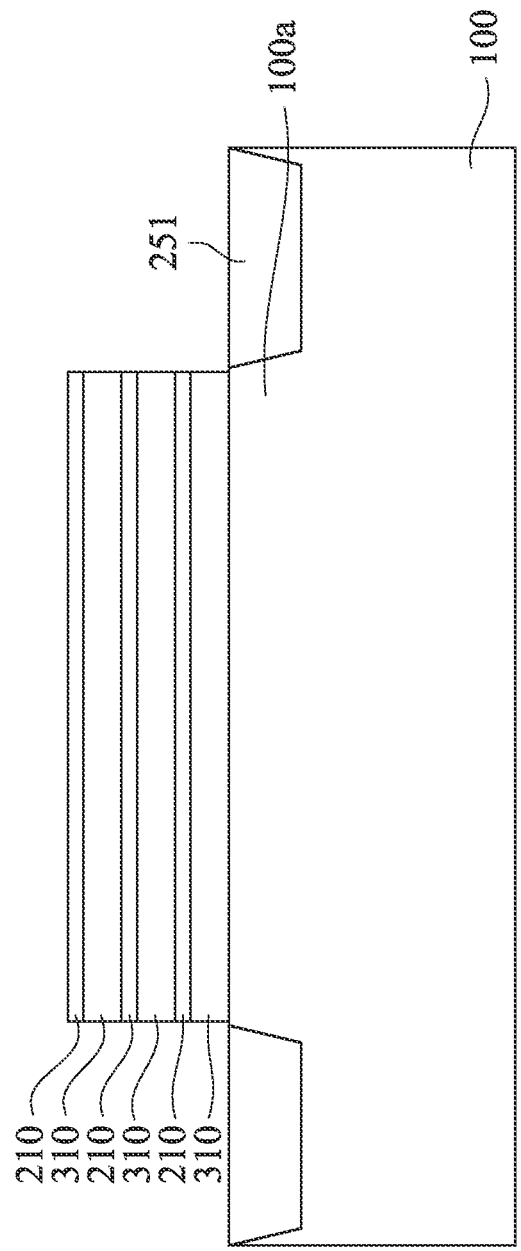
Figure 9B:
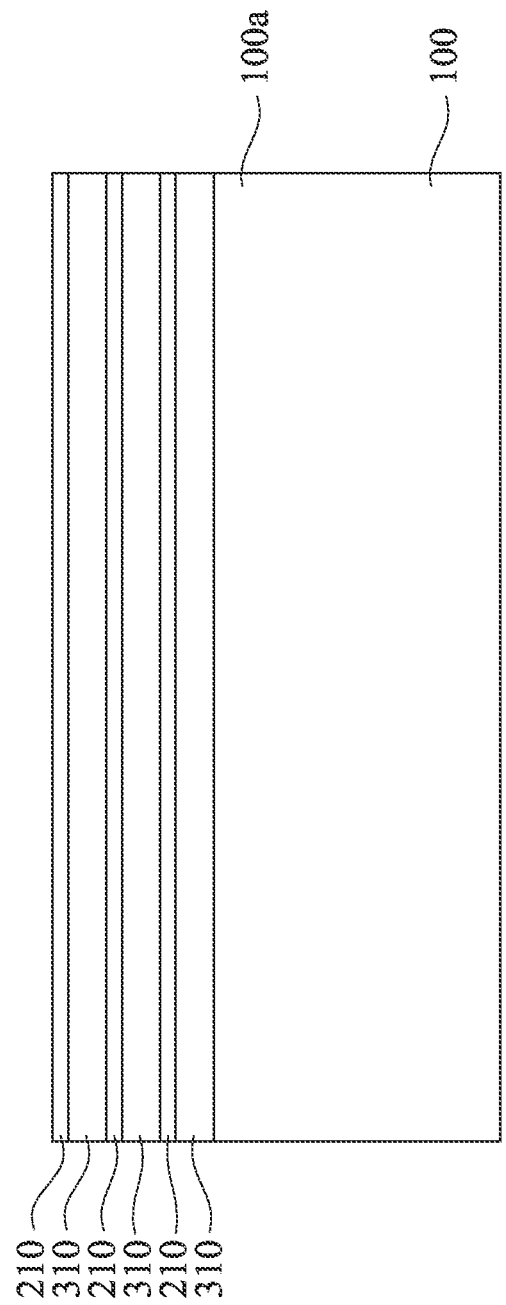
Figure 9C:
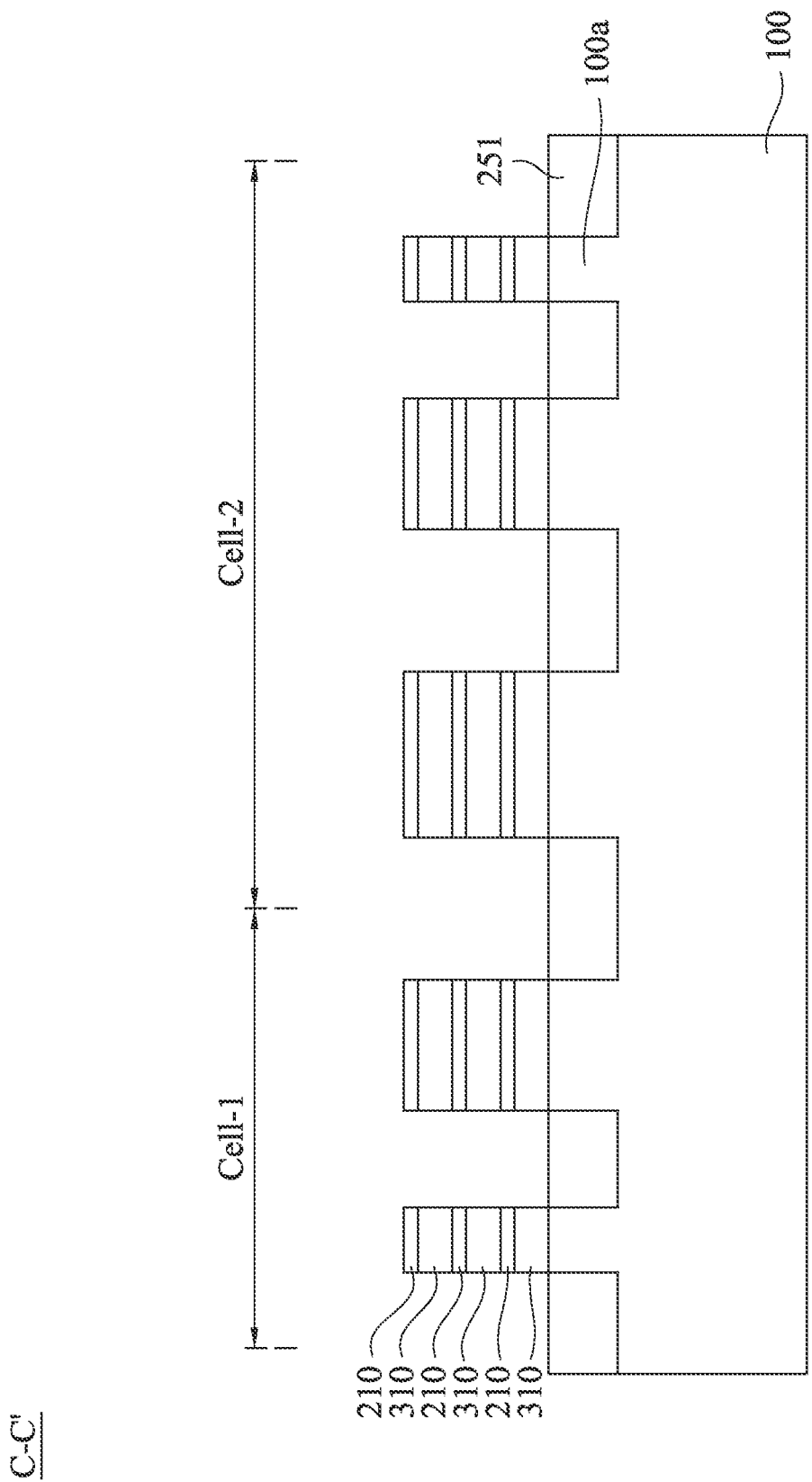

Reference is made to FIGS. 9A, 9B, and 9C. Shallow trench isolation (STI) structures 251 are formed over the substrate 100 and between adjacent fin strips 100a. The STI structures 251 are disposed around at least a portion of the fin strips 100a such that at least a portion of the first and second semiconductor sheets 310, 210 protrude from between adjacent STI structures 251. In some embodiments, the top surfaces of the STI structures 251 are coplanar (within process variations) with the top surfaces of the fin strips 100a. In some embodiments, the top surfaces of the STI structures 251 are above or below the top surfaces of the fin strips 100a. The STI structures 251 separate the features of adjacent devices.

The STI structures 251 may be formed by any suitable method. For example, an insulation material can be formed over the substrate 100 and the first and second semiconductor sheets 310, 210, and between adjacent fin strips 100a. The insulation material may be an oxide, such as silicon oxide, a nitride, such as silicon nitride, the like, or a combination thereof, which may be formed by a chemical vapor deposition (CVD) process, such as high density plasma CVD (HDP-CVD), flowable chemical vapor deposition (FCVD), the like, or a combination thereof. Other insulation materials formed by any acceptable process may be used. In some embodiments, the insulation material is silicon oxide formed by FCVD. An anneal process may be performed once the insulation material is formed. In an embodiment, the insulation material is formed such that excess insulation material covers the first and second semiconductor sheets 310, 210. Although the STI structures 251 are each illustrated as a single layer, some embodiments may utilize multiple layers. For example, in some embodiments a liner (not separately illustrated) may first be formed along surfaces of the substrate 100, the fin strips 100a, and the first and second semiconductor sheets 310, 210. Thereafter, a fill material, such as those previously described may be formed over the liner.

A removal process is then applied to the insulation material to remove excess insulation material over the first and second semiconductor sheets 310, 210. In some embodiments, a planarization process such as a chemical mechanical polish (CMP), an etch-back process, combinations thereof, or the like may be utilized. In embodiments in which a mask remains on the first and second semiconductor sheets 310, 210, the planarization process may expose the mask or remove the mask. After the planarization process, the top surfaces of the insulation material and the mask (if present) or the first and second semiconductor sheets 310, 210 are coplanar (within process variations). Accordingly, the top surfaces of the mask (if present) or the first and second semiconductor sheets 310, 210 are exposed through the insulation material. In some embodiments, no mask remains on the first and second semiconductor sheets 310, 210. The insulation material is then recessed to form the STI structures 251. The insulation material is recessed, such as in a range from about 30 nm to about 80 nm, such that at least a portion of the first and second semiconductor sheets 310, 210 protrude from between adjacent portions of the insulation material. Further, the top surfaces of the STI structures 251 may have a flat surface as illustrated, a convex surface, a concave surface (such as dishing), or a combination thereof. The top surfaces of the STI structures 251 may be formed flat, convex, and/or concave by an appropriate etch. The insulation material may be recessed using any acceptable etching process, such as one that is selective to the material of the insulation material (e.g., selectively etches the insulation material of the STI structures 251 at a faster rate than the materials of the fin strips 100a and the first and second semiconductor sheets 310, 210). For example, an oxide removal may be performed using dilute hydrofluoric (dHF) acid.

The process previously described is just one example of how the fin strips 100a and the first and second semiconductor sheets 310, 210 may be formed. In some embodiments, the fin strips 100a and/or the first and second semiconductor sheets 310, 210 may be formed using a mask and an epitaxial growth process. For example, a dielectric layer can be formed over a top surface of the substrate 100, and trenches can be etched through the dielectric layer to expose the underlying substrate 100. Epitaxial structures can be epitaxially grown in the trenches, and the dielectric layer can be recessed such that the epitaxial structures protrude from the dielectric layer to form the fin strips 100a and/or the first and second semiconductor sheets 310, 210. The epitaxial structures may include the alternating semiconductor materials previously described, such as the first semiconductor material and the second semiconductor material. In some embodiments where epitaxial structures are epitaxially grown, the epitaxially grown materials may be in situ doped during growth, which may obviate prior and/or subsequent implantations, although in situ and implantation doping may be used together.

Figure 10A:
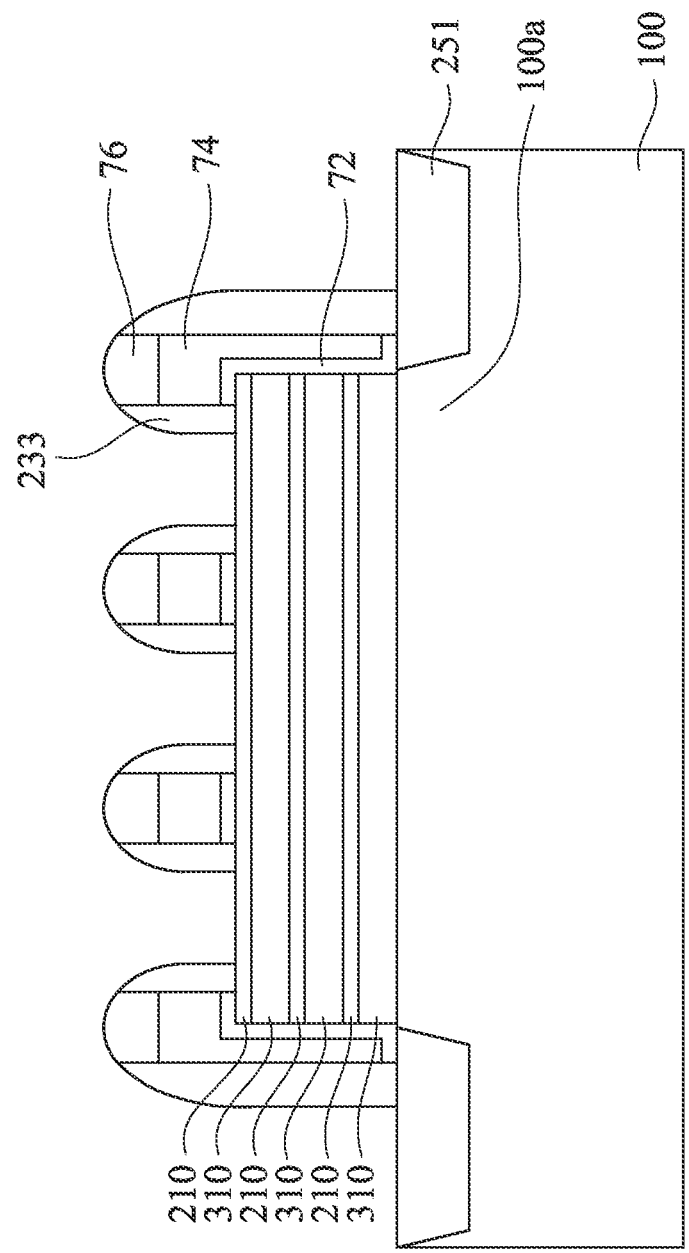
Figure 10B:
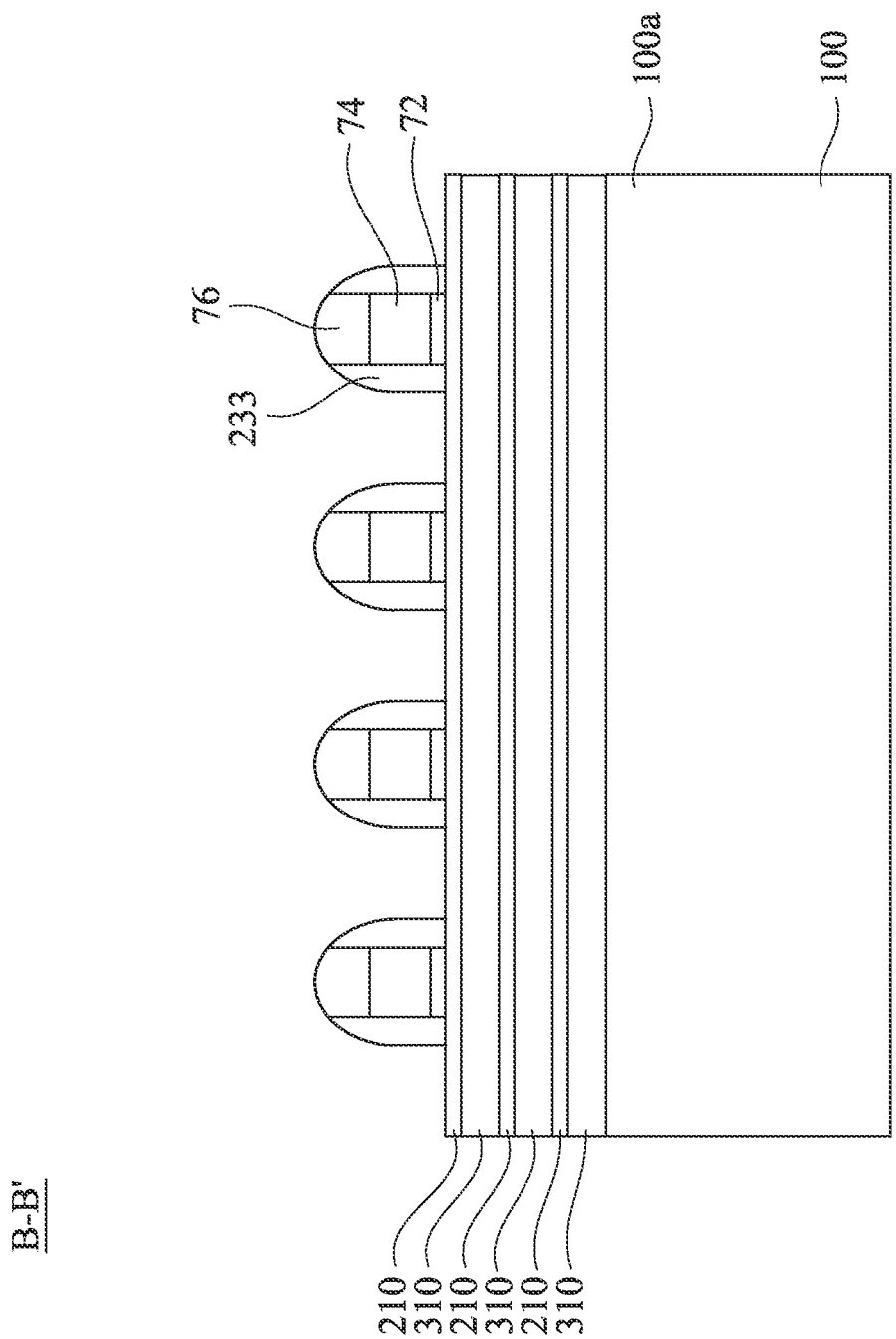
Figure 10C:
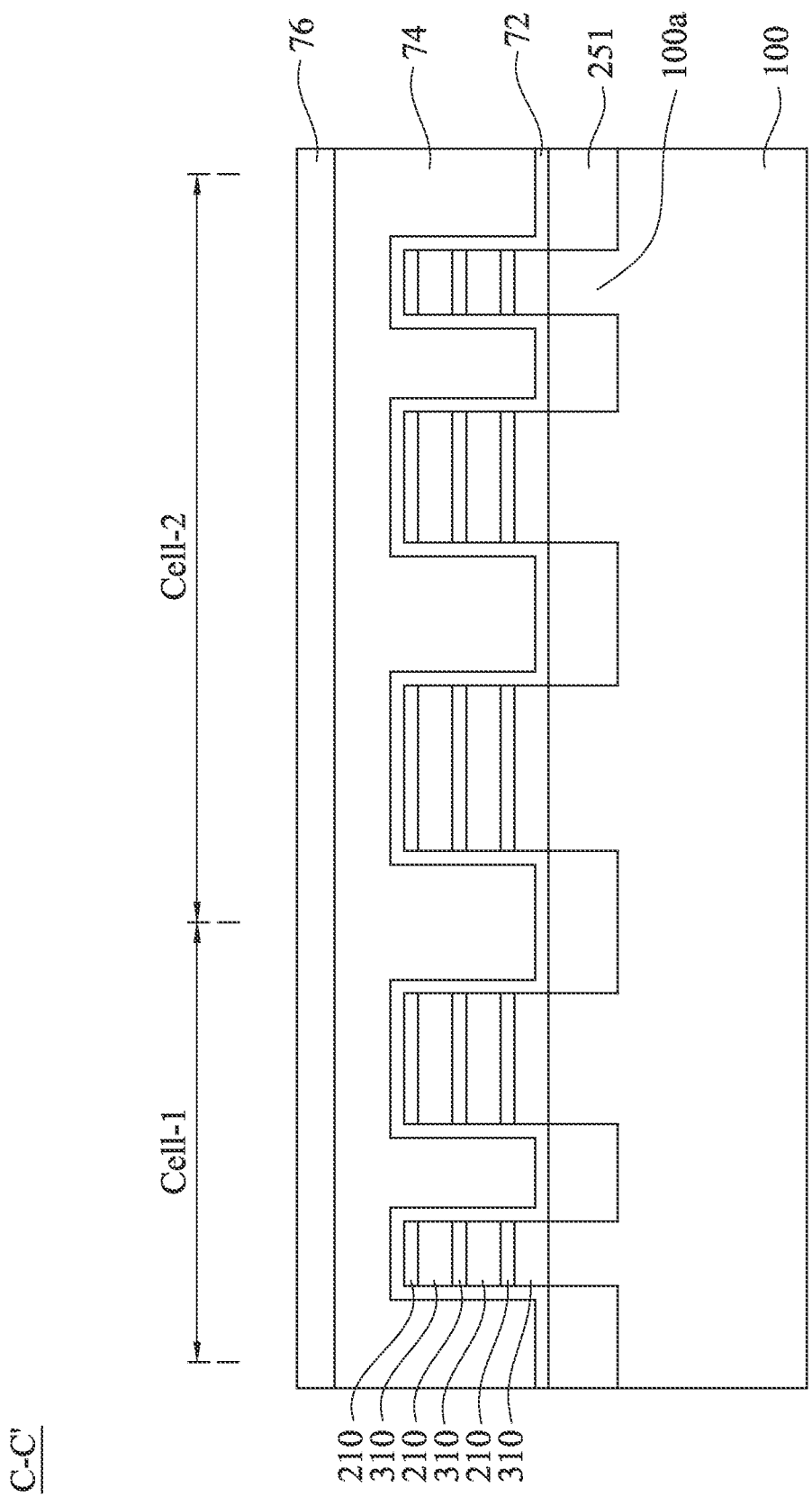

Reference is made to FIGS. 10A, 10B, and 10C. A dummy dielectric layer, a dummy gate layer, and a mask layer are sequentially formed on the fin strips 100a and the first and second semiconductor sheets 310, 210. The dummy dielectric layer is formed on the fin strips 100a and the first and second semiconductor sheets 310, 210. The dummy dielectric layer may be formed of a dielectric material such as silicon oxide, silicon nitride, a combination thereof, or the like, which may be deposited or thermally grown according to acceptable techniques. Subsequently, a dummy gate layer is formed over the dummy dielectric layer. Subsequently, a mask layer is formed over the dummy gate layer. The dummy gate layer may be deposited over the dummy dielectric layer and then planarized, such as by a CMP. The mask layer may be deposited over the dummy gate layer. The dummy gate layer may be formed of a conductive or non-conductive material, such as amorphous silicon, polycrystalline-silicon (polysilicon), poly-crystalline silicon-germanium (poly-SiGe), a metal, a metallic nitride, a metallic silicide, a metallic oxide, or the like, which may be deposited by physical vapor deposition (PVD), CVD, or the like. The dummy gate layer may be formed of material(s) that have a high etching selectivity from the etching of insulation materials, e.g., the STI structures 251 and/or the dummy dielectric layer. The mask layer may be formed of a dielectric material such as silicon nitride, silicon oxynitride, or the like. In some embodiments, the dummy dielectric layer covers the fin strips 100a, the first and second semiconductor sheets 310, 210, and the STI structures 251, such that the dummy dielectric layer extends over the STI structures 251 and between the dummy gate layer and the STI structures 251. In another embodiment, the dummy dielectric layer covers only the fin strips 100a and the first and second semiconductor sheets 310, 210.

The mask layer is patterned using acceptable photolithography and etching techniques to form masks 76. The pattern of the masks 76 is then transferred to the dummy gate layer by any acceptable etching technique to form dummy gates 74. The pattern of the masks 76 may optionally be further transferred to the dummy dielectric layer by any acceptable etching technique to form dummy dielectrics 72. The dummy gates 84 cover portions of the first and second semiconductor sheets 310, 210 that will be exposed in subsequent processing to form channel layers. Specifically, the dummy gates 84 extend along the portions of the second channel layers 210 that will be patterned to form channel layers. The pattern of the masks 76 may be used to physically separate adjacent dummy gates 74. The dummy gates 74 may also have lengthwise directions substantially perpendicular (within process variations) to the lengthwise directions of the fin strips 100a. The masks 76 can optionally be removed after patterning, such as by any acceptable etching technique.

Gate spacers 233 (see FIGS. 10A and 10B) are formed over the first and second semiconductor sheets 310, 210, on exposed sidewalls of the masks 76 (if present), the dummy gates 74, and the dummy dielectrics 72. In some embodiments, the gate spacers 233 can be interchangeably referred to top spacers or upper gate spacers. In some embodiments, the gate spacers 233 may have a lateral dimension in a range from about 4 nm to about 12 nm. In some embodiments, the gate spacer 233 may include multiple dielectric material and selected from a group consist of $SiO_2$, $Si_3N_4$, carbon doped oxide, nitrogen doped oxide, porous oxide, air gap, or combinations thereof. The gate spacers 233 may be formed by conformally depositing one or more dielectric material(s) and subsequently etching the dielectric material(s). Acceptable dielectric materials may include silicon oxide, silicon nitride, silicon oxynitride, silicon oxycarbonitride, or the like, which may be formed by a conformal deposition process such as chemical vapor deposition (CVD), plasma-enhanced chemical vapor deposition (PECVD), atomic layer deposition (ALD), plasma-enhanced atomic layer deposition (PEALD), or the like. Other insulation materials formed by any acceptable process may be used. Any acceptable etch process, such as a dry etch, a wet etch, the like, or a combination thereof, may be performed to pattern the dielectric material(s). The etching may be anisotropic. The dielectric material(s), when etched, have portions left on the sidewalls of the dummy gates 74 (thus forming the gate spacers 233).

Figure 11A:
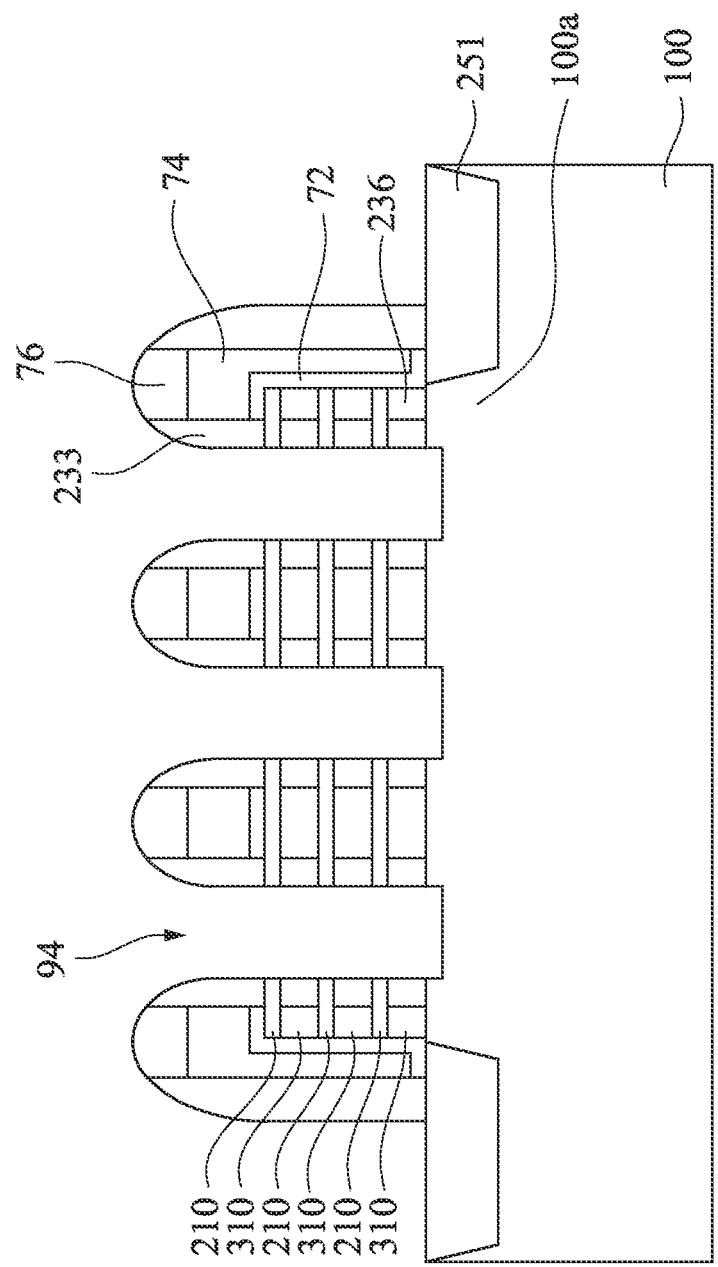
Figure 11B:
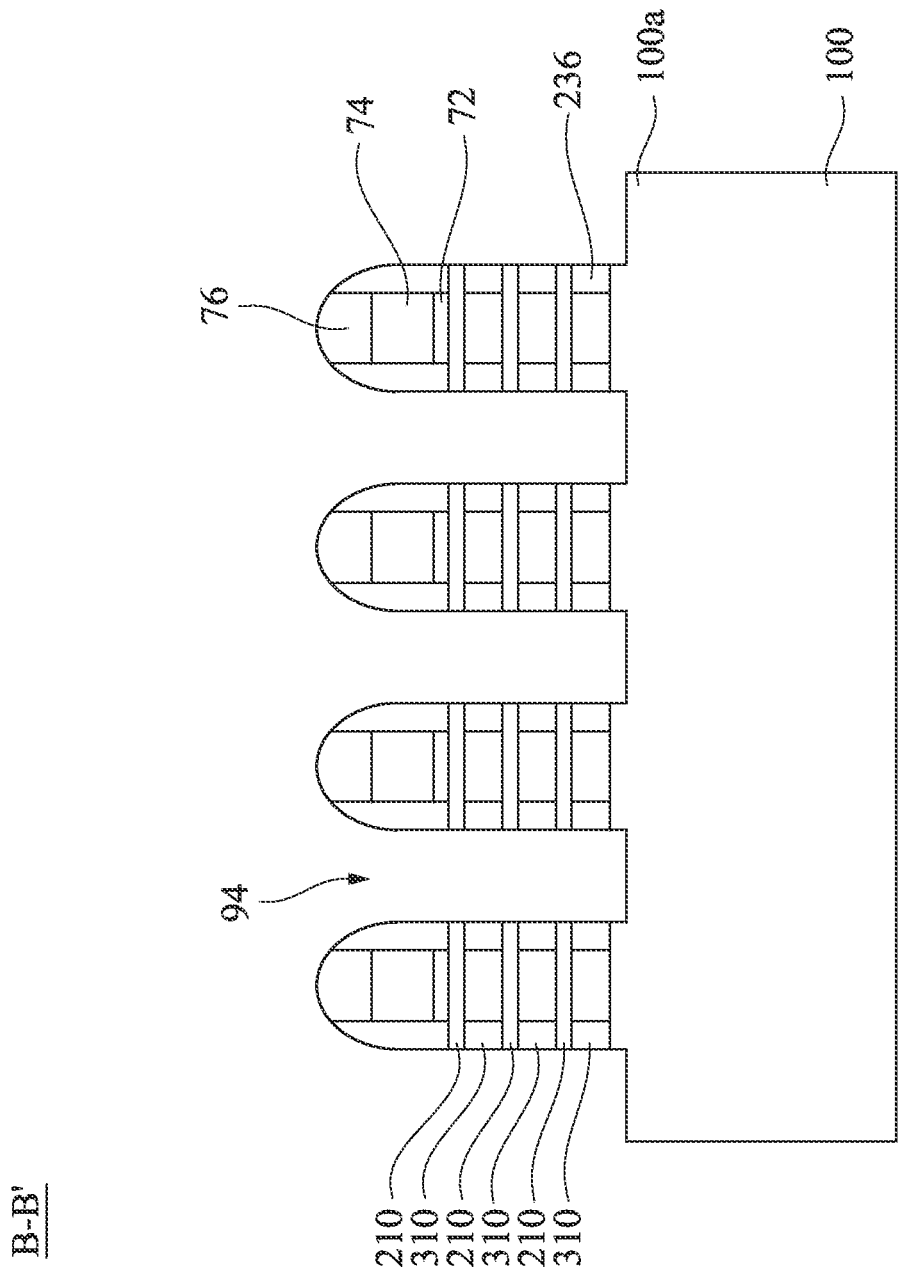
Figure 11C:
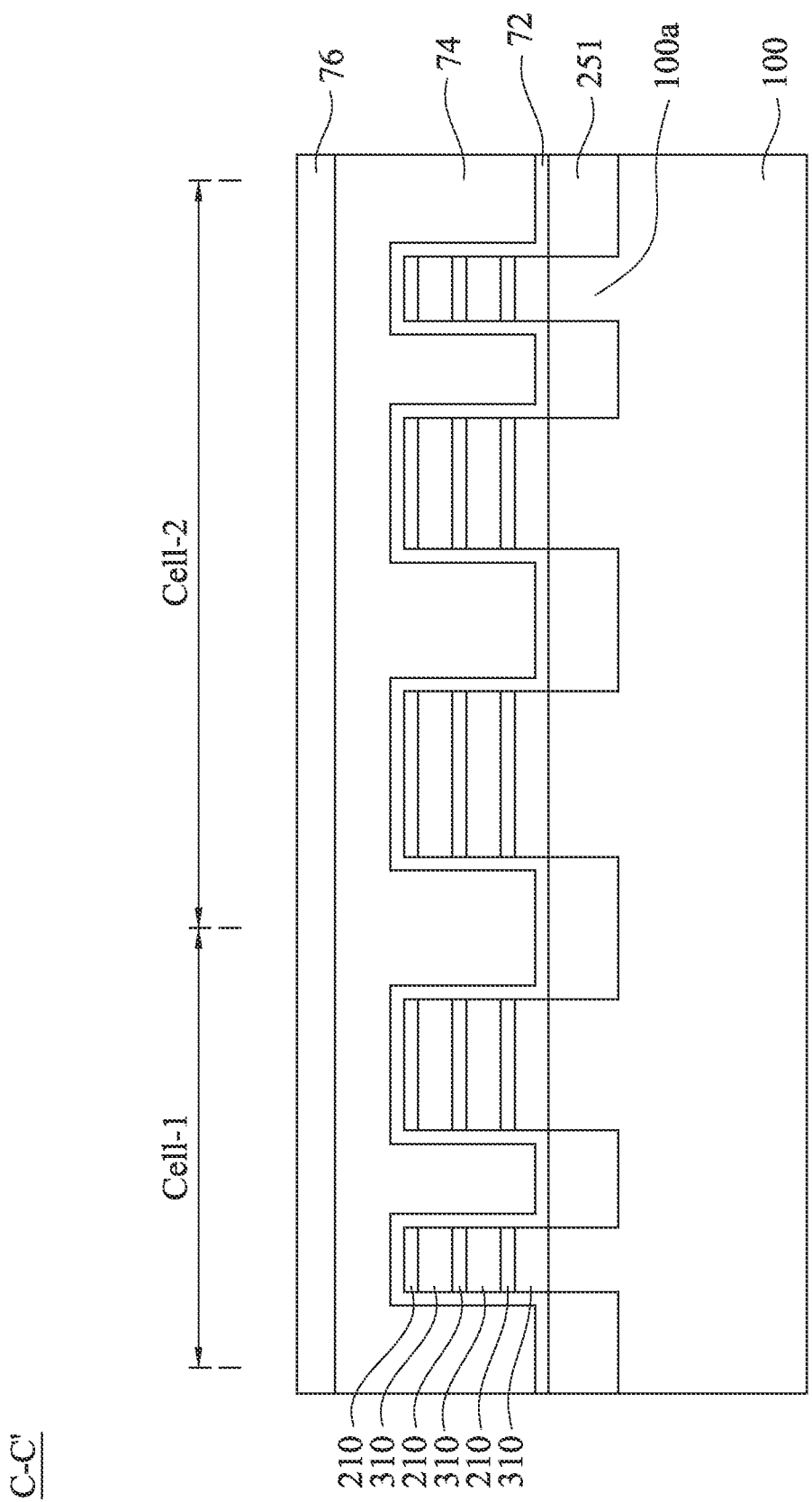

Reference is made to FIGS. 11A, 11B, and 11C. Source/drain recesses 94 (see FIGS. 11A and 11B) are formed in the first and second semiconductor sheets 310, 210. In some embodiments, the source/drain recesses 94 extend through the first and second semiconductor sheets 310, 210 and into the fin strips 100a. In some embodiments, the fin strips 100a may be etched such that bottom surfaces of the source/drain recesses 94 are disposed below the top surfaces of the STI structures 251. The source/drain recesses 94 may be formed by etching the first and second semiconductor sheets 310, 210 using an anisotropic etching processes, such as a RIE, a NBE, or the like. The gate spacers 233 and the dummy gates 74 collectively mask portions of the fin strips 100a and/or the first and second semiconductor sheets 310, 210 during the etching processes used to form the source/drain recesses 94. A single etch process may be used to etch each of the first and second semiconductor sheets 310, 210, or multiple etch processes may be used to etch the first and second semiconductor sheets 310, 210. Timed etch processes may be used to stop the etching of the source/drain recesses 94 after the source/drain recesses 94 reach a desired depth.

Subsequently, inner spacers 236 (see FIGS. 11A and 11B) are formed on sidewalls of the remaining portions of the first semiconductor sheets 310, e.g., those sidewalls exposed by the source/drain recesses 94. As will be subsequently described in greater detail, source/drain regions will be subsequently formed in the source/drain recesses 94, and the first semiconductor sheets 310 will be subsequently replaced with corresponding gate structures. The inner spacers 236 act as isolation features between the subsequently formed source/drain regions and the subsequently formed gate structures. Further, the inner spacers 236 may be used to substantially prevent damage to the subsequently formed source/drain regions by subsequent etching processes, such as etching processes used to subsequently remove the first semiconductor sheets 310. In some embodiments, the inner spacers 236 can be interchangeably referred to lower gate spacers. In some embodiments, the inner spacers 236 may have a lateral dimension in a range from about 4 nm to about 12 nm.

As an example to form the inner spacers 236, the source/drain recesses 94 can be laterally expanded. Specifically, portions of the sidewalls of the first semiconductor sheets 310 exposed by the source/drain recesses 94 may be recessed. Although sidewalls of the first semiconductor sheets 310 are illustrated as being straight, the sidewalls may be concave or convex. The sidewalls may be recessed by any acceptable etching process, such as one that is selective to the material of the first semiconductor sheets 310 (e.g., selectively etches the material of the first semiconductor sheets 310 at a faster rate than the material of the second channel layers 210). The etching may be isotropic. For example, when the second channel layers 210 are formed of silicon and the first semiconductor sheets 310 are formed of silicon germanium, the etching process may be a wet etch using tetramethylammonium hydroxide (TMAH), ammonium hydroxide ($NH_4OH$), or the like. In another embodiment, the etching process may be a dry etch using a fluorine-based gas such as hydrogen fluoride (HF) gas. In some embodiments, the same etching process may be continually performed to both form the source/drain recesses 94 and recess the sidewalls of the first semiconductor sheets 310. The inner spacers 236 can then be formed by conformally forming an insulating material and subsequently etching the insulating material. The insulating material may be silicon nitride or silicon oxynitride, although any suitable material, such as low-dielectric constant (low-k) materials having a k-value less than about 3.5, may be utilized. In some embodiments, the inner spacer 236 may have a higher K (dielectric constant) value than the gate spacer 233. In some embodiments, the material of inner spacer is selected from a group including $SiO_2$, $Si_3N_4$, SiON, SiOC, SiOCN base dielectric material, air gap, or combinations thereof. The insulating material may be deposited by a conformal deposition process, such as ALD, CVD, or the like. The etching of the insulating material may be anisotropic. For example, the etching process may be a dry etch such as a RIE, a NBE, or the like. Although outer sidewalls of the inner spacers 236 are illustrated as being flush with respect to the sidewalls of the gate spacers 233, the outer sidewalls of the inner spacers 236 may extend beyond or be recessed from the sidewalls of the gate spacers 233. In other words, the inner spacers 236 may partially fill, completely fill, or overfill the sidewall recesses. Moreover, although the sidewalls of the inner spacers 236 are illustrated as being straight, the sidewalls of the inner spacers 236 may be concave or convex.

Figure 12A:
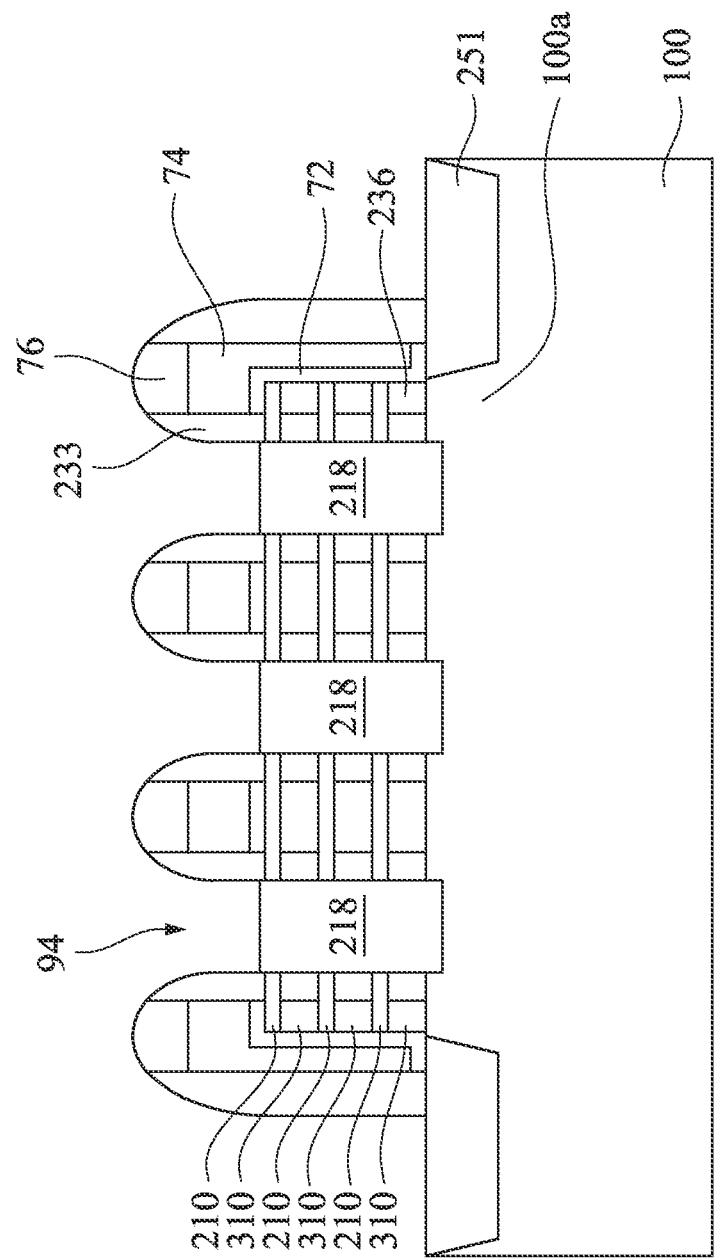
Figure 12B:
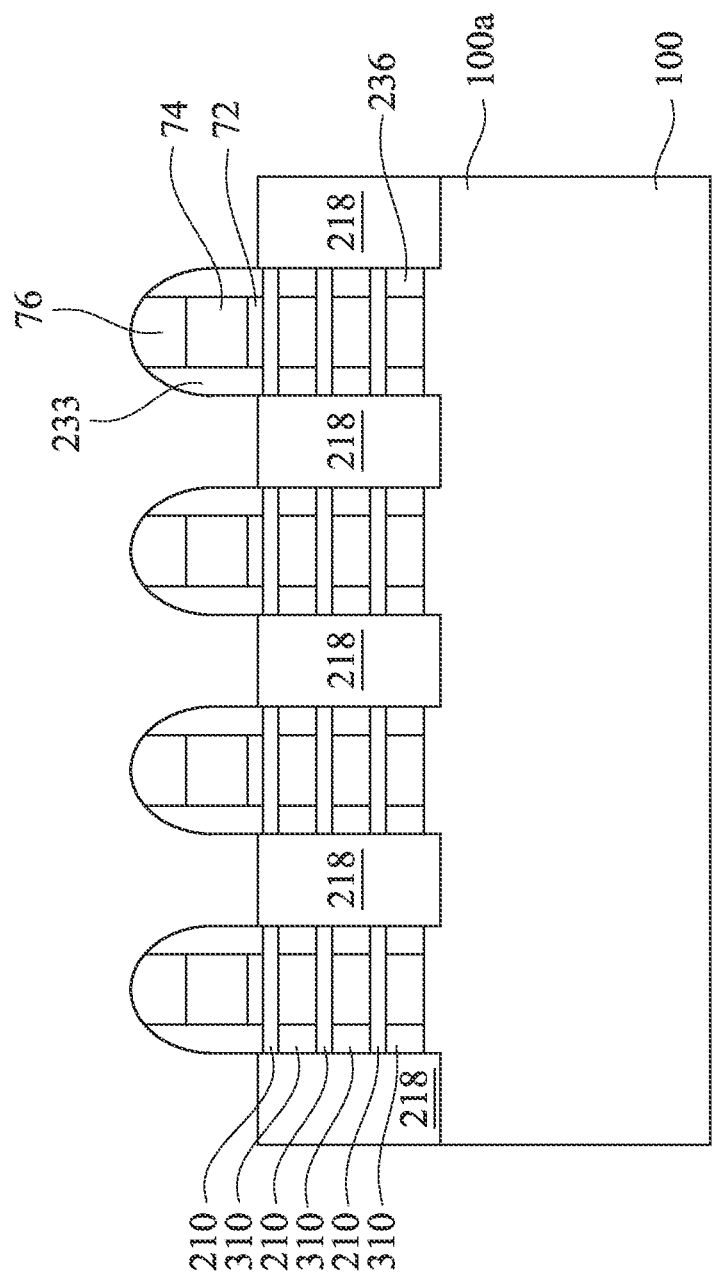
Figure 12C:
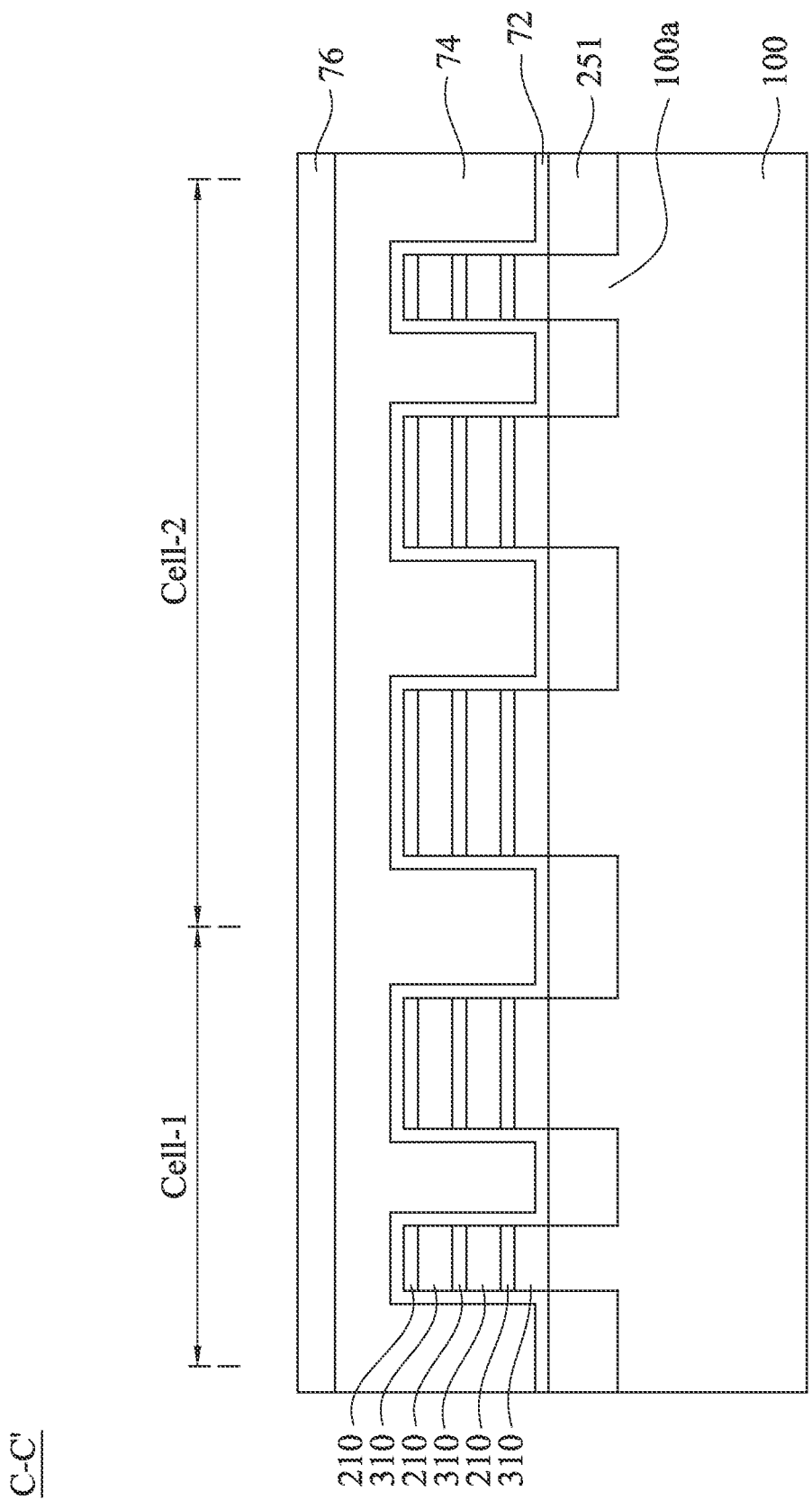

Reference is made to FIGS. 12A, 12B, and 12C. Eepitaxial source/drain regions 218 (see FIGS. 12A and 12B) are formed in the source/drain recesses 94, such that each dummy gate 74 (and corresponding channel layers) is disposed between respective adjacent pairs of the epitaxial source/drain regions 218. In some embodiments, the gate spacers 233 and the inner spacers 236 are used to separate the epitaxial source/drain regions 218 from, respectively, the dummy gates 74 and the first semiconductor sheets 310 by an appropriate lateral distance so that the epitaxial source/drain regions 218 do not short out with subsequently formed gates of the resulting nano-FETs. A material of the epitaxial source/drain regions 218 may be selected to exert stress in the respective channel layers, thereby improving performance.

Figure 13A:
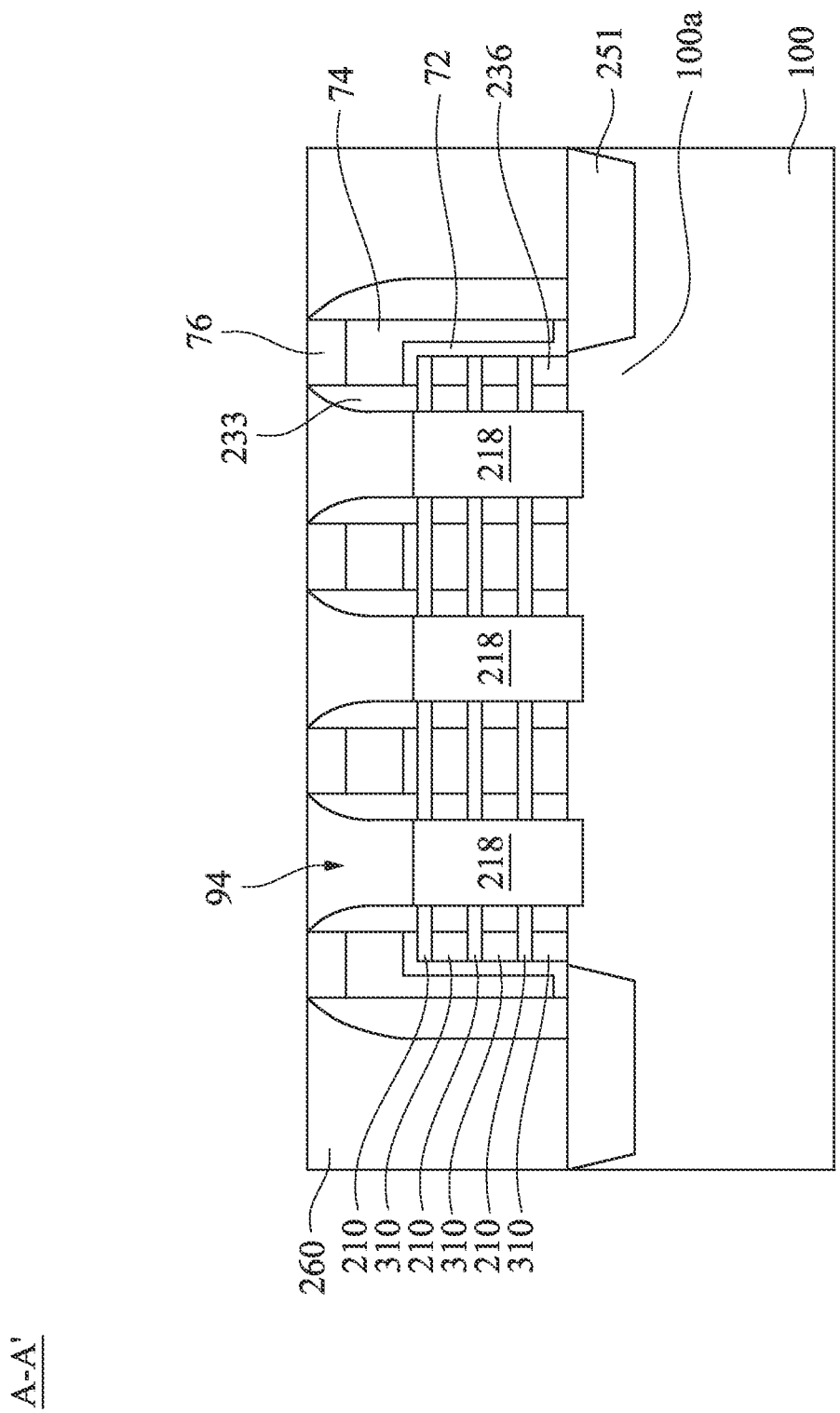
Figure 13B:
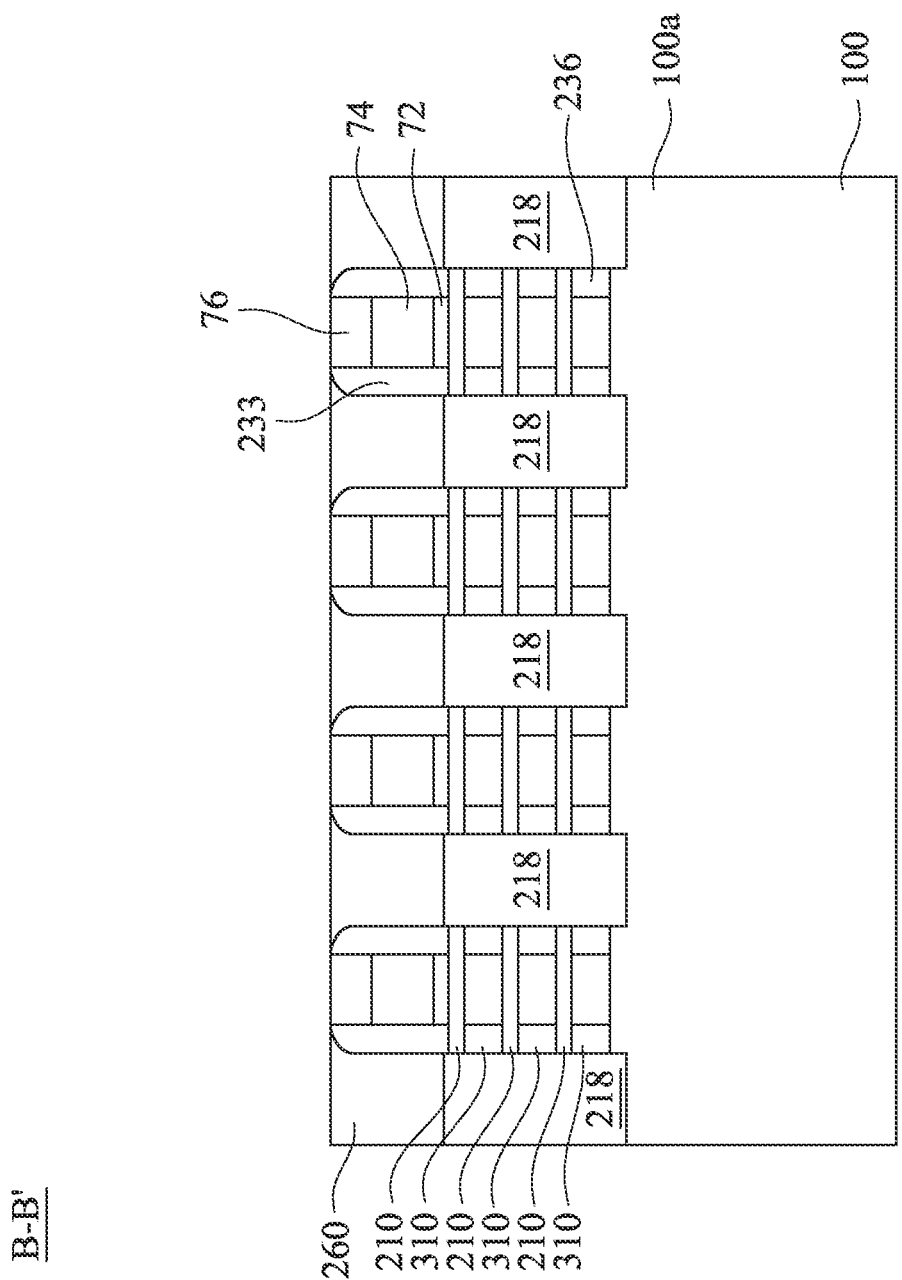
Figure 13C:
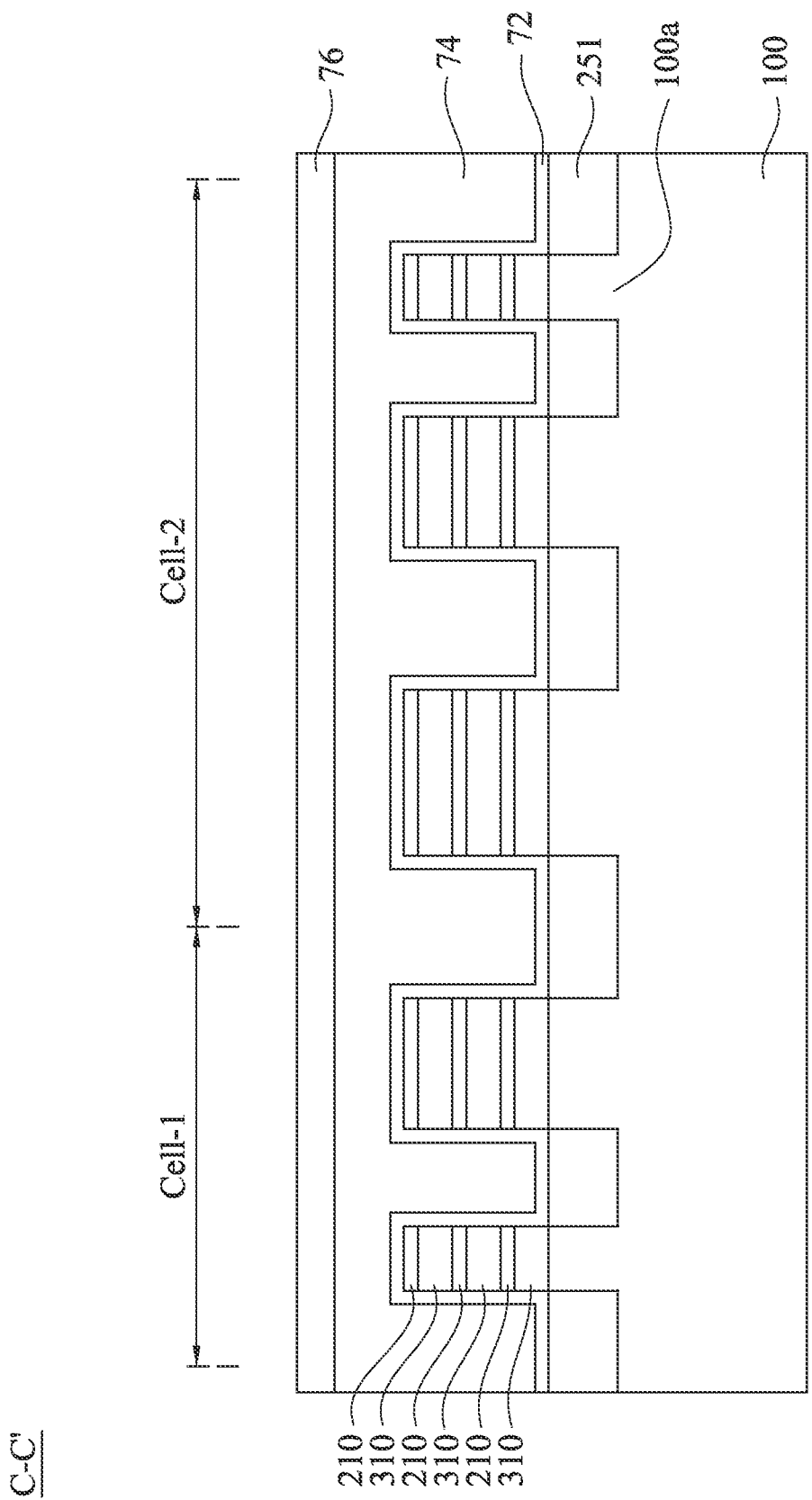

Reference is made to FIGS. 13A, 13B, and 13C. An inter-layer dielectric (ILD) layer 260 (see FIGS. 13A and 13B) is deposited over the epitaxial source/drain regions 218, the gate spacers 233, the masks 76 (if present) or the dummy gates 74. The ILD layer 260 may be formed of a dielectric material, which may be deposited by any suitable method, such as CVD, plasma-enhanced CVD (PECVD), FCVD, or the like. Acceptable dielectric materials may include phospho-silicate glass (PSG), boro-silicate glass (BSG), boron-doped phospho-silicate glass (BPSG), undoped silicate glass (USG), or the like. Other insulation materials formed by any acceptable process may be used. In some embodiments, a contact etch stop layer (CESL) is formed between the ILD layer 260 and the epitaxial source/drain regions 218, the gate spacers 233, and the masks 76 (if present) or the dummy gates 74. The CESL may be formed of a dielectric material, such as silicon nitride, silicon oxide, silicon oxynitride, or the like, having a high etching selectivity from the etching of the ILD 260. The CESL may be formed by an any suitable method, such as CVD, ALD, or the like.

Subsequently, a removal process is performed to level the top surfaces of the ILD layer 260 with the top surfaces of the masks 76 (if present) or the dummy gates 74. In some embodiments, a planarization process such as a chemical mechanical polish (CMP), an etch-back process, combinations thereof, or the like may be utilized. The planarization process may also remove the masks 76 on the dummy gates 74, and portions of the gate spacers 233 along sidewalls of the masks 76. After the planarization process, the top surfaces of the gate spacers 233, the ILD layer 260, the CESL, and the masks 76 (if present) or the dummy gates 74 are coplanar (within process variations). Accordingly, the top surfaces of the masks 76 (if present) or the dummy gates 74 are exposed through the ILD layer 260. In some embodiments, the masks 76 remain, and the planarization process levels the top surface of the ILD layer 260 with the top surfaces of the masks 76.

Figure 14A:
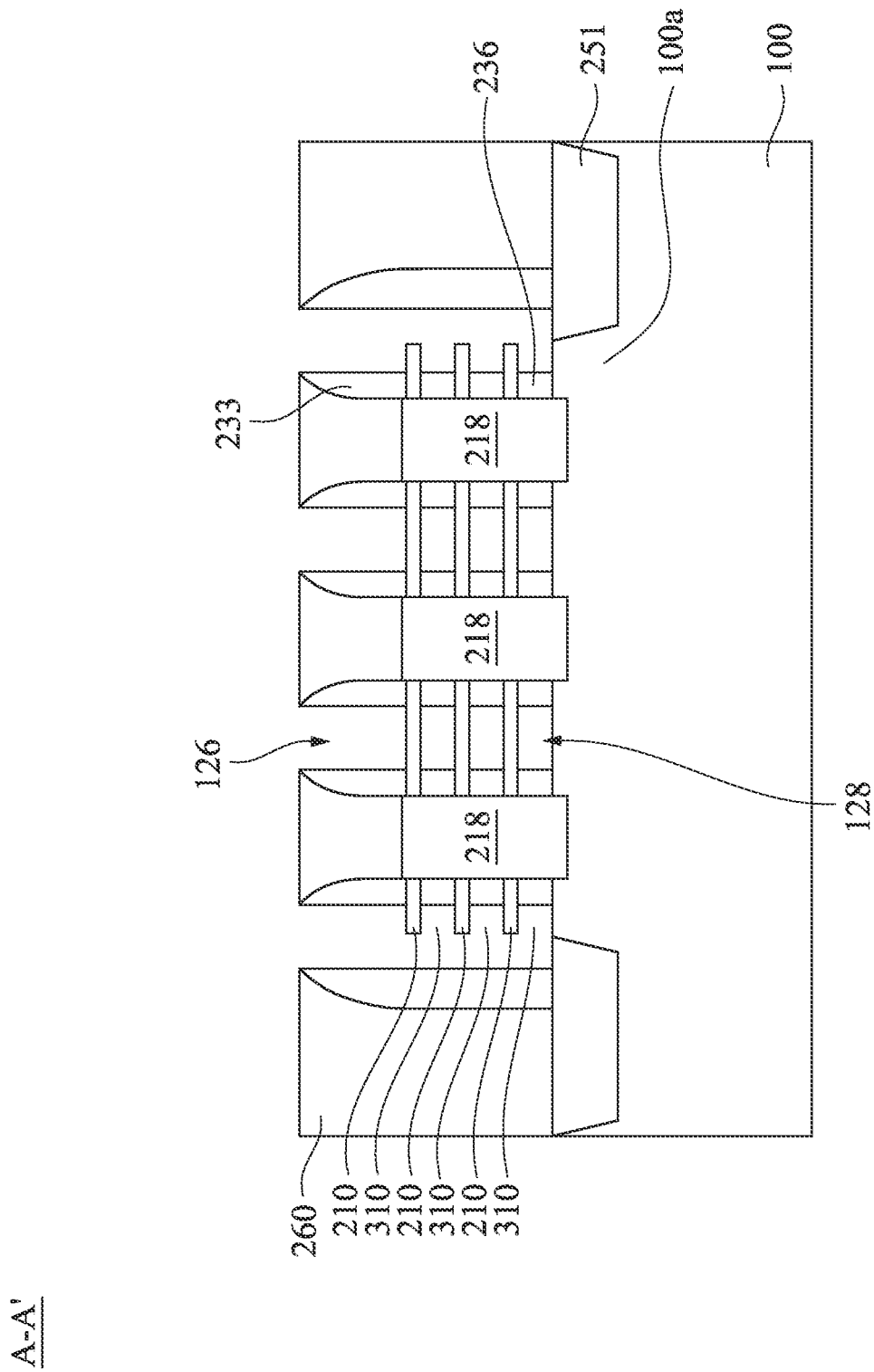
Figure 14B:
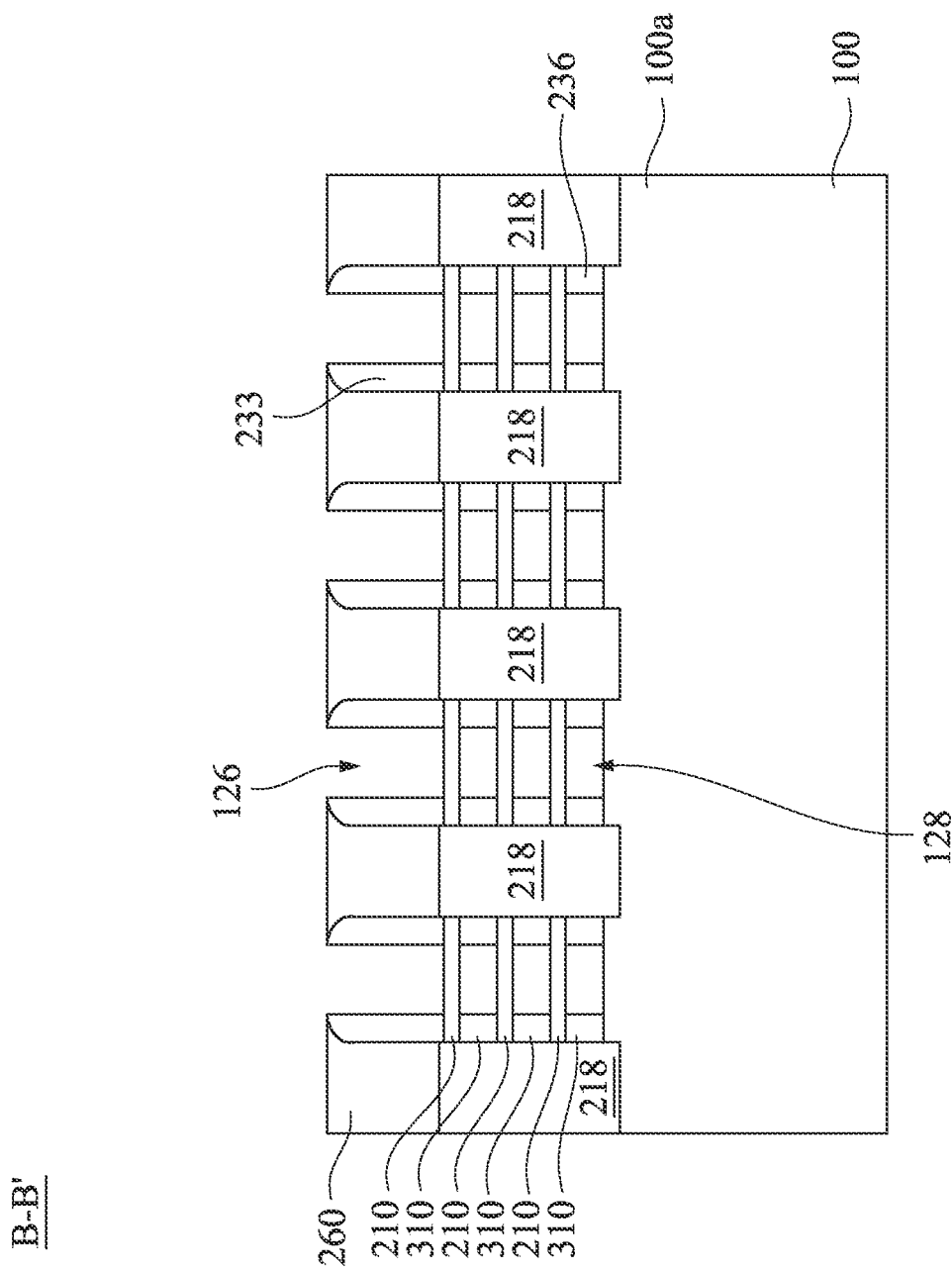
Figure 14C:
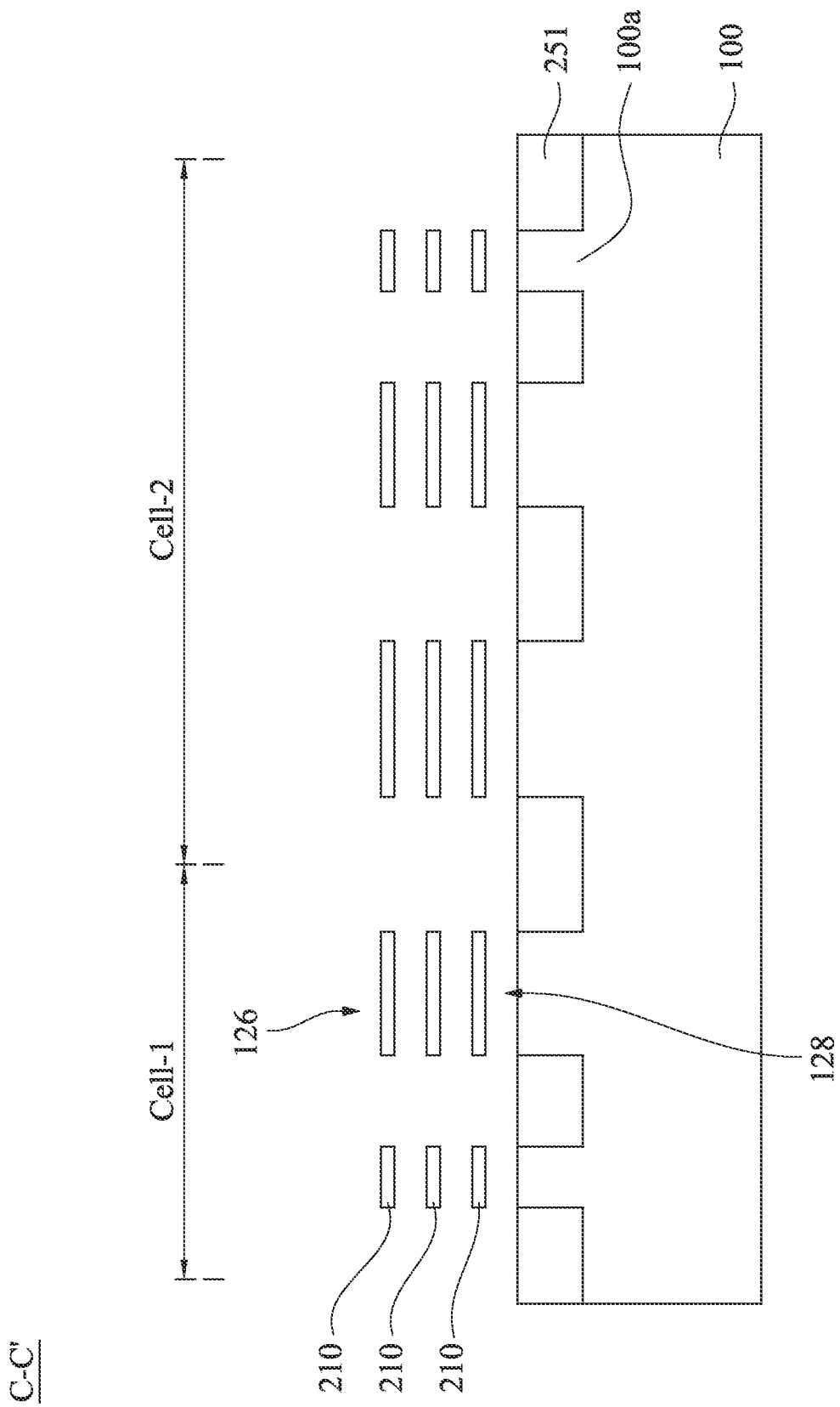

Reference is made to FIGS. 14A, 14B, and 14C. The masks 76 (if present) and the dummy gates 74 (see FIGS. 13A-13C) are removed in an etching process, so that recesses 126 are formed. Portions of the dummy dielectrics 72 in the recesses 126 are also removed. In some embodiments, the dummy gates 74 are removed by an anisotropic dry etch process. For example, the etching process may include a dry etch process using reaction gas(es) that selectively etch the dummy gates 74 at a faster rate than the ILD layer 260 or the gate spacers 233. During the removal, the dummy dielectrics 72 may be used as etch stop layers when the dummy gates 74 are etched. The dummy dielectrics 72 are then removed. Each recess 126 exposes and/or overlies portions of the channel layers. Portions of the second channel layers 210 which act as the channel layers are disposed between adjacent pairs of the epitaxial source/drain regions 218.

The remaining portions of the first semiconductor sheets 310 (see FIGS. 13A-13C) are then removed to expand the recesses 126, such that openings 128 are formed in regions between the second channel layers 210. The remaining portions of the first semiconductor sheets 310 can be removed by any acceptable etching process that selectively etches the material of the first semiconductor sheets 310 at a faster rate than the material of the second channel layers 210. The etching may be isotropic. For example, when the first semiconductor sheets 310 are formed of silicon germanium and the second channel layers 210 are formed of silicon, the etching process may be a wet etch using tetramethylammonium hydroxide (TMAH), ammonium hydroxide ($NH_4OH$), or the like. In some embodiments, a trim process (not separately illustrated) is performed to decrease the thicknesses of the exposed portions of the second channel layers 210. In some embodiments, the removing of the remaining portions of the first semiconductor sheets 310 can be interchangeably referred to as a channel releasing process. The second channel layers 210 can be interchangeably referred to as a vertically stacked multiple channels (sheets) and may have a vertically sheet pitch within a range of from about 10 nm to about 30 nm. In some embodiments, the second channel layers 210 may have a thickness within a range from about 4 nm to about 10 nm. In some embodiments, the vertically sheet pitch of the between adjacent two of the second channel layers 210 may be within a range from about 6 to about 20 nm.

Figure 15A:
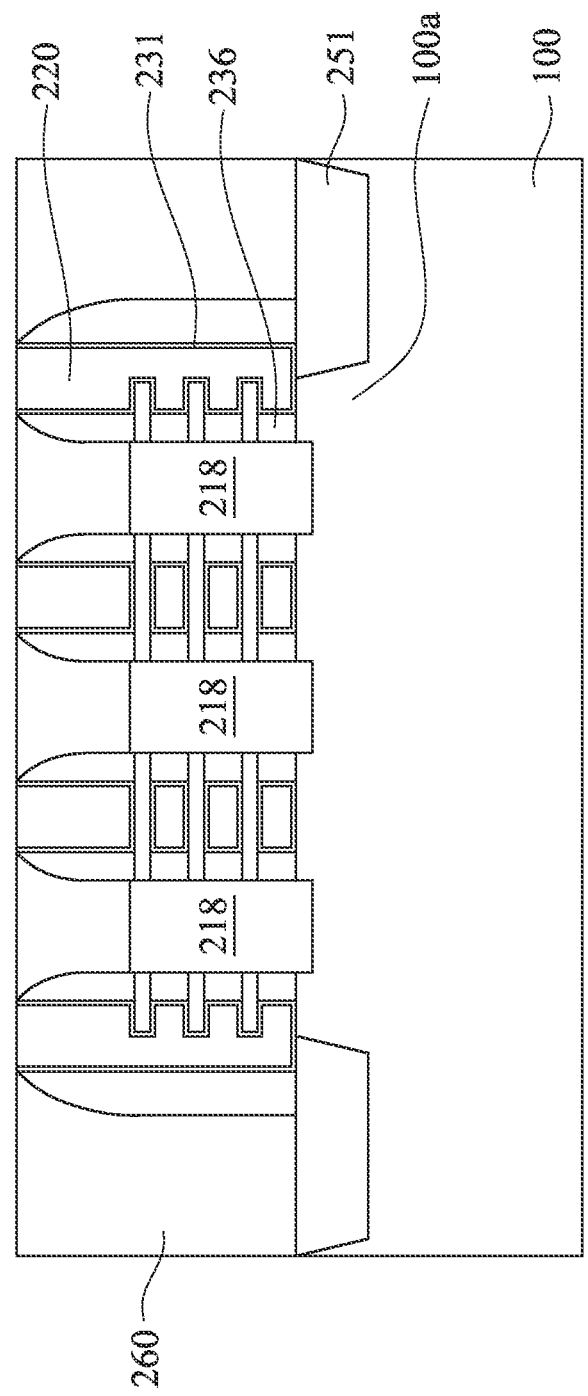
Figure 15B:
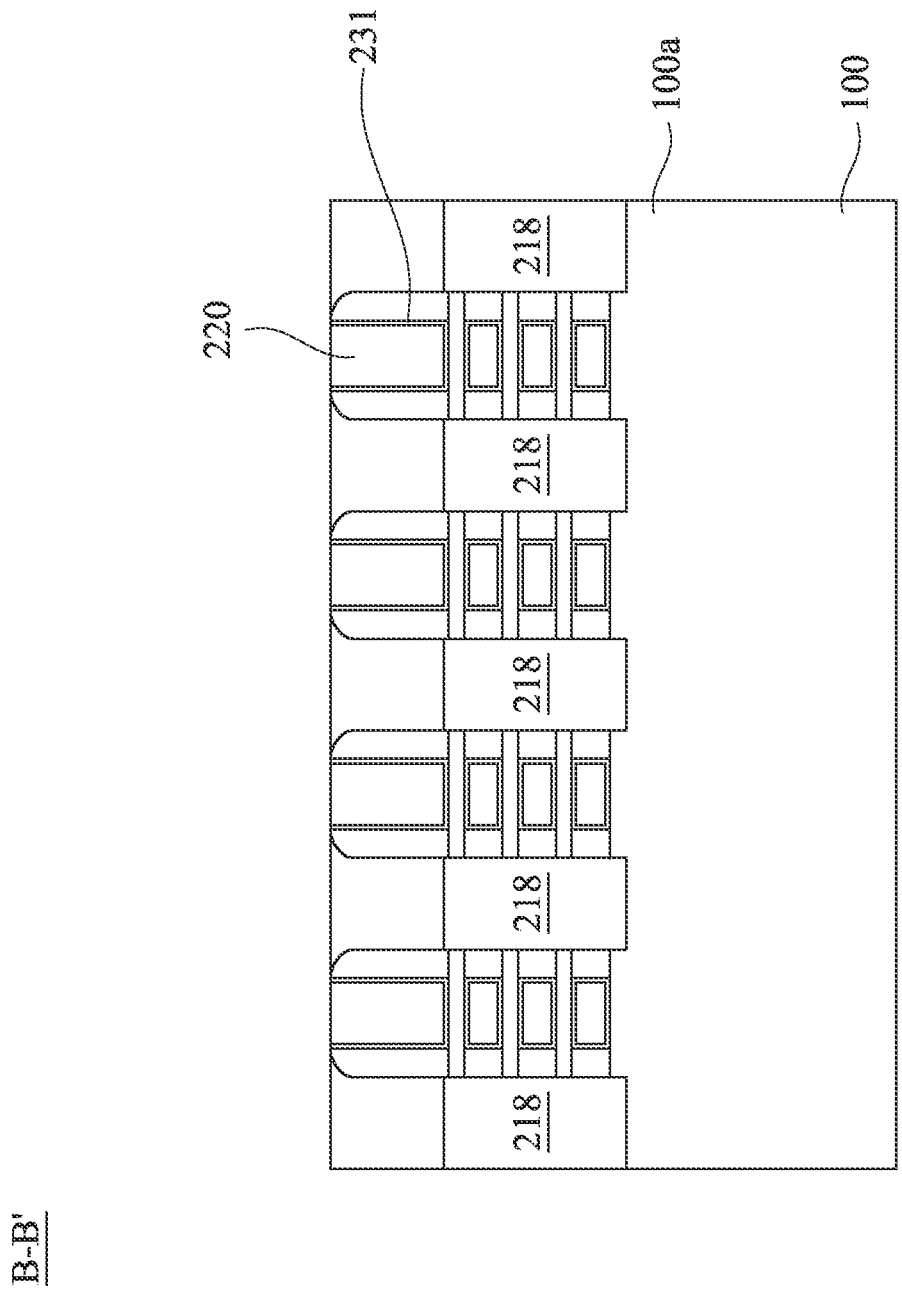
Figure 15C:
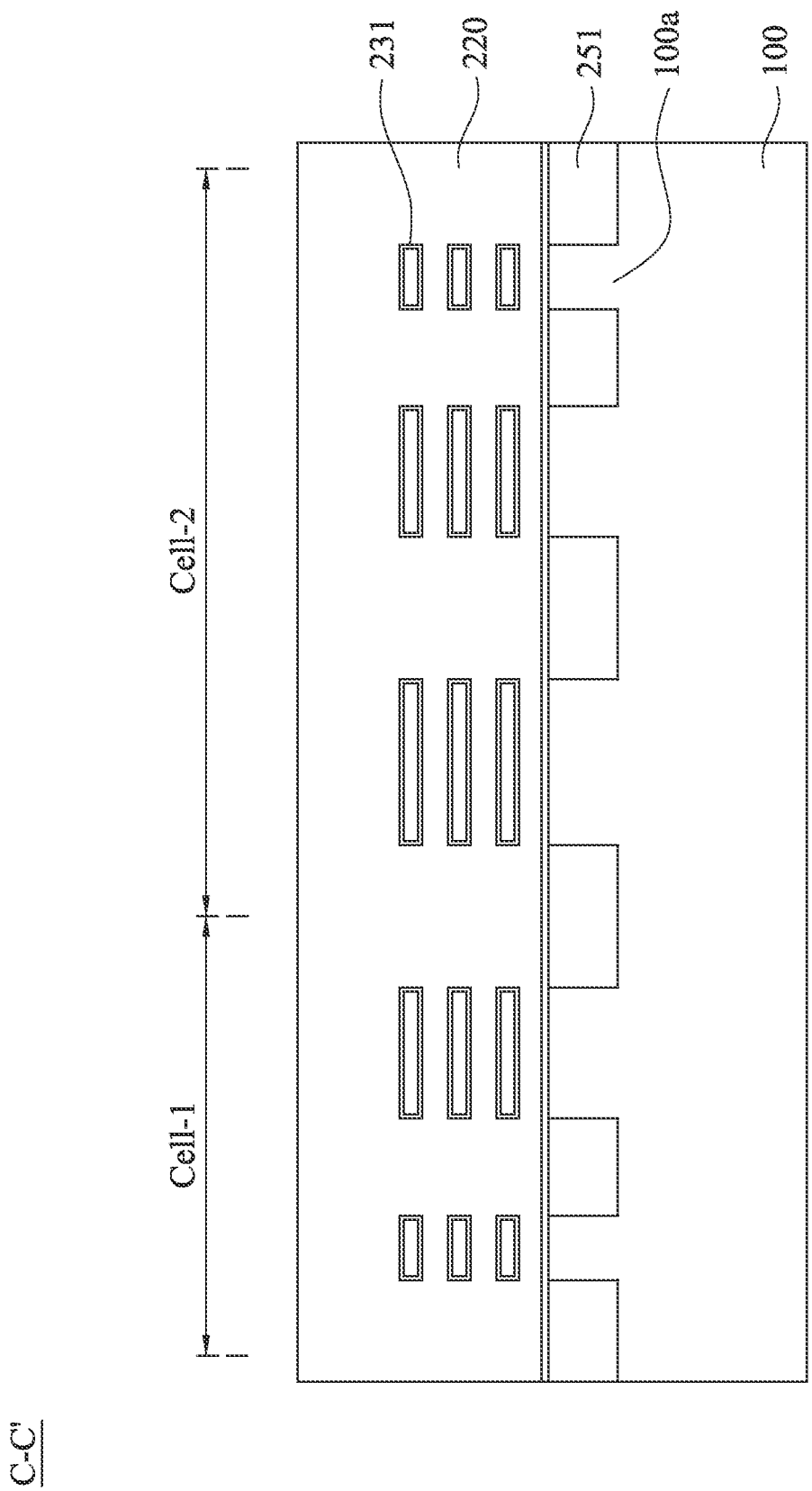

Reference is made to FIGS. 15A, 15B, and 15C. Gate structures are formed to wrap around the second channel layers 210. A gate dielectric layer 231 is formed in the recesses 126. Gate electrode layers 220 are formed on the gate dielectric layer 231. The gate dielectric layer 231 and the gate electrode layers 220 are layers for replacement gates, and each wrap around all (e.g., four) sides of the second channel layer 210. In some embodiments, the gate structure can be interchangeably referred to as a gate strip or a gate pattern.

The gate dielectric layer 231 is disposed on the sidewalls and/or the top surfaces of the fin strips 100a; on the top surfaces, the sidewalls, and the bottom surfaces of the second channel layers 210; and on the sidewalls of the gate spacers 233. The gate dielectric layer 231 may include an oxide such as silicon oxide or a metal oxide, a silicate such as a metal silicate, combinations thereof, multi-layers thereof, or the like. The gate dielectric layer 231 may include a dielectric material having a k-value greater than about 7.0, such as a metal oxide or a silicate of hafnium, aluminum, zirconium, lanthanum, manganese, barium, titanium, lead, and combinations thereof. Although a single-layered gate dielectric layer 231 is illustrated in FIGS. 15A and 15B, as will be subsequently described in greater detail, the gate dielectric layer 231 may include any number of interfacial layers and any number of main layers.

The gate electrode layers 220 may include a metal-containing material such as titanium nitride, titanium oxide, tungsten, cobalt, ruthenium, aluminum, combinations thereof, multi-layers thereof, or the like. Although a single-layered gate electrode layer 220 is illustrated in FIGS. 15A and 15B, as will be subsequently described in greater detail, the gate electrode layer 220 may include any number of work function tuning layers, any number of barrier layers, any number of glue layers, and a fill material. In some embodiments, the gate electrode layers 220 may be made of a material selected from a group including TiN, TaN, TiAl, TiAlN, TaAl, TaAlN, TaAlC, TaCN, WNC, Co, Ni, Pt, W, or combinations thereof.

Subsequently, a removal process is performed to remove the excess portions of the materials of the gate dielectric layer 231 and the gate electrode layers 220, which excess portions are over the top surfaces of the ILD layer 260 and the gate spacers 233, thereby forming gate dielectric layer 231 and gate electrode layers 220. In some embodiments, a planarization process such as a chemical mechanical polish (CMP), an etch-back process, combinations thereof, or the like may be utilized. The gate dielectric layer 231, when planarized, has portions left in the recesses 126 (thus forming the gate dielectric layer 231). The gate electrode layers 220, when planarized, have portions left in the recesses 126 (thus forming the gate electrode layers 220). The top surfaces of the gate spacers 233; the CESL (not shown); the ILD layer 260; the gate dielectric layer 231, and the gate electrodes are coplanar (within process variations). The gate dielectric layer 231 and the gate electrode layers 220 form replacement gates of the resulting nano-FETs. Each respective pair of a gate dielectric layer 231 and a gate electrode layer 220 may be collectively referred to as a "gate structure." The gate structures each extend along top surfaces, sidewalls, and bottom surfaces of a channel layer of the second channel layer 210. In some embodiments, the gate electrode layers 220 each have a gate length in a range from about 6 nm to about 20 nm.

Figure 16A:
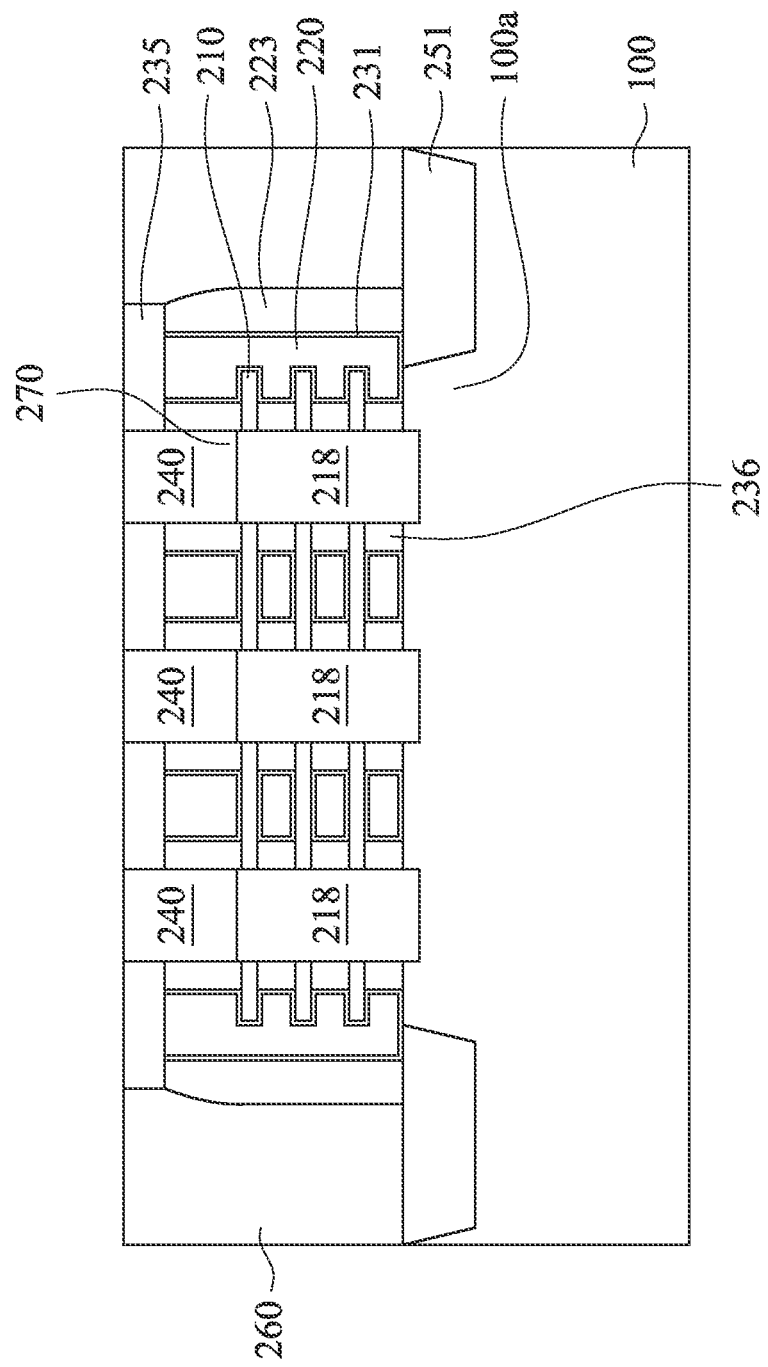
Figure 16B:
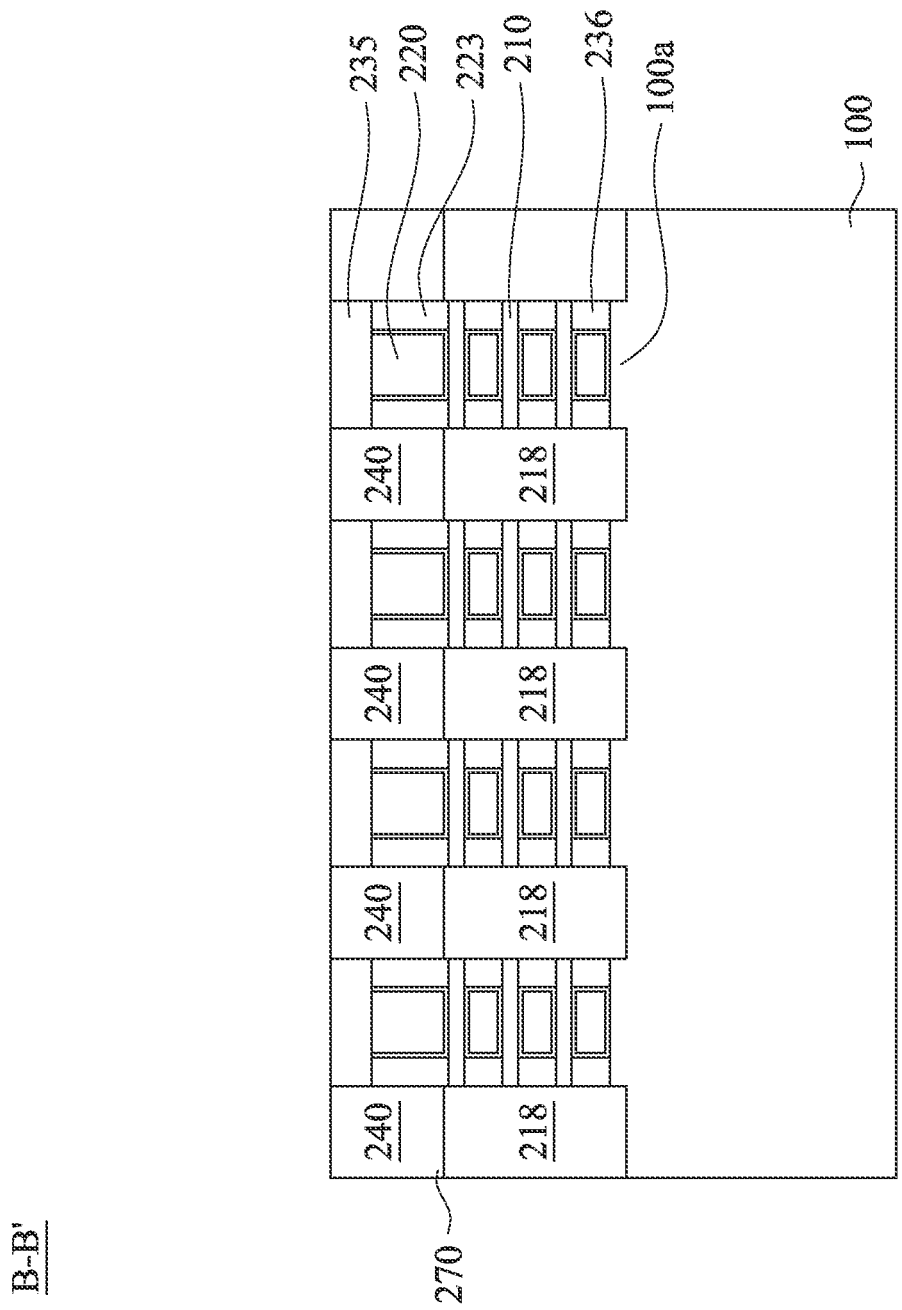
Figure 16C:
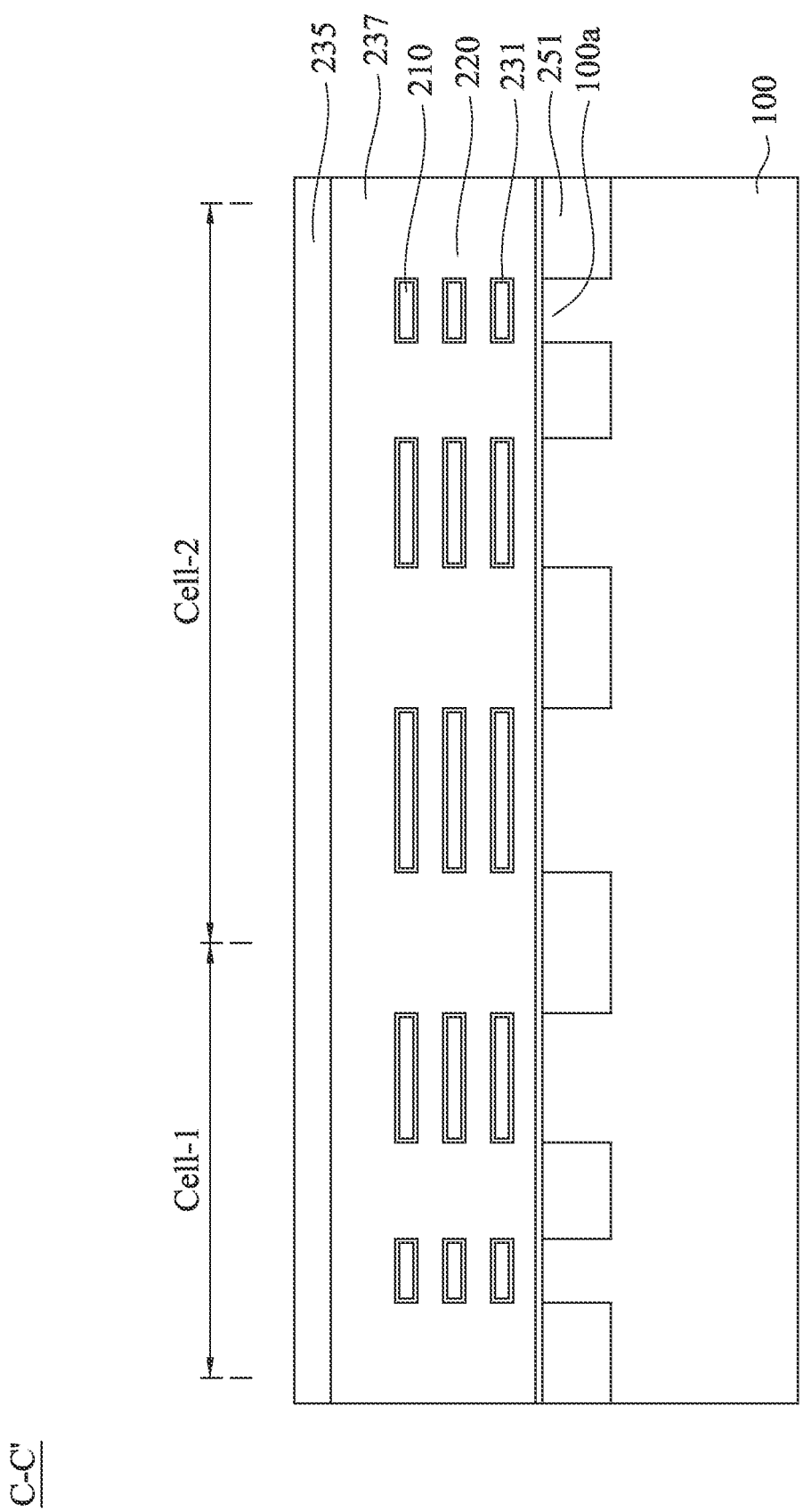

Reference is made to FIGS. 16A, 16B, and 16C. An etch back process is performed on the gate electrode layers 220 to scale down the gate electrode layers 220 and the gate dielectric layers 231. The etch back process may include a bias plasma etching step. The bias plasma etching step may be performed to remove portions of the gate electrode layers 220 and the gate dielectric layers 231. Portions of the gate trenches may reappear with shallower depth. Top surfaces of the gate electrode layers 220 and the gate dielectric layers 231 may be no longer level with the ILD layer 260. Sidewalls of the gate spacers 233 are then exposed from the gate electrode layers 220 and the gate dielectric layers 231. In some embodiments, the bias plasma etching step may use a gas mixture of $Cl_2$, $O_2$, $BCl_3$, and Ar with a bias in a range from about 25V to about 1200V. Subsequently, a hard mask layer 235 is formed over the gate electrode layers 220 and the gate dielectric layers 231 using, for example, a deposition process to deposit a dielectric material over the substrate 100, followed by a CMP process to remove excess dielectric material above the spacers 233 and the ILD layer 260. In some embodiments, source/drain contacts 240 formed subsequently are formed by a self-aligned contact process using the hard mask layer 235 as a contact etch protection layer. In some embodiments, the hard mask layer 235 may have a thickness in a range from about 2 nm to about 60 nm.

In some embodiments, the hard mask layer 235 may be made of a nitride-based material, such as $Si_3N_4$, SiON, or a carbon-based material, such as SiC, SiOC, SiOCN, or combinations thereof. In some embodiments, the hard mask layer 235 may include $SiO_x$, SiBN, SiCBN, other suitable dielectric materials, or combinations thereof. In some embodiments, the hard mask layer 235 may include a metal oxide, such as be hafnium oxide ($HfO_2$), zirconium oxide ($ZrO_2$), lanthanum oxide ($La_2O_3$), yttrium oxide ($Y_2O_3$), aluminum oxide ($Al_2O_3$), tantalum oxide ($Ta_2O_5$), titanium oxide ($TiO_2$), another applicable material, or combinations thereof. The hard mask layer 235 has different etch selectivity than the spacers 233 and/or the ILD layer 260, so as to selective etch back the hard mask layer 235. By way of example, if the hard mask layer 235 is made of silicon nitride, the spacers 233 and/or the ILD layer 260 may be made of a dielectric material different from silicon nitride. If the hard mask layer 235 is made of silicon carbide (SiC), the spacers 233 and/or the ILD layer 260 may be made of a dielectric material different from silicon carbide. Therefore, the hard mask layer 235 can be used to define self-aligned gate contact region and thus referred to as a self-aligned contact (SAC) structure or a SAC layer.

Figure 17A:
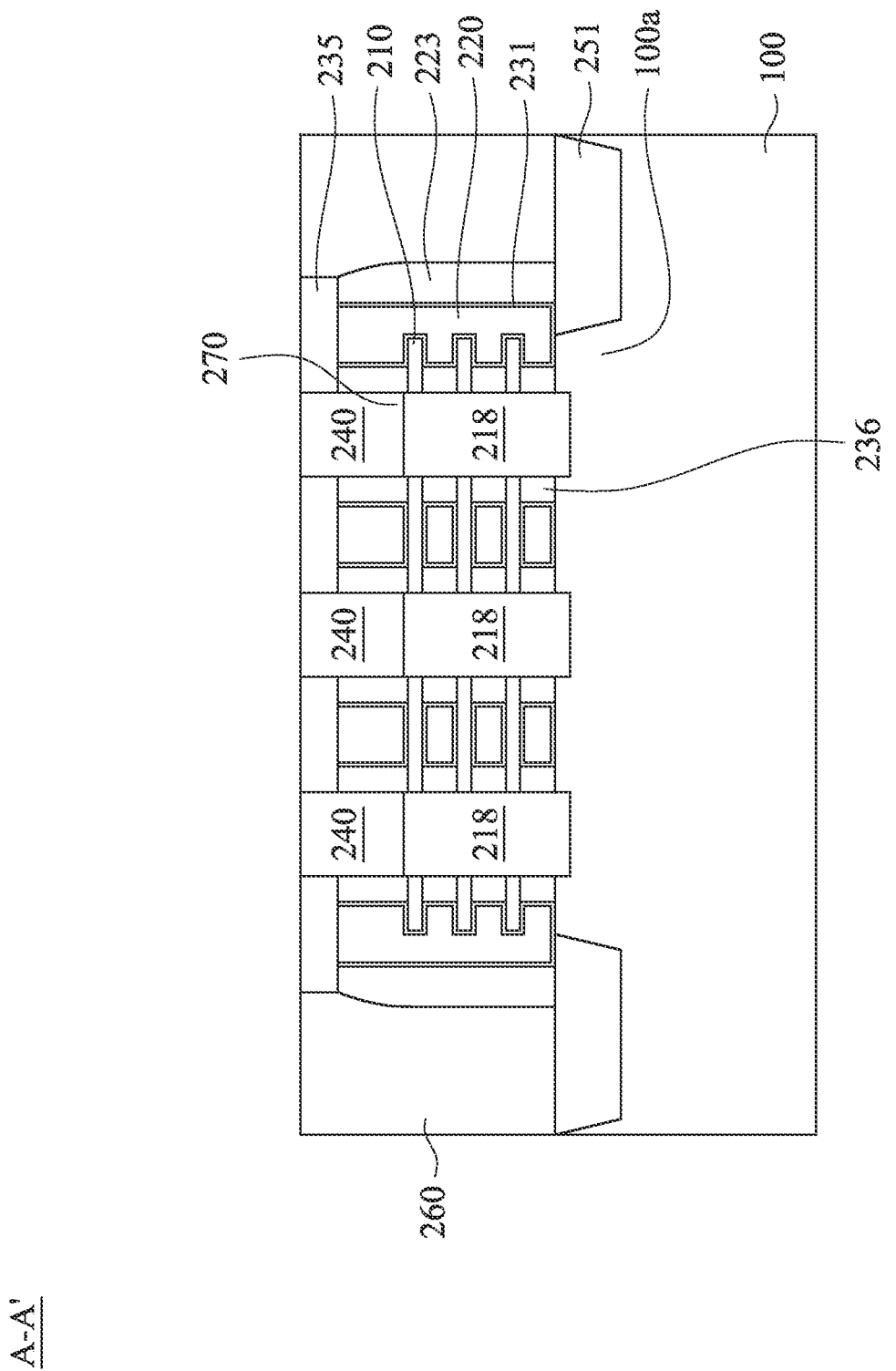
Figure 17B:
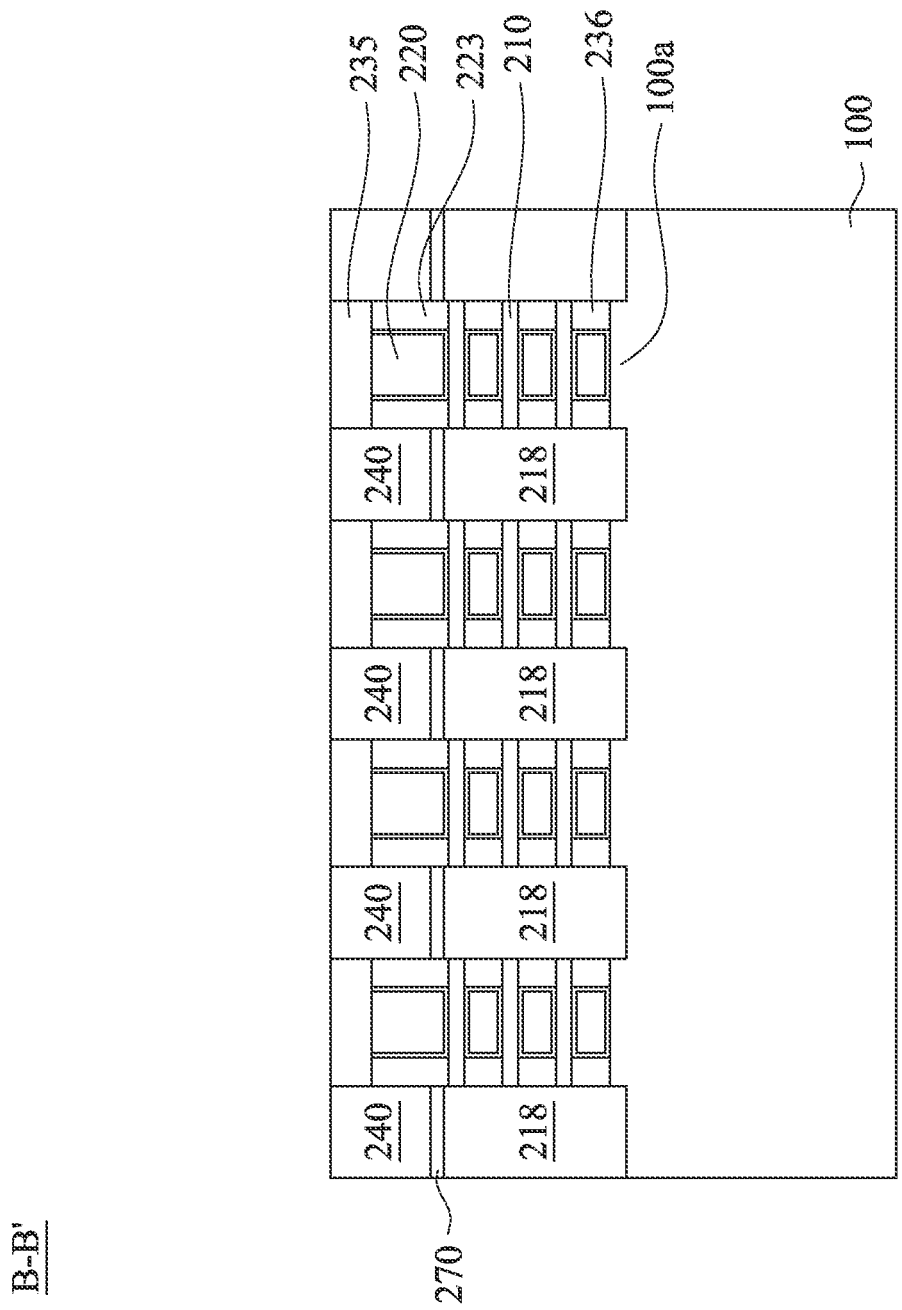
Figure 17C:
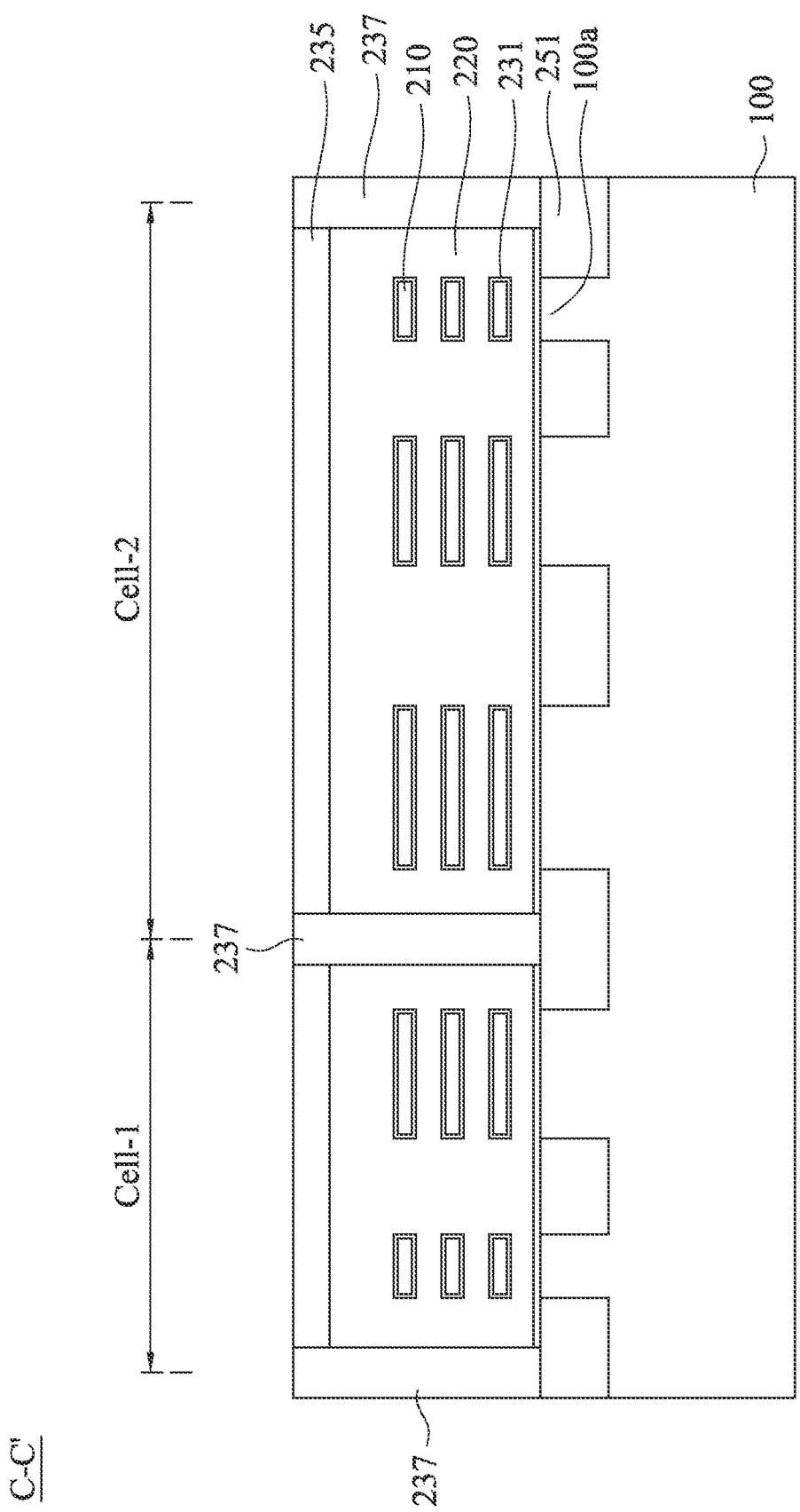

Reference is made to FIGS. 17A, 17B, and 17C. The isolation structures 237 (see FIG. 17C) as a gate-cut structure for the gate structure, and the gate-cut structure is formed by a cut metal gate (CMG) process. In some embodiments, the isolation structure 237 can be interchangeably referred to gate end dielectrics, isolation structure or isolation strip, or dielectric regions. Specifically, portions of the gate electrode layers 220 and the gate dielectric layers 231 are removed to reappear portions of the gate trenches with the gate spacers 215 as their sidewalls. The portions of the gate electrode layers 220 and the gate dielectric layer 231 may be removed by dry etching, wet etching, or a combination of dry and wet etching. For example, a wet etching process may include exposure to a hydroxide containing solution (e.g., ammonium hydroxide), deionized water, and/or other suitable etchant solutions. Subsequently, a dielectric material is deposited into the gate trenches, followed by a planarization process to remove excess portions of the dielectric material. The remaining dielectric material forms the isolation structures 237.

In some embodiments, the deposition of the dielectric material of the isolation structures 237 is performed using a conformal deposition process such as ALD, which may be PEALD, thermal ALD, or the like. The dielectric material may be formed of or comprise $SiO_2$, SiOC, SiOCN, or the like, or combinations thereof. In some embodiments, the isolation structure 237 may be made of a nitride-based material, such as $Si_3N_4$, or a carbon-based material, such as SiOCN, or combinations thereof. In some embodiments, the isolation structure 237 may be made of a material having a dielectric constant greater than about 9 (e.g., high dielectric constant (high-k) material). For example, the isolation structure 237 may be made of a high dielectric constant (high-k) material, such as be hafnium oxide ($HfO_2$), zirconium oxide ($ZrO_2$), lanthanum oxide ($La_2O_3$), yttrium oxide ($Y_2O_3$), aluminum oxide ($Al_2O_3$), tantalum oxide ($Ta_2O_5$), titanium oxide ($TiO_2$), another applicable material, or combinations thereof. The isolation structures 237 may be formed of a homogenous material, or may have a composite structure including more than one layer. The isolation structures 237 may include dielectric liners, which may be formed of, for example, silicon oxide. In some embodiments, the dielectric material of the isolation structures 237 comprises SiN, and the deposition is performed using process gases including dichlorosilane and ammonia. Hydrogen ($H_2$) may or may not be added.

Figure 18A:
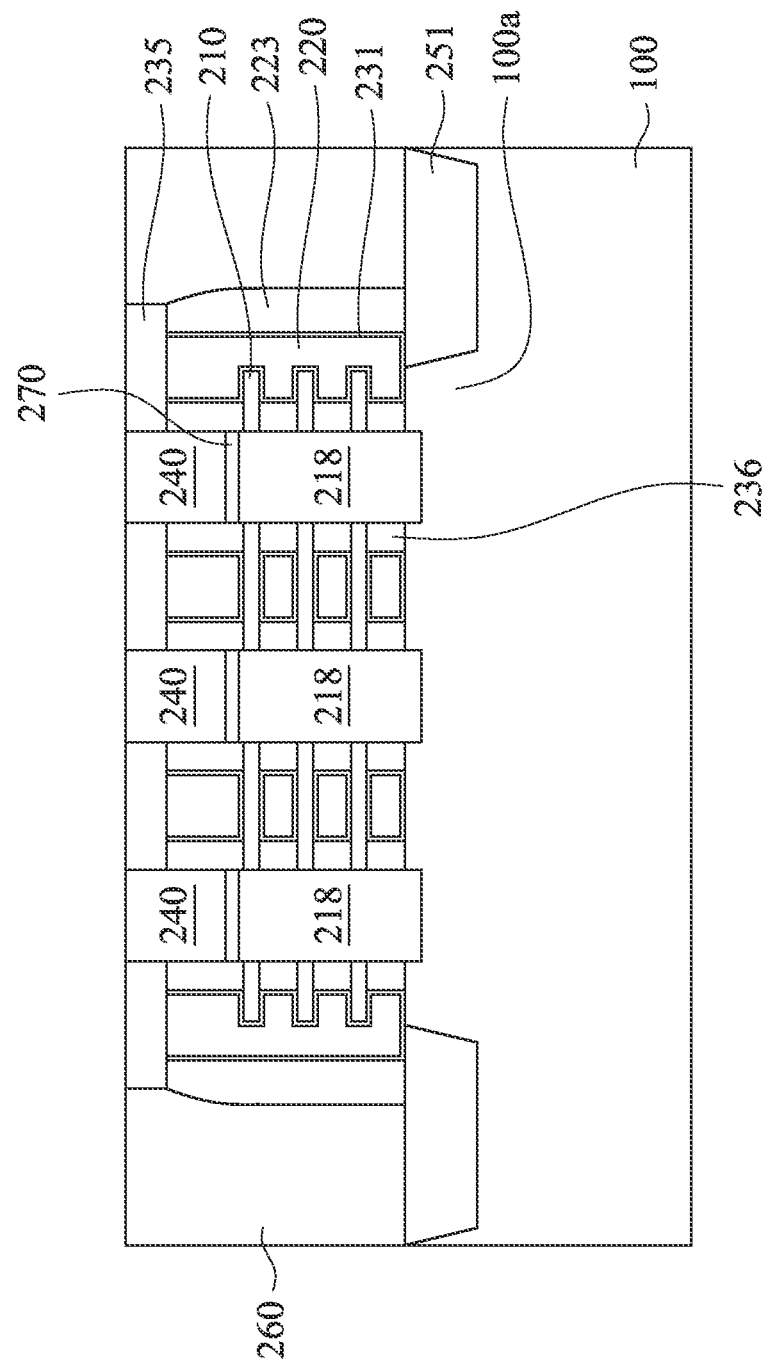
Figure 18B:
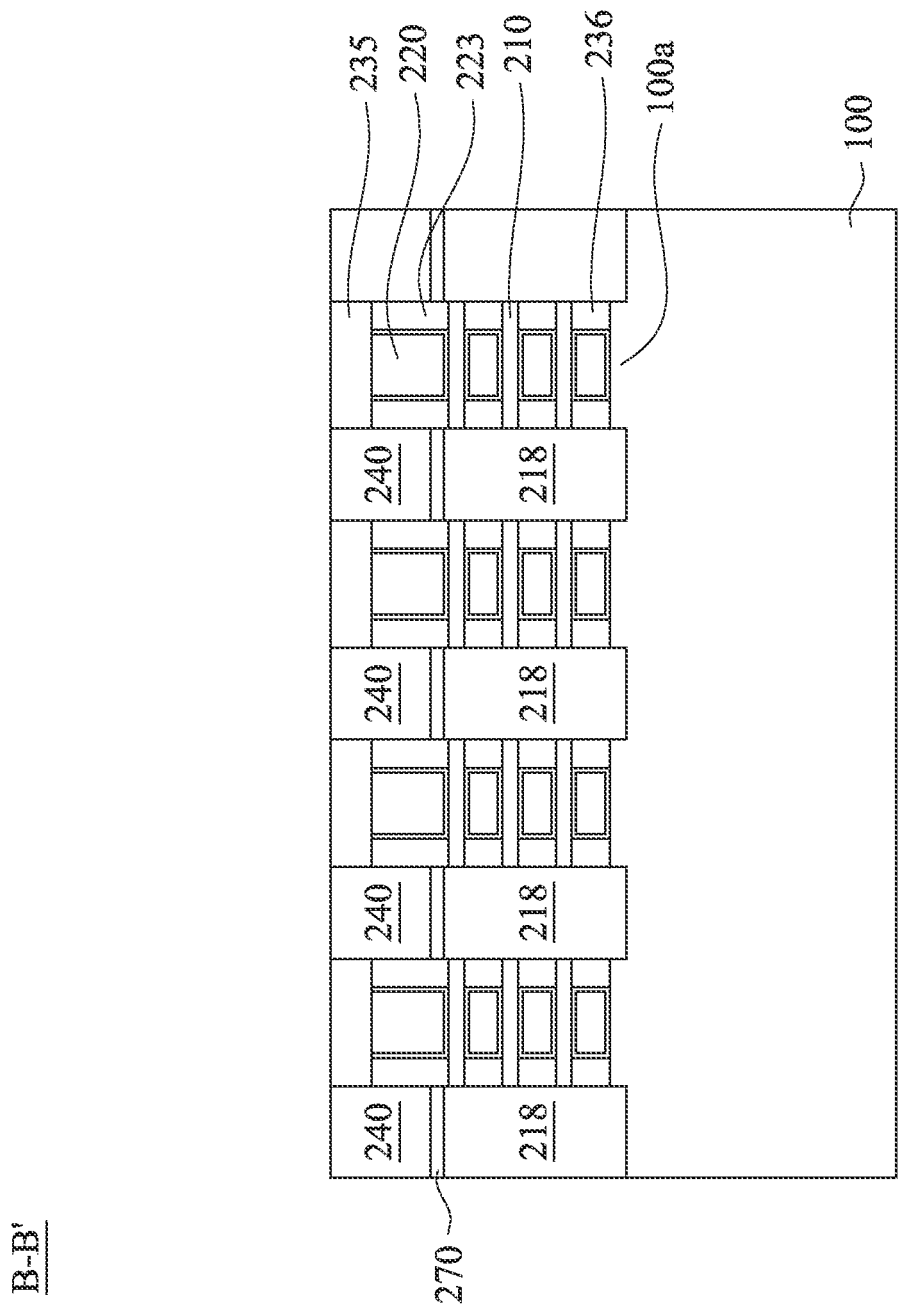
Figure 18C:
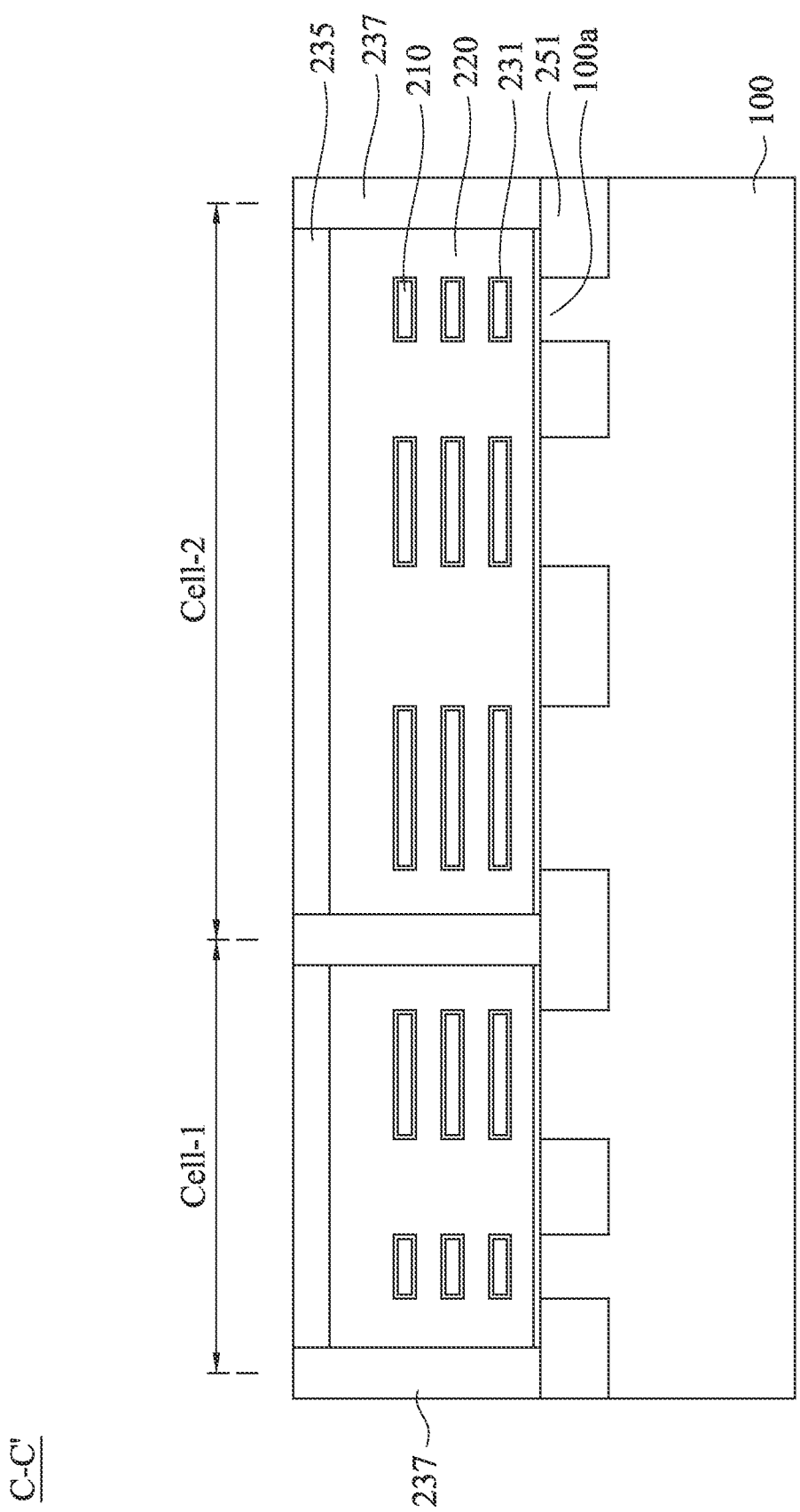

Reference is made to FIGS. 18A, 18B, and 18C. Source/drain contacts 240 (see FIGS. 18A and 18B) are formed in the ILD layer 260 and on the source/drain regions 218, respectively. In some embodiments, the source/drain silicide regions 270 are formed between the source/drain contacts 240 and the source/drain regions 218. In some embodiments, the source/drain contacts 240 may include a metal-containing material such as titanium nitride, titanium oxide, tungsten, cobalt, ruthenium, aluminum, copper, combinations thereof, multi-layers thereof; or the like.

Figure 19A:
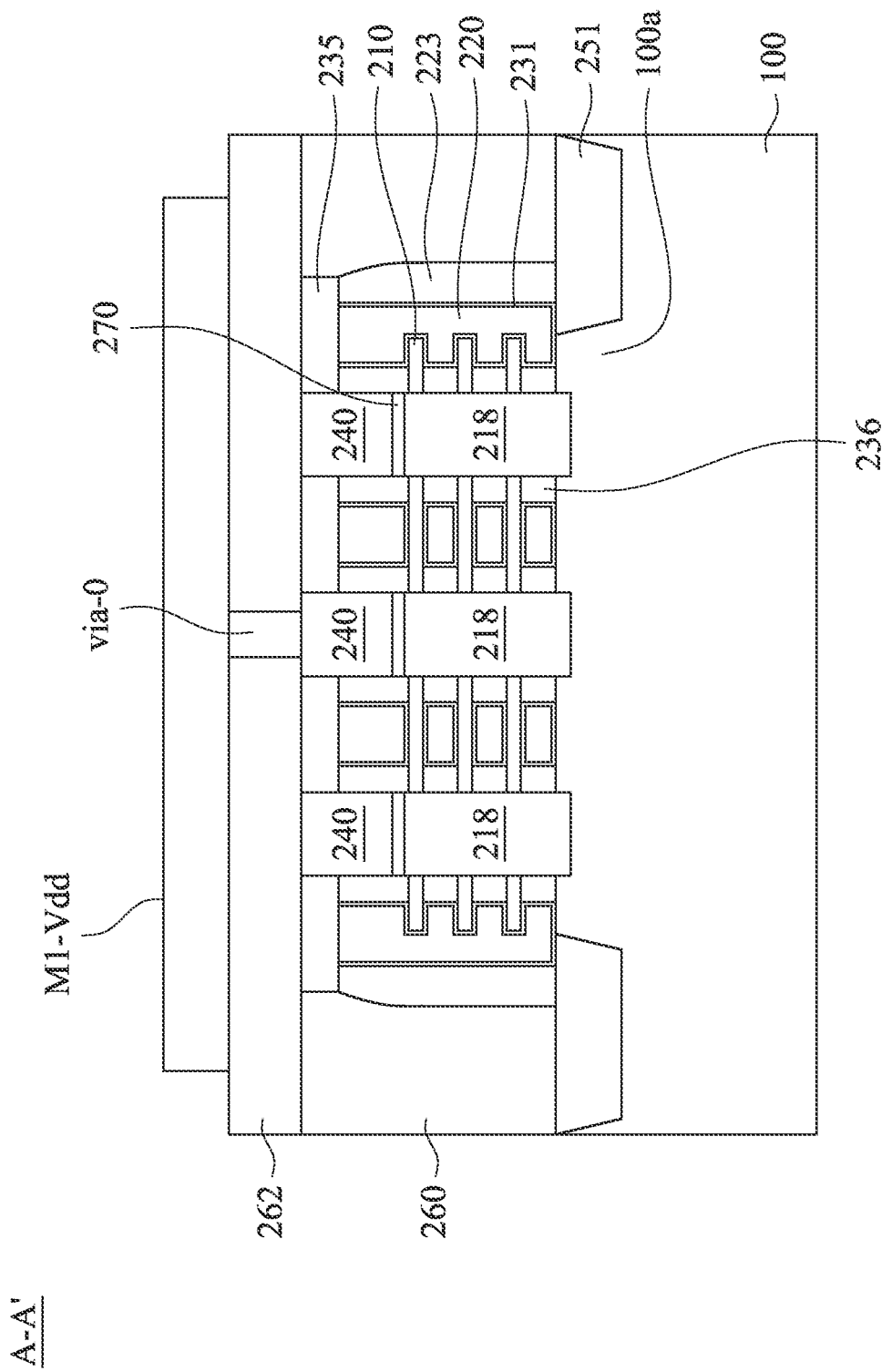
Figure 19B:
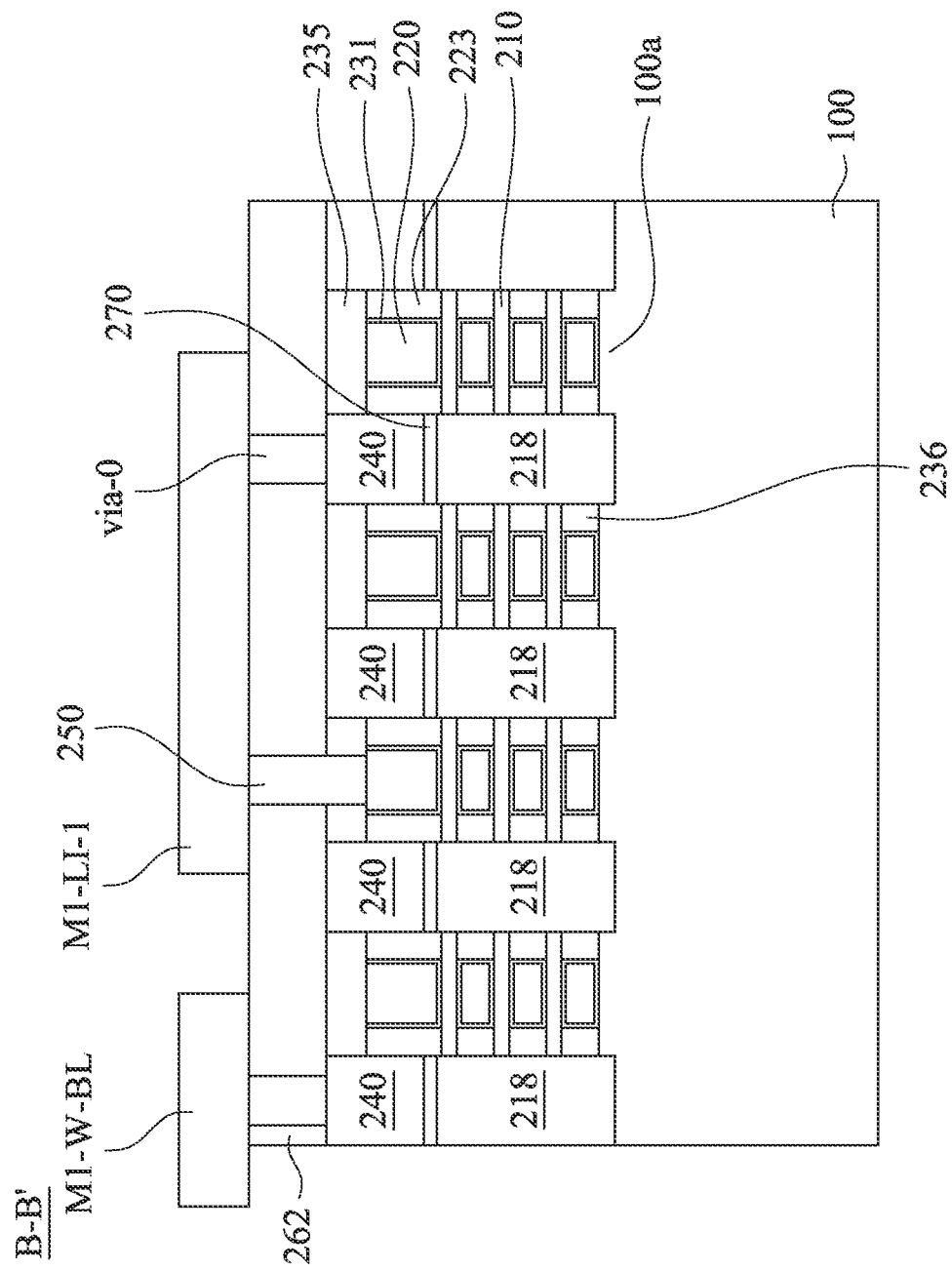
Figure 19C:
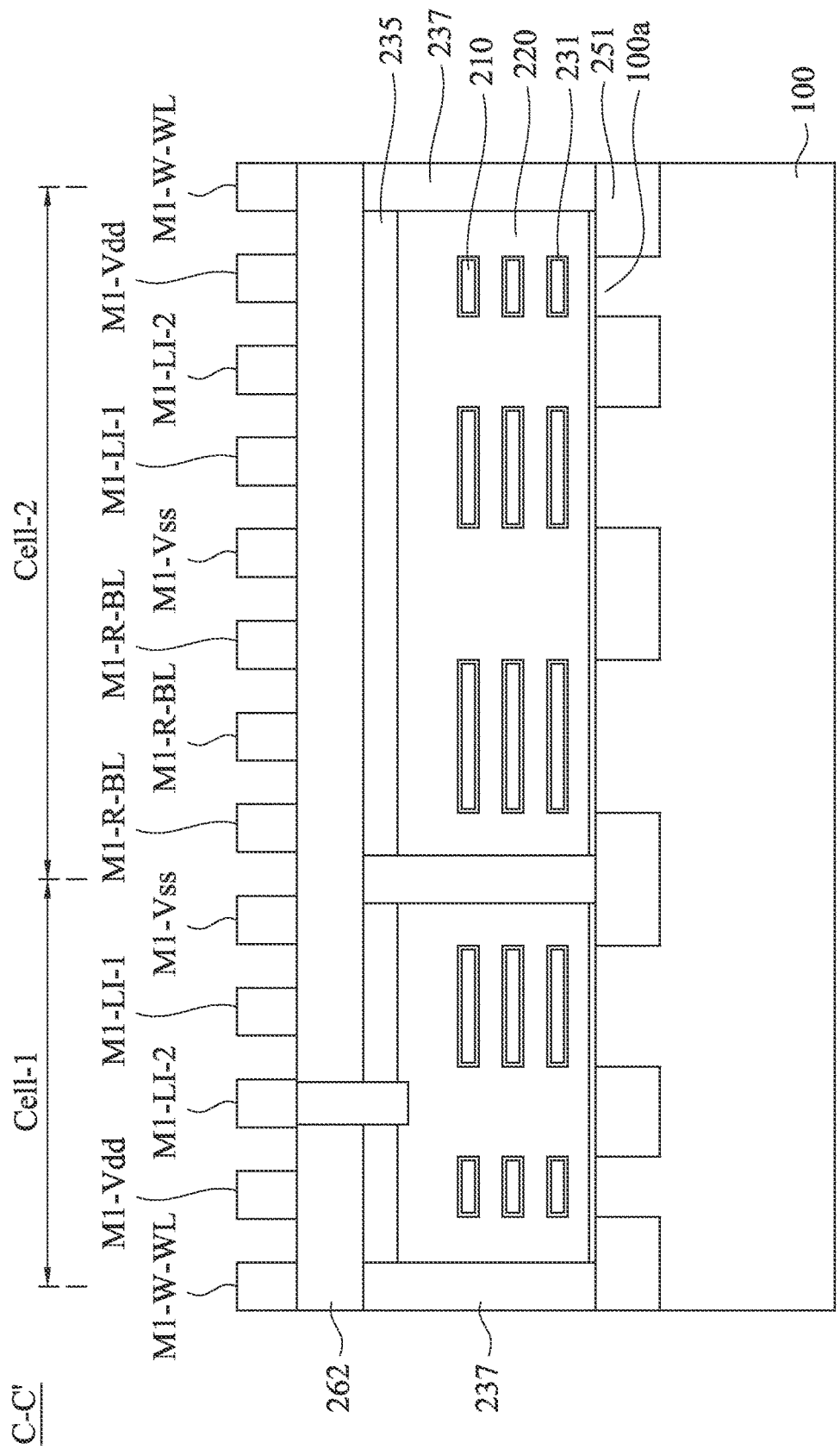

Reference is made to FIGS. 19A, 19B, and 19C. An ILD layer 262 may be deposited over the ILD layer 262, the hard mask layer 235, the source/drain contacts 240, the isolation structures 237. The ILD layer 262 may be made of an oxide, such as silicon oxide, a nitride, such as silicon nitride, the like, or a combination thereof, which may be formed by a chemical vapor deposition (CVD) process, such as high density plasma CVD (HDP-CVD), flowable chemical vapor deposition (FCVD), the like, or a combination thereof.

Subsequently, source/drain via-0 may be formed in the ILD layer 262 and on the corresponding source/drain contact 240, and a gate via 250 may be formed to pass through the ILD layer 262 and the hard mask layer 235 and lands on the gate electrode layer 220. In some embodiments, the source/drain via-0 and/or the gate via 250 may include a metal-containing material such as titanium nitride, titanium oxide, tungsten, cobalt, ruthenium, aluminum, copper, combinations thereof, multi-layers thereof; or the like.

Subsequently, an interconnect structure is formed over the source/drain vias. The interconnect structure includes a plurality of metallization layers with a plurality of metallization vias or interconnects. Other embodiments may contain more or fewer metallization layers and corresponding more or fewer number of vias. The metal line illustrated here just for an example, and the metal line may be otherwise oriented (rotated 90 degrees or at other orientations). The first metallization layer of the interconnect structure may include conductive lines, such as power supply voltage lines M1-Vdd, M1-Vss, a write word-line M1-W-WL, a write bit-line-bar M1-W-BL-Bar, a write bit-line M1-W-BL, a read bit-line M1-R-BL, a read word-line M1-R-WL, and local connection lines M1-LI-1, M1-LI-2, forming in an inter-metal dielectric (IMD) layer (not shown) over the ILD layer 262.

As an example to form the conductive lines in the interconnect structure, trenches/openings for the conductive lines are formed through the IMD layer. The trenches/openings may be formed using acceptable photolithography and etching techniques. A liner (not separately illustrated), such as a diffusion barrier layer, an adhesion layer, or the like, and a conductive material are formed in the openings. The liner may include titanium, titanium nitride, tantalum, tantalum nitride, or the like. The conductive material may be copper, a copper alloy, silver, gold, tungsten, cobalt, aluminum, nickel, or the like. A planarization process, such as a CMP, may be performed to remove excess material from a surface of the IMD layer. The remaining liner and conductive material form the conductive lines in the trenches/openings. The conductive lines may be formed in distinct processes, or may be formed in the same process. In some embodiments, material and manufacturing method of the conductive lines (not shown) in other metallization layers are substantially the same as those of the conductive line in the first metallization layer as shown in FIGS. 19A, 19B, and 19C, and the related detailed descriptions may refer to the foregoing paragraphs, and are not described again herein for the purpose of simplicity and clarity and does not in itself dictate a relationship between the various embodiments and/or configurations discussed.

Therefore, based on the above discussions, it can be seen that the present disclosure offers advantages. It is understood, however, that other embodiments may offer additional advantages, and not all advantages are necessarily disclosed herein, and that no particular advantage is required for all embodiments. The present disclosure in various embodiments provides a metal line routing method to improve the functional density and operation performance on the IC structure. Specifically, the SRAM cells on the IC structure can have non-rectangular shapes, such as L-shaped profile, such that the adjacent two SRAM cells can abut together and form a rectangular cell shape, which result in read-port transistors of the adjacent two SRAM cells sharing a same channel layer, which in turn improves the functional density of the IC structure. In addition, the write bit-lines can be disposed in a higher metal layer to lower the resistance of the SRAM cell, and the read bit-line can be disposed in a lower metal layer to lower the capacitance of the SRAM cell, such that the speed of SRAM cell can be improved. By way of example but not limiting the present disclosure, the read bit-line can be located on the metallization layer M1 and the write bit-lines can be located on a higher level metal layer (e.g., the metallization layer M3) than the metallization layer M1.

In some embodiments, a method includes forming a first channel pattern on a substrate from a top view; forming first and second gate patterns extending across the first channel pattern; forming first, second, and third source/drain patterns on the first channel pattern, the first and second source/drain patterns on opposite sides of the first gate pattern and the second and third source/drain patterns on opposite sides of the second gate pattern, wherein a first channel region of the first channel pattern, the first gate pattern, and the first and second source/drain patterns form a first read pull-down transistor of a first static random access memory (SRAM) cell, and a second channel region of the first channel pattern, the second gate pattern, and the second and third source/drain patterns form a second read pull-down transistor of a second SRAM cell. In some embodiments, the method further includes forming a third gate pattern extending across the first channel pattern; forming a fourth source/drain pattern on the first channel pattern, the first and fourth source/drain patterns on opposite sides of the first gate pattern, wherein a third channel region of the first channel pattern, the third gate pattern, and the first and fourth source/drain patterns form a first read pass-gate transistor of the first SRAM cell. In some embodiments, the method further includes forming a fourth gate pattern extending across the first channel pattern; forming a fifth source/drain patterns on the first channel pattern, the third and fifth source/drain patterns on opposite sides of the fourth gate pattern, wherein a fourth channel region of the first channel pattern, the fourth gate pattern, and the third and fifth source/drain patterns form a second read pass-gate transistor of second first SRAM cell. In some embodiments, the method further includes forming a second channel pattern on the substrate, the first gate pattern further extending across the second channel pattern; forming fourth and fifth source/drain pattern on the second channel pattern and on opposite sides of the first gate pattern; forming a source/drain contact extending from the second source/drain pattern to the fourth source/drain pattern. In some embodiments, the second channel pattern, the first gate pattern, and the fourth and fifth source/drain patterns form a write pull-down transistor of the first SRAM cell. In some embodiments, the method further includes forming a third channel pattern on the substrate, the first channel pattern laterally between the second and third channel patterns, the second gate pattern further extending across the third channel pattern; forming sixth and seventh source/drain pattern on the third channel pattern, wherein the source/drain contact further extending from the second source/drain pattern to the sixth source/drain pattern. In some embodiments, the third channel pattern, the second gate pattern, and the sixth and seventh source/drain patterns form a write pull-down transistor of the second SRAM cell. In some embodiments, the method further includes forming a source/drain via on the source/drain contact; forming a power supply voltage line on the source/drain via and extending along a lengthwise direction of the first channel pattern. In some embodiments, the method further includes forming a third gate pattern on the substrate and extending across the second channel pattern; forming sixth source/drain pattern on the second channel pattern, the fifth and sixth source/drain patterns on opposite sides of the first gate pattern; forming a local connection layer extending from above the sixth source/drain pattern to a position above the first gate pattern along a lengthwise direction of the first channel pattern. In some embodiments, the first SRAM cell is an eight-transistor SRAM cell.

In some embodiments, a method includes forming a first static random access memory (SRAM) cell on a substrate, the first SRAM cell comprising a first write port and a first read port, the first write port of the first SRAM cell comprising first and second write pull-up transistors, first and second write pull-down transistors, and first and second write pass-gate transistors, and the first read port of the first SRAM cell comprising a first read pull-down transistor and a first read pass-gate transistor; forming a first metal layer over the substrate, the first metal layer comprising a read bit-line; forming a second metal layer over the first metal layer, the second metal layer comprising a write bit-line. In some embodiments, the method further includes forming a third metal layer sandwiched between the first and second metal layers, the third metal layer comprising a write word-line and a read word-line. In some embodiments, the method further includes forming a second SRAM cell on the substrate, the second SRAM cell comprising a second write port and a second read port, the second read port of the second SRAM cell comprising a second read pull-down transistor and a second read pass-gate transistor, the first read pass-gate transistor of the first SRAM cell and the second read pass-gate transistor of the second SRAM cell sharing a first channel layer. In some embodiments, the first and second write pull-down transistors and the first and second write pass-gate transistors of the first write port share a second channel layer. In some embodiments, the first and second write pull-up transistors of the first write port share a second channel layer. In some embodiments, the first write pull-up transistor and the first write pull-down transistor of the first write port and the first read pull-down transistor of the first read port share a same gate strip.

In some embodiments, the semiconductor structure includes a semiconductor substrate, a first static random access memory (SRAM) cell, and a second SRAM cell. The first SRAM cell is on the semiconductor substrate and includes a first read pull-down transistor and a first read pass-gate transistor. The second SRAM cell is on the semiconductor substrate and includes a second read pull-down transistor and a second read pass-gate transistor. The first read pull-down transistor and the first read pass-gate transistor of the first SRAM cell and the second read pull-down transistor and the second read pass-gate transistor of the second SRAM cell share a channel layer. In some embodiments, a first metal layer and a second metal layer. The first metal layer is over the semiconductor substrate and includes a read bit-line. The read bit-line extends along a lengthwise direction of the channel layer. The second metal layer is over the second metal layer and includes a write word-line and a read word-line. The write word-line and the read word-line each extend along a direction perpendicular to the lengthwise direction of the channel layer. In some embodiments, the second metal layer further comprises a power supply voltage line laterally between the write word-line and the read word-line. In some embodiments, the semiconductor structure includes a third metal layer. The third metal layer is over the second metal layer and includes a write bit-line and a write bit-line-bar. The write bit-line and the write bit-line-bar each extend along the lengthwise direction of the channel layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    forming a first channel pattern on a substrate from a top view;
    forming a first gate pattern and a second gate pattern extending across the first channel pattern; and
    forming a first source/drain pattern, a second source/drain pattern, and a third source/drain pattern on the first channel pattern, the first source/drain pattern and the second source/drain pattern on opposite sides of the first gate pattern and the second source/drain pattern and the third source/drain pattern on opposite sides of the second gate pattern, wherein a first channel region of the first channel pattern, the first gate pattern, and the first source/drain pattern and the second source/drain pattern form a first read pull-down transistor of a first static random access memory (SRAM) cell, and a second channel region of the first channel pattern, the second gate pattern, and the second source/drain pattern and the third source/drain pattern form a second read pull-down transistor of a second SRAM cell.

2. The method of claim 1, further comprising:
    forming a third gate pattern extending across the first channel pattern; and
    forming a fourth source/drain pattern on the first channel pattern, the first source/drain pattern and the fourth source/drain pattern on opposite sides of the first gate pattern, wherein a third channel region of the first channel pattern, the third gate pattern, and the first source/drain pattern and the fourth source/drain pattern form a first read pass-gate transistor of the first SRAM cell.

3. The method of claim 2, further comprising:
    forming a fourth gate pattern extending across the first channel pattern; and
    forming a fifth source/drain pattern on the first channel pattern, the third source/drain pattern and the fifth source/drain pattern on opposite sides of the fourth gate pattern, wherein a fourth channel region of the first channel pattern, the fourth gate pattern, and the third source/drain pattern and the fifth source/drain pattern form a second read pass-gate transistor of the second SRAM cell.

4. The method of claim 1, further comprising:
    forming a second channel pattern on the substrate, the first gate pattern further extending across the second channel pattern;
    forming a fourth source/drain pattern and a fifth source/drain pattern on the second channel pattern and on opposite sides of the first gate pattern; and
    forming a source/drain contact extending from the second source/drain pattern to the fourth source/drain pattern.

5. The method of claim 4, wherein the second channel pattern, the first gate pattern, and the fourth source/drain pattern and the fifth source/drain pattern form a write pull-down transistor of the first SRAM cell.

6. The method of claim 4, further comprising:
forming a third channel pattern on the substrate, the first channel pattern laterally between the second channel pattern and the third channel pattern, the second gate pattern further extending across the third channel pattern; and
forming a sixth source/drain pattern and a seventh source/drain pattern on the third channel pattern, wherein the source/drain contact further extends from the second source/drain pattern to the sixth source/drain pattern.

7. The method of claim 6, wherein the third channel pattern, the second gate pattern, and the sixth source/drain pattern and the seventh source/drain pattern form a write pull-down transistor of the second SRAM cell.

8. The method of claim 4, further comprising:
forming a source/drain via on the source/drain contact; and
forming a power supply voltage line on the source/drain via and extending along a lengthwise direction of the first channel pattern.

9. The method of claim 4, further comprising:
forming a third gate pattern on the substrate and extending across the second channel pattern;
forming a sixth source/drain pattern on the second channel pattern, the fifth source/drain pattern and the sixth source/drain pattern on opposite sides of the first gate pattern; and
forming a local connection layer extending from above the sixth source/drain pattern to a position above the first gate pattern along a lengthwise direction of the first channel pattern.

10. The method of claim 1, wherein the first SRAM cell is an eight-transistor SRAM cell.

11. A method, comprising:
forming a first static random access memory (SRAM) cell on a substrate, the first SRAM cell comprising a first write port and a first read port, the first write port of the first SRAM cell comprising a first write pull-up transistor and a second write pull-up transistor, a first write pull-down transistor and a second write pull-down transistor, and a first write pass-gate transistor and a second write pass-gate transistor, and the first read port of the first SRAM cell comprising a first read pull-down transistor and a first read pass-gate transistor, wherein the first write pull-up transistor and the second write pull-up transistor of the first write port share a same channel layer;
forming a first metal layer over the substrate, the first metal layer comprising a read bit-line; and
forming a second metal layer over the first metal layer, the second metal layer comprising a write bit-line.

12. The method of claim 11, further comprising:
forming a third metal layer sandwiched between the first metal layer and the second metal layer, the third metal layer comprising a write word-line and a read word-line.

13. The method of claim 11, further comprising:
forming a second SRAM cell on the substrate, the second SRAM cell comprising a second write port and a second read port, the second read port of the second SRAM cell comprising a second read pull-down transistor and a second read pass-gate transistor, the first read pass-gate transistor of the first SRAM cell and the second read pass-gate transistor of the second SRAM cell sharing a same channel layer.

14. The method of claim 11, wherein the first write pull-down transistor and the second write pull-down transistor and the first write pass-gate transistor and second write pass-gate transistor of the first write port share a same channel layer.

15. The method of claim 11, wherein the first write pull-up transistor and the first write pull-down transistor of the first write port and the first read pull-down transistor of the first read port share a same gate strip.

16. A method, comprising:
forming a first static random access memory (SRAM) cell on a semiconductor substrate, the first SRAM cell comprising a first read pull-down transistor and a first read pass-gate transistor; and
forming a second SRAM cell on the semiconductor substrate, the second SRAM cell comprising a second read pull-down transistor and a second read pass-gate transistor, wherein the first read pull-down transistor and the first read pass-gate transistor of the first SRAM cell and the second read pull-down transistor and the second read pass-gate transistor of the second SRAM cell share a same channel layer.

17. The method of claim 16, further comprising:
forming a first metal layer over the semiconductor substrate, the first metal layer comprising a read bit-line, the read bit-line extending along a lengthwise direction of the channel layer; and
forming a second metal layer over the first metal layer, the second metal layer comprising a write word-line and a read word-line, the write word-line and the read word-line each extending along a direction perpendicular to the lengthwise direction of the channel layer.

18. The method of claim 17, wherein the second metal layer further comprises a power supply voltage line laterally between the write word-line and the read word-line.

19. The method of claim 17, further comprising:
forming a third metal layer over the second metal layer, the third metal layer comprising a write bit-line and a write bit-line-bar, the write bit-line and the write bit-line-bar each extending along the lengthwise direction of the channel layer.

20. The method of claim 16, further comprising:
forming a read bit-line over and electrically coupled to the first read pass-gate transistor and the second read pass-gate transistor.

* * * * *